(12) United States Patent
Brown et al.

(10) Patent No.: US 12,447,332 B2
(45) Date of Patent: Oct. 21, 2025

(54) UNITED STATES AURICULAR NERVE FIELD STIMULATION DEVICE AND METHODS FOR USING THE SAME

(71) Applicant: NEURAXIS, INC., Versailles, IN (US)

(72) Inventors: Christopher R. Brown, Greensburg, IN (US); Gary M. Peterson, Versailles, IN (US)

(73) Assignee: NEURAXIS, INC., Versailles, IN (US)

( * ) Notice: Subject to any disclaimer, the term of this patent is extended or adjusted under 35 U.S.C. 154(b) by 352 days.

(21) Appl. No.: 18/173,893

(22) Filed: Feb. 24, 2023

(65) Prior Publication Data

US 2023/0241375 A1 Aug. 3, 2023

Related U.S. Application Data

(60) Continuation-in-part of application No. 17/725,761, filed on Apr. 21, 2022, now Pat. No. 11,813,448,
(Continued)

(51) Int. Cl.
| | |
|---|---|
| *A61N 1/05* | (2006.01) |
| *A61N 1/36* | (2006.01) |
| *A61K 31/485* | (2006.01) |

(52) U.S. Cl.
CPC ......... *A61N 1/0529* (2013.01); *A61N 1/0551* (2013.01); *A61N 1/36071* (2013.01); *A61K 31/485* (2013.01)

(58) Field of Classification Search
CPC . A61N 1/0529; A61N 1/0551; A61N 1/36071
(Continued)

(56) References Cited

U.S. PATENT DOCUMENTS

| | | |
|---|---|---|
| 4,646,744 A | 3/1987 | Capel |
| 4,865,048 A | 9/1989 | Eckerson |

(Continued)

FOREIGN PATENT DOCUMENTS

| | | |
|---|---|---|
| AT | 395106 B | 9/1992 |
| EP | 2474339 A1 | 11/2012 |

(Continued)

OTHER PUBLICATIONS

Office action for copending Korean Patent Application No. 10-2020-7034010, dated Jan. 22, 2024. Translation appended.
(Continued)

*Primary Examiner* — Nadia A Mahmood
(74) *Attorney, Agent, or Firm* — Barnes & Thornburg LLP

(57) ABSTRACT

An auricular nerve field stimulation device may include a first plurality of electrodes arranged to contact a ventral aspect of an auricle, a second plurality of electrodes arranged to contact a dorsal aspect of the auricle, and electrical circuitry coupled to the electrodes and configured to selectively apply electrical stimulation signals to the electrodes to cause a first set of trans-auricular currents to flow through the auricle between the first plurality of electrodes and respective ones of the second plurality of electrodes paired therewith according to a first pairing, and to cause a second set of trans-auricular currents to flow through the auricle between the first plurality of electrodes and respective ones of the second plurality of electrodes paired therewith according to a second pairing different from the first pairing, the first and second sets of trans-auricular currents to stimulate at least one auricular nerve field within the auricle. Methods of utilizing nerve field stimulation device.

20 Claims, 34 Drawing Sheets

Related U.S. Application Data which is a continuation of application No. 16/534,159, filed on Aug. 7, 2019, now Pat. No. 11,331,473, which is a continuation of application No. 15/488,416, filed on Apr. 14, 2017, now Pat. No. 10,413,719, application No. 18/173,893, filed on Feb. 24, 2023 is a continuation-in-part of application No. 18/154,375, filed on Jan. 13, 2023, now Pat. No. 12,029,701, which is a continuation of application No. 17/363,620, filed on Jun. 30, 2021, now Pat. No. 11,654,082, which is a continuation of application No. 16/408,004, filed on May 9, 2019, now Pat. No. 11,077,019, which is a continuation of application No. 16/014,169, filed on Jun. 21, 2018, now Pat. No. 10,322,062, which is a continuation of application No. 15/811,278, filed on Nov. 13, 2017, now Pat. No. 10,010,479, which is a continuation of application No. 15/595,185, filed on May 15, 2017, now Pat. No. 9,839,577, which is a continuation of application No. 14/277,158, filed on May 14, 2014, now Pat. No. 9,662,269, application No. 18/173,893, filed on Feb. 24, 2023 is a continuation-in-part of application No. 17/715,121, filed on Apr. 7, 2022, now Pat. No. 12,097,371, which is a division of application No. 17/040,766, filed as application No. PCT/US2019/029172 on Apr. 25, 2019, now Pat. No. 11,369,791.

(60) Provisional application No. 62/324,598, filed on Apr. 19, 2016, provisional application No. 62/323,369, filed on Apr. 15, 2016, provisional application No. 61/894,270, filed on Oct. 22, 2013, provisional application No. 62/662,995, filed on Apr. 26, 2018, provisional application No. 63/314,028, filed on Feb. 25, 2022, provisional application No. 63/315,371, filed on Mar. 1, 2022.

(58) Field of Classification Search
USPC .......................................................... 607/45
See application file for complete search history.

(56) References Cited

U.S. PATENT DOCUMENTS

| | | | |
|---|---|---|---|
| 5,084,007 A | 1/1992 | Malin | |
| 5,094,242 A | 3/1992 | Gleason et al. | |
| 5,458,625 A | 10/1995 | Kendall | |
| 6,212,433 B1 | 4/2001 | Behl | |
| 6,296,652 B1 | 10/2001 | Qingman | |
| 7,092,849 B2 | 8/2006 | Lafitte et al. | |
| 7,103,417 B1 | 9/2006 | Segel et al. | |
| 8,428,719 B2 | 4/2013 | Napadow | |
| 8,761,872 B2 | 6/2014 | Hinrichsen et al. | |
| 8,942,814 B2 | 1/2015 | Szeles | |
| 9,662,269 B2 | 5/2017 | Brown et al. | |
| 9,782,584 B2 | 10/2017 | Cartledge et al. | |
| 9,839,577 B2 | 12/2017 | Brown | |
| 9,901,734 B2 | 2/2018 | Bennett | |
| 10,010,479 B2 | 7/2018 | Brown | |
| 10,052,257 B2 | 8/2018 | Nageshwar | |
| 10,058,478 B2 | 8/2018 | Schnetz et al. | |
| 10,086,199 B2 | 10/2018 | Brown | |
| 10,130,275 B2 | 11/2018 | Nageshwar | |
| 10,413,719 B2 | 9/2019 | Brown et al. | |
| 10,695,568 B1 | 6/2020 | Covalin | |
| 10,806,928 B2 | 10/2020 | Sharma et al. | |
| 2003/0050470 A1 | 3/2003 | An et al. | |
| 2003/0149451 A1 | 8/2003 | Chomenky et al. | |
| 2003/0167025 A1* | 9/2003 | Imran | A61B 5/6882 607/40 |
| 2004/0044390 A1 | 3/2004 | Szeles | |
| 2006/0122675 A1 | 6/2006 | Libbus et al. | |
| 2008/0051852 A1 | 2/2008 | Dietrich et al. | |
| 2008/0146549 A1 | 6/2008 | Coleman | |
| 2008/0249439 A1 | 10/2008 | Tracey et al. | |
| 2010/0004715 A1 | 1/2010 | Fahey | |
| 2010/0113965 A1 | 5/2010 | Kanevsky et al. | |
| 2010/0168822 A1 | 7/2010 | Szeles | |
| 2010/0262205 A1 | 10/2010 | De Ridder | |
| 2011/0160811 A1 | 6/2011 | Walker | |
| 2011/0190569 A1 | 8/2011 | Simon et al. | |
| 2012/0035680 A1 | 2/2012 | Napadow | |
| 2012/0226333 A1 | 9/2012 | Szeles | |
| 2013/0150923 A1 | 6/2013 | Schnetz et al. | |
| 2014/0081368 A1 | 3/2014 | Szeles | |
| 2014/0370476 A1 | 12/2014 | Nageshwar | |
| 2014/0371608 A1 | 12/2014 | Nageshwar | |
| 2014/0371621 A1 | 12/2014 | Nageshwar | |
| 2015/0112405 A1 | 4/2015 | Brown et al. | |
| 2015/0265830 A1 | 9/2015 | Simon et al. | |
| 2015/0360030 A1 | 12/2015 | Cartledge et al. | |
| 2016/0113526 A1 | 4/2016 | Nageshwar et al. | |
| 2017/0087364 A1 | 3/2017 | Cartledge et al. | |
| 2017/0143247 A1 | 5/2017 | Nageshwar | |
| 2017/0197081 A1 | 7/2017 | Charlesworth et al. | |
| 2017/0246081 A1* | 8/2017 | Brown | A61N 1/36036 |
| 2018/0064603 A1 | 3/2018 | Brown et al. | |
| 2018/0200522 A1 | 7/2018 | Taca, Jr. | |
| 2018/0296435 A1 | 10/2018 | Brown et al. | |
| 2019/0262229 A1 | 8/2019 | Brown et al. | |
| 2022/0072311 A1 | 3/2022 | Taca, Jr. | |

FOREIGN PATENT DOCUMENTS

| | | |
|---|---|---|
| WO | 2005001706 A1 | 1/2005 |
| WO | 2011030210 A1 | 3/2011 |
| WO | 2014200488 A1 | 12/2014 |
| WO | 2014200489 A2 | 12/2014 |
| WO | 2014200492 A1 | 12/2014 |
| WO | 2014207512 A1 | 12/2014 |
| WO | 2017/044967 A1 | 3/2017 |

OTHER PUBLICATIONS

PCT International Search Report and Written Opinion completed by the ISA/US on Jan. 2, 2020 and issued in connection with PCT/US2019/029172.

Non-Final Office Action dated Mar. 19, 2018 filed in U.S. Pat. No. 10,010,479 issued Jul. 3, 2018.

Response and Terminal Disclaimer filed Apr. 10, 2018 to Non-Final Action dated Mar. 19, 2018 in U.S. Pat. No. 10,010,479 issued Jul. 3, 2018.

Non-Final Office Action dated Aug. 2, 2017 filed in U.S. Pat. No. 9,839,577 issued Dec. 12, 2017.

Response and Terminal Disclaimer filed Sep. 7, 2017 to Non-Final Office Action dated Aug. 2, 2017 in U.S. Pat. No. 9,839,577 issued Dec. 12, 2017.

Non-Final Office Action Dated Jul. 15, 2015 filed in U.S. Pat. No. 9,662,269 issued May 30, 2017.

Response filed Nov. 16, 2015 to Non-Final Office Action dated Jul. 15, 2015 in U.S. Pat. No. 9,662,269 issued May 30, 2017.

Final Office Action dated Feb. 25, 2016 filed in U.S. Pat. No. 9,662,269 issued May 30, 2017.

Response and Request for Continued Examination filed on Jun. 27, 2016 to Final Office Action dated Feb. 25, 2016 in U.S. Pat. No. 9,662,269 issued May 30, 2017.

Non-Final Office Action dated Jul. 28, 2016 filed in U.S. Pat. No. 9,662,269 issued May 30, 2017.

Response filed Aug. 25, 2016 to Non-Final Office Action dated Jul. 28, 2016 filed in U.S. Pat. No. 9,662,269 issued May 30, 2017.

Extended European Search Report in Application No. 19850021.7-1122 dated Dec. 17, 2021.

First Office Action issued in co-pending Japanese Application No. 2021-50996, dated Dec. 22, 2022.

Miranda, Adrian, and Arturo Taca. "Neuromodulation with percutaneous electrical nerve field stimulation is associated with reduction in signs and symptoms of opioid withdrawal: a multisite, retrospective

(56) References Cited

OTHER PUBLICATIONS assessment." The American journal of drug and alcohol abuse vol. 44,1 (2018): 56-63. doi:10.1080/00952990.2017.1295459.

Roberts, Arthur and Christopher R. Brown. "Percutaneous Peri-Auricular Peripheral Nerve Field Stimulation: A Novel, Non-Opioid Therapy for Diabetic Neuropathy." The Pain Practitioner, vol. 25, 3 (2015): 41-47.

* cited by examiner

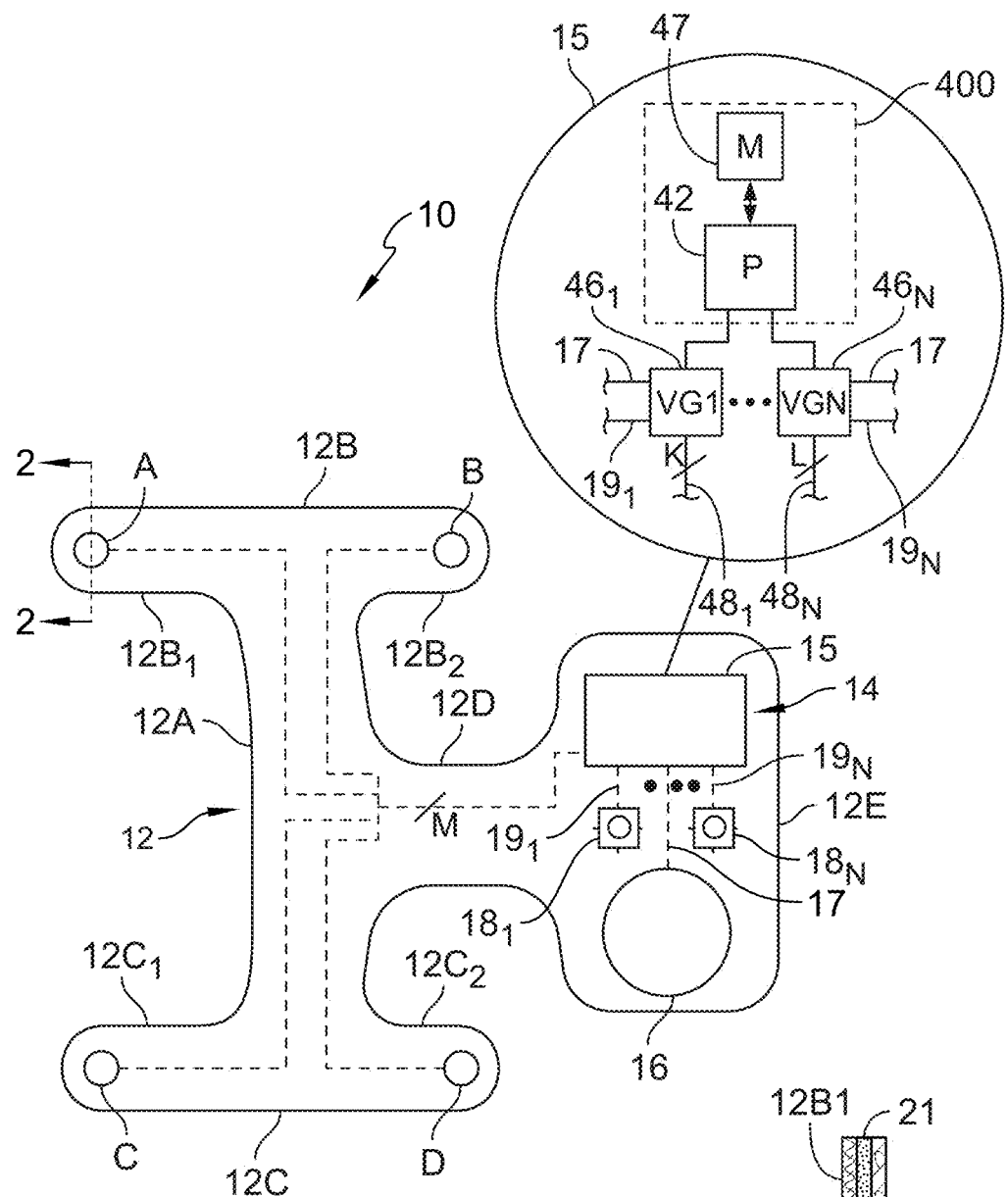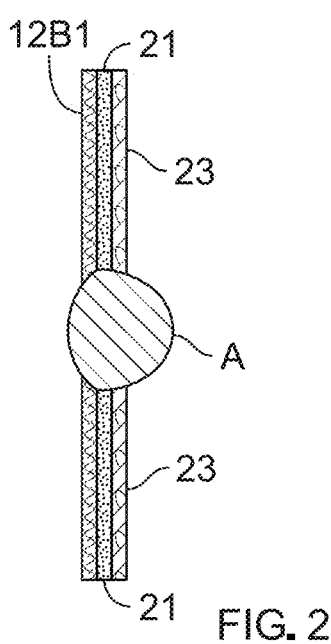
FIG. 1
FIG. 2

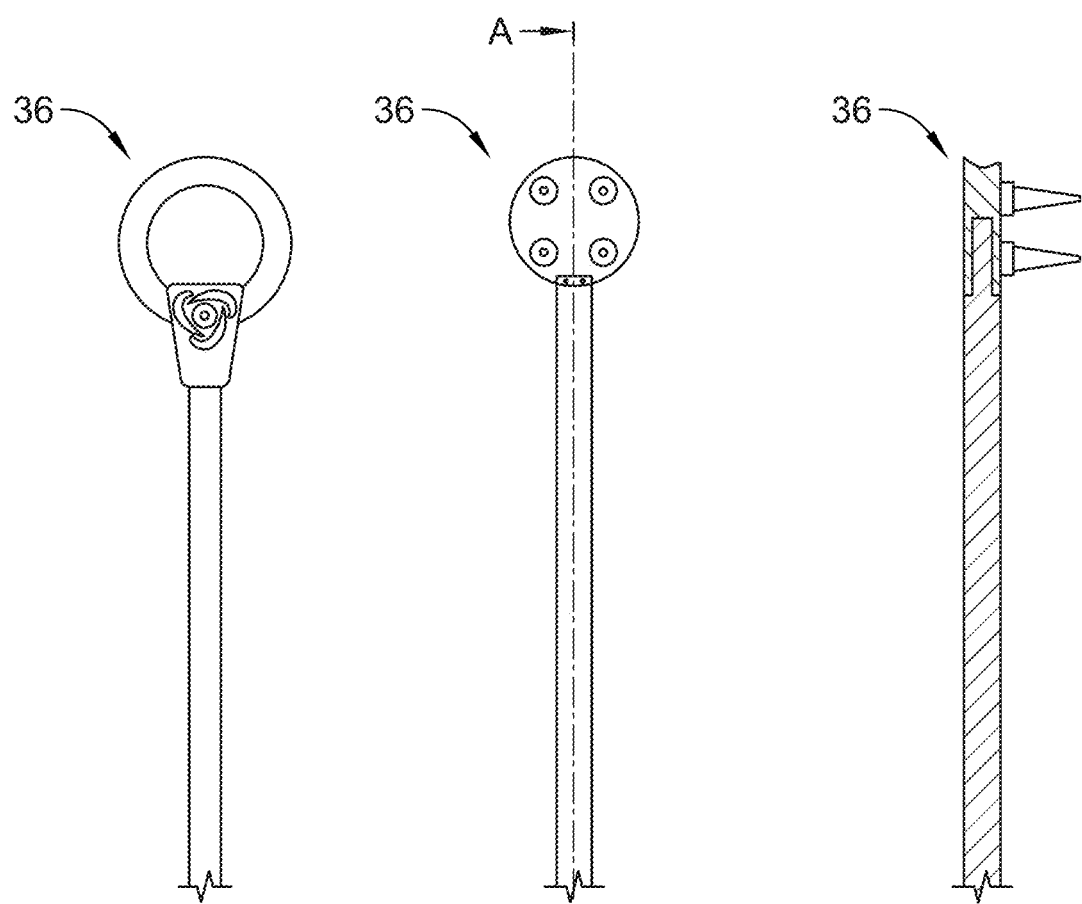

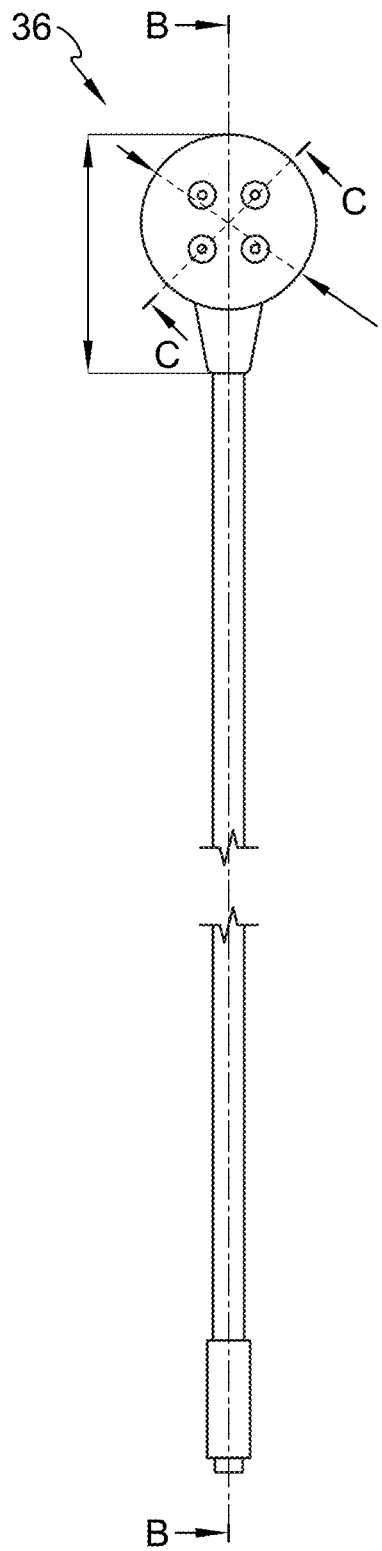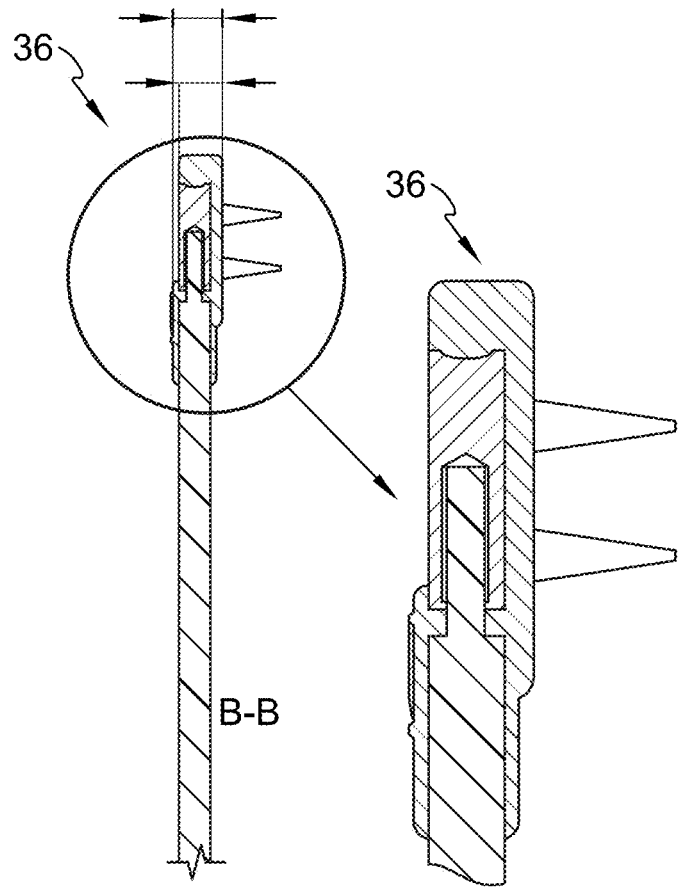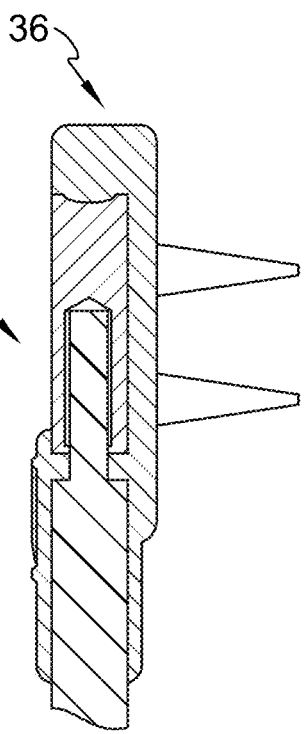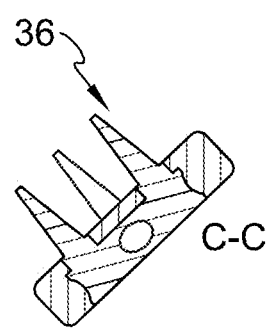
FIG. 20
FIG. 21
FIG. 22
FIG. 23

Figure1. PAGI-SYM (Patient Assessment of Gastrointestinal Symptom Severity Index) total score change from baseline through active therapy phase (weeks 5-8).

- Disability scores (FDI) decreased from baseline to week 6: median (IQR) 46.0 (40.0-52.0) to 34.5 (5.0-43.0) (p=0.011; Figure above)
- SDS scores decreased from median (IQR) 24.5 (21.0-27.0) to 12.5 (1.0-21.0) (p=0.002)

UNITED STATES AURICULAR NERVE FIELD STIMULATION DEVICE AND METHODS FOR USING THE SAME

CROSS-REFERENCE TO RELATED APPLICATIONS

This application is a continuation-in-part of U.S. patent application Ser. No. 17/725,761, filed Apr. 21, 2022, which claims the benefit of U.S. patent application Ser. No. 16/534,159, filed Aug. 7, 2019, and now U.S. Pat. No. 11,331,473, which claims benefit of U.S. patent application Ser. No. 15/488,416, filed on Apr. 14, 2017 and now U.S. Pat. No. 10,413,719, which claims benefit of, and priority to, U.S. Provisional Patent Application Ser. No. 62/324,598, filed Apr. 19, 2016 and U.S. Provisional Patent Application Ser. No. 62/323,369, filed Apr. 15, 2016 the disclosures of which are all incorporated herein by reference in their entireties. This application is also a continuation-in-part of U.S. patent application Ser. No. 18/154,375, filed Jan. 13, 2023, which is a continuation of U.S. patent application Ser. No. 17/363,620, filed Jun. 30, 2021, which is a continuation of U.S. patent application Ser. No. 16/408,004, filed on May 9, 2019, now U.S. Pat. No. 11,077,019, which is a continuation of U.S. patent application Ser. No. 16/014,169, filed Jun. 21, 2018, and now U.S. Pat. No. 10,322,062 which is a continuation of U.S. patent application Ser. No. 15/811,278, filed Nov. 13, 2017 and now U.S. Pat. No. 10,010,479, which is a continuation of U.S. patent application Ser. No. 15/595,185, filed May 15, 2017 and now U.S. Pat. No. 9,839,577, which is a continuation of U.S. patent application Ser. No. 14/277,158, filed May 14, 2014 and now U.S. Pat. No. 9,662,269, which claims the benefit of, and priority to, U.S. Provisional Patent Application Ser. No. 61/894,270, filed Oct. 22, 2013 the disclosures of which are all incorporated herein by reference in their entireties.

This application is also a continuation-in-part of U.S. patent application Ser. No. 17/715,121, filed Apr. 7, 2022, which is a divisional of U.S. patent application Ser. No. 17/040,766, filed Sep. 23, 2020, now U.S. Pat. No. 11,369,791, which is a U.S. national stage entry of PCT Application No. PCT/US2019/029172, filed Apr. 25, 2019, which claims the benefit of and priority to U.S. Provisional Patent Application Ser. No. 62/662,995, filed Apr. 26, 2018, the disclosures of which are all incorporated herein by reference in their entireties. This application claims the benefit of priority to U.S. Provisional Patent Application 63/314,028, filed Feb. 25, 2022, and U.S. Provisional Patent Application 63/315,371 filed Mar. 1, 2022, the disclosure of each is incorporated herein by reference in their entirety.

FIELD OF THE DISCLOSURE

This disclosure relates generally to electrical stimulation devices, and more specifically to auricular stimulation devices for stimulating auricular nerve fields. This disclosure further relates to methods of using electrical stimulation devices for stimulating auricular nerve fields. In addition, this disclosure pertains to devices and methods for treatment of diseases by nerve stimulation. More particularly, the present disclosure is related to treating a symptom(s) of a disease including but not limited to therapies for treating pain and inflammation.

BACKGROUND

Percutaneous electrical stimulation devices are known and used to provide therapy to humans and animals. As one example of such devices, conventional electrical acupuncture devices are used to percutaneously supply electrical stimulation to acupuncture points including those in the region of the ear.

Located within the ear are cranial nerves V, VII, IX, X which anastomose directly into the brain and branches of the greater and lesser occipital nerves anastomosing directly into the cervical spine. There are distinct areas of the auricle on both the dorsal and ventral aspect which carry a predominance/concentration of the cranial nerves, peripheral nerves, arterial branches, and neurovascular bundles. Percutaneous electrical stimulation of one or more of these cranial nerves can provide desirable results.

In addition, it has been reported that utilization of an implanted bioelectric vagal nerve stimulation device (VNS) provided positive results for treating rheumatoid arthritis (RA). In particular, SetPoint Medical (Valencia, Santa Clarita, CA) reported results from a U.S. pilot Investigational Device Exemption (IDE) study utilizing such a device for the treatment of RA. These results were reported by SetPoint Medical at the European Congress of Rheumatology (EULAR) 2019.

The above pilot study was a multi-center, double-blind, randomized trial evaluating the safety and tolerability of SetPoint's implanted bioelectronic vagal nerve stimulation (VNS) device for the treatment of drug refractory RA. All of the 14 patients enrolled in the study had active RA and prior insufficient response to two or more biologic or targeted synthetic disease modifying anti-rheumatic drugs (DMARDs) having at least two different modes of action. Nine out of the 14 patients had failed to respond to the latest class of targeted synthetic DMARDs, Janus kinase (JAK) inhibitors, after failing to respond to biologic DMARDs. The patients were enrolled in two phases: the first three patients in the open-label phase were implanted and stimulated for one minute, once per day (QD) and, following safety review board approval, the remaining 11 patients were implanted with the device and randomized to one minute of sham, once per day (QD) or four times per day (QID) stimulations through the primary endpoint at 12 weeks.

The data demonstrate that SetPoint's device was well tolerated with no device-related adverse events through 12 weeks. Two notable surgery-related events, that have been reported with other vagus nerve stimulator implantation procedures, were observed and resolved without clinically significant sequelae.

At 12 weeks, a positive clinical response was observed in patients who received active stimulation with SetPoint's device. Five out of 10 active stimulation patients, who had failed multiple biologic and targeted synthetic therapies, had clinically meaningful improvement in their signs and symptoms of RA as measured by validated disease measurement instruments such as Disease Activity Score (DAS28-CRP) and Clinical Disease Activity Index (CDAI). Two of these patients achieved DAS28-CRP remission. There was no clinical improvement observed in the four patients assigned to sham stimulation. Treatment with SetPoint's device also demonstrated a greater than 30% decrease, compared to baseline, in bioassay levels of key biomarkers associated with inflammation: IL-1β, IL-6, and TNF-α. Improvements in bone erosion scores of wrist joints, as measured by MRI, correlated with improvement in disease activity; although, there were no changes in joint inflammation scores such as synovitis and osteitis.

As discussed above, there is some evidence to support VNS in modulating the immune system, however, the technique has been limited due to, for example, the invasive nature of an implanted bioelectronics vagal nerve stimulation device (VNS).

SUMMARY

The present disclosure provides non-invasive devices, systems and methods for peripheral nerve field stimulation, anatomical location of cranial nerves, peripheral nerves, arterial branches and/or neurovascular bundles, and energy transfer based upon accepted laws of energy transfer in human tissue. These physical entities can be selectively targeted by percutaneous application of one or more electrode-needle complex either with a single needle or an array connected to a generator set at a selected frequency or modulating frequency range.

The devices of the present disclosure can be utilized to treat inflammation and various pain disorders including pre/post surgical pain, acute pain, and chronic pain. Examples of more particular types of pain disorders the devices of the present disclosure can be utilized to treat include headaches and fibromyalgia.

Another particular group of pain disorders the devices of the present disclosure can be utilized to treat are functional abdominal pain disorders (FAPDs). FAPDs are a group of functional gastrointestinal disorders with pain as the driving symptom. Examples of FAPDs include irritable bowel syndrome (IBS), functional dyspepsia, functional abdominal pain-not otherwise specified (FAP-NOS) and abdominal migraine. Their complex nature and unclear pathophysiology may make the management of FAPDs challenging. The devices of the present disclosure can be used to treat FAPDs in patients of all ages and age ranges. For example, one particular age range the devices can be utilized to treat FAPDs is from about 11 years of age to about 18 years of age.

With respect to IBS, these patients suffer from chronic abdominal pain despite having no structural or anatomical lesions and most pharmacological agents used to treat IBS are no better, or have minimal gain over, placebo. However, as indicated above the devices of the present disclosure can be used to treat functional abdominal pain associated with IBS. In particular, the devices of the present disclosure can be used to treat functional abdominal pain associated with IBS in patients of all ages and age ranges. One particular age range the devices can be utilized to treat IBS is from about 11 years of age to about 18 years of age.

In addition, as discussed in detail herein, the devices of the present disclosure can also be utilized to treat inflammation.

It should be appreciated that the present disclosure may comprise one or more of the aspects/features recited in the attached claims, and/or one or more of the following aspects/features and combinations thereof.

In one aspect the disclosure relates to methods and systems for electrode placement for auricular peripheral nerve field stimulation (PNFS) using a unique method of anatomical visualization and percutaneous implantation of an electrode complex(s) designed as a needle array.

In another aspect, a non-percutaneous trans-auricular nerve field stimulation device may comprise a first plurality of spaced-apart electrically conductive electrodes each arranged to non-percutaneously contact a ventral aspect of an auricle of a human ear, a second plurality of spaced-apart electrically conductive electrodes each arranged to non-percutaneously contact a dorsal aspect of the auricle, and electrical circuitry coupled to the first and second plurality of electrodes and configured to selectively apply electrical stimulation signals to at least one of the first plurality of electrodes and the second plurality of electrodes to cause a first set of trans-auricular currents to flow through the auricle between the first plurality of electrodes and respective ones of the second plurality of electrodes paired therewith according to a first pairing, and to cause a second set of trans-auricular currents to flow through the auricle between the first plurality of electrodes and respective ones of the second plurality of electrodes paired therewith according to a second pairing different from the first pairing, the first and second sets of trans-auricular currents to stimulate at least one auricular nerve field within the auricle.

In yet another aspect, a non-percutaneous trans-auricular nerve field stimulation device may comprise a first electrically conductive electrode arranged to non-percutaneously contact a first portion of a ventral aspect of an auricle of a human ear, a second electrically conductive electrode arranged to non-percutaneously contact a first portion of a dorsal aspect of the auricle opposite the first portion of the ventral aspect, a third electrically conductive electrode arranged to non-percutaneously contact a second portion of the ventral aspect of auricle spaced apart from the first portion of the ventral aspect, a fourth electrically conductive electrode arranged to non-percutaneously contact a second portion of the dorsal aspect of the auricle opposite the second portion of the ventral aspect, and electrical circuitry coupled to the first, second third and fourth electrodes, the electrical circuitry configured to (i) selectively apply a first electrical stimulation signal to at least one of the first and second electrodes to cause a first trans-auricular current to flow therebetween and transversely through the auricle in a direction parallel to a transverse plane of the auricle, (ii) selectively apply a second electrical stimulation signal to at least one of the third and fourth electrodes to cause a second trans-auricular current to flow therebetween and transversely through the auricle in the direction parallel to the transverse plane of the auricle, (iii) selectively apply a third electrical stimulation signal to at least one of the second and third electrodes to cause a third trans-auricular current to flow therebetween and diagonally through the auricle, and (iv) selectively apply a fourth electrical stimulation signal to at least one of the first and fourth electrode to cause a fourth trans-auricular current to flow therebetween and diagonally through the auricle.

In another aspect, the invention providers for a single use device that is physician applied for ambulatory, continuous, home based therapy. In one example, the stimulator is percutaneously implanted into the cranial and/or peripheral nerves and corresponding neural vascular bundles of the auricular and periauricular areas as ascertained by the method of evaluating and implanting of the electrode/needle array provided in the present invention. This includes transillumination of the auricular and periauricular tissues and surrounding neurovascular anatomy. The auricular peripheral nerve stimulator system allows for continuous, intermittent neural stimulation.

In another aspect, the auricular peripheral nerve stimulator system is a battery-operated, single-use device that has a preprogrammed frequency, pulse and duration for the stimulation of selected cranial and/or peripheral nerves and corresponding neural vascular bundles of auricular and periauricular areas. In one example, the device power supply connects via three or more electrical conduit wires, sheathed in electrically insulating material, to one or more therapy electrode arrays comprised of multiple needles each and one reference electrode.

In still another aspect, the device comprises two or more needle arrays comprised of multiple needles each. In another example, the device comprises three or more needle arrays comprised of multiple needles each. In another example, the device comprises four or more needle arrays comprised of multiple needles each. In another example, the needle arrays are comprised of two or more needles each. In another example, the needle arrays are comprised of three or more needles each. In another example, the needle arrays are comprised of four or more needles each. In another example, the needle arrays are comprised of five or more needles each. In another example, the needle arrays are comprised of six or more needles each.

The present disclosure is directed to a device and method using at least two non-percutaneous electrodes mounted in contact with the skin of the dorsal aspect of a human or animal auricle and at least two non-percutaneous electrodes mounted in contact with the skin of the ventral aspect of the same auricle. Electrical stimulation signals are selectively applied to the electrodes to direct current flow in multiple directions through the auricle to effectuate trans-auricular, multi-directional peripheral nerve field stimulation within the auricle.

In some embodiments, the present disclosure provides a method for treating pain and/or discomfort in a patient in need of such treatment. The method comprises stimulating a cranial nerve with an electric signal. For example, the method may comprise administering to the patient a stimulator device that provides the electric signal. The device may be any device configured to electrically stimulate nerves near the patient's auricular area. The stimulating step can be administered prophylactically, or can be administered after the onset of the symptoms.

The methods described herein may be used for various therapeutic applications. In some embodiments, the methods are used to treat pain by providing, for example, analgesia. In still further embodiments, the methods are used to treat the symptoms associated with a functional abdominal pain disorder. In additional embodiments, the methods described herein are used to treat inflammation.

Several embodiments of the present disclosure are described by the following enumerated clauses and/or combination thereof:

1. A method for treating pain or discomfort in a patient comprising stimulating a cranial nerve with an electrical signal;
2. The method of clause 1, wherein the pain or discomfort is a functional abdominal pain disorder;
3. The method of clause 2, wherein the functional abdominal pain disorder is irritable bowel syndrome;
4. The method of any of the preceding clauses, wherein the cranial nerve is in an auricular area of the patient;
5. The method of any of the preceding clauses, wherein the cranial nerve is in a peri-auricular area of the patient;
6. The method of any of the preceding clauses, wherein stimulating the cranial nerve comprises contacting the auricular area of the patient with the electrical signal;
7. The method of any of the preceding clauses, wherein stimulating the cranial nerve comprises contacting the peri-auricular area of the patient with the electrical signal;
8. The method of any of the preceding clauses, wherein the cranial nerve is selected from the group consisting of cranial nerve V, cranial nerve VII, cranial nerve IX, cranial nerve X, and branches of greater and lesser occipital nerves thereof and their associated neurovascular bundles;
9. The method any of the preceding clauses, wherein the cranial nerve is selected from the group consisting of cranial nerve V, cranial nerve VII, cranial nerve IX, and cranial nerve X;
10. The method of any of the preceding clauses, further comprising administering a drug to the patient;
11. The method of clause 10, wherein the drug treats one or more of the symptoms associated with the disease;
12. The method of any of the preceding clauses, further comprising using transillumination to locate auricular neurovascular bundles of the patient;
13. The method of any of the preceding clauses, wherein the stimulating step occurs for about ten minutes to about one week;
14. The method of any of the preceding clauses, wherein the patient experiences a reduction in the pain or discomfort within one day;
15. The method of any of the preceding clauses, wherein the stimulating step comprises administering electrical stimulation pulses to the auricular area of the patient;
16. The method of clause 15, wherein the electrical simulation pulses have a voltage output of about 1V to about 5V;
17. The method of clause 15 or 16, wherein the electrical simulation pulses have a repetition frequency of about 0.5 Hz to about 100 Hz;
18. The method of any of clauses 15 to 17, wherein the electrical simulation pulses have a repetition frequency of about 1 Hz to about 10 Hz;
19. The method of any of clauses 15 to 18, wherein the electrical simulation pulses have a duty cycle of about 10% to about 90%;
20. The method of any of clauses 15 to 19, wherein the electrical simulation pulses have a duty cycle of about 40% to about 60%;
21. The method of any of clauses 15 to 20, wherein the stimulation pulses are generated at a constant current amplitude;
22. The method of any of the preceding clauses, wherein the stimulating step comprises attaching a stimulator device to the auricular area of the patient;
23. The method of any of the preceding clauses, wherein the stimulating step comprises attaching a stimulator device to the peri-auricular area of the patient;
24. The method of clause 22 or 23, wherein the stimulator device is attached percutaneously or transcutaneously;
25. The method of any of clauses 22 to 24, wherein the stimulator device comprises
(i) a generator for generating electrical stimulation pulses with defined stimulation parameters, (ii) a voltage supply for supplying the generator with electrical energy and (iii) a control device for generating stimulation pulses from the generator having a defined current voltage or current amplitude, a defined duration, a defined repetition frequency, and a defined duty cycle;
26. The method of any of the preceding clauses wherein at least one therapy electrode is connected to the stimulator for providing stimulation pulses to the auricular area;
27. The method of any of clauses 22 to 25, wherein the device is implanted within 2 mm the cranial nerve;
28. The method of any of the preceding clauses, wherein the stimulating step alters response characteristics of amygdala neurons;
29. The method of any of the preceding clauses, wherein the stimulating step alters response characteristics of lumbar spinal neurons;

30. The method of clause 1, wherein inflammation is involved in the pain or discomfort being treated;

31. The method of clause 1, wherein fibromyalgia is involved in the pain or discomfort.

32. An electrical stimulation device for use in treating abdominal pain or nausea in a patient.

In accordance with the present disclosure, the embodiments/aspects described above, or any combination thereof, are contemplated for combination with any of the embodiments/aspects described in the below Detailed Description section of this disclosure.

BRIEF DESCRIPTION OF THE DRAWINGS

This disclosure is illustrated by way of example and not by way of limitation in the accompanying Figures.

FIG. 1 is a side elevational view of an embodiment of a non-percutaneous trans-auricular nerve field stimulation device;

FIG. 2 is a cross-sectional view of the device of FIG. 1 as viewed along section lines 2-2;

FIG. 17 is a back side view of the electrode needle array of FIG. 14, according to one embodiment;

FIG. 18 is a front side view of the single therapy electrode and line of FIG. 15, according to one embodiment;

FIG. 19 is a right side view of the single therapy electrode and line in a cross section view along lines A-A of FIG. 18, according to one embodiment;

FIG. 20 is a front side view of the single therapy electrode and line of FIG. 15, according to one embodiment;

FIG. 21 is a right side view of the single therapy electrode and line in a cross section view taken along lines B-B of FIG. 20, according to one embodiment;

FIG. 22 is a right side detail view of the single therapy electrode of FIG. 21, according to one embodiment;

FIG. 23 is a top view of the single therapy electrode of FIG. 20 in cross section view taken along lines C-C, according to one embodiment;

DETAILED DESCRIPTION

Figure 3:
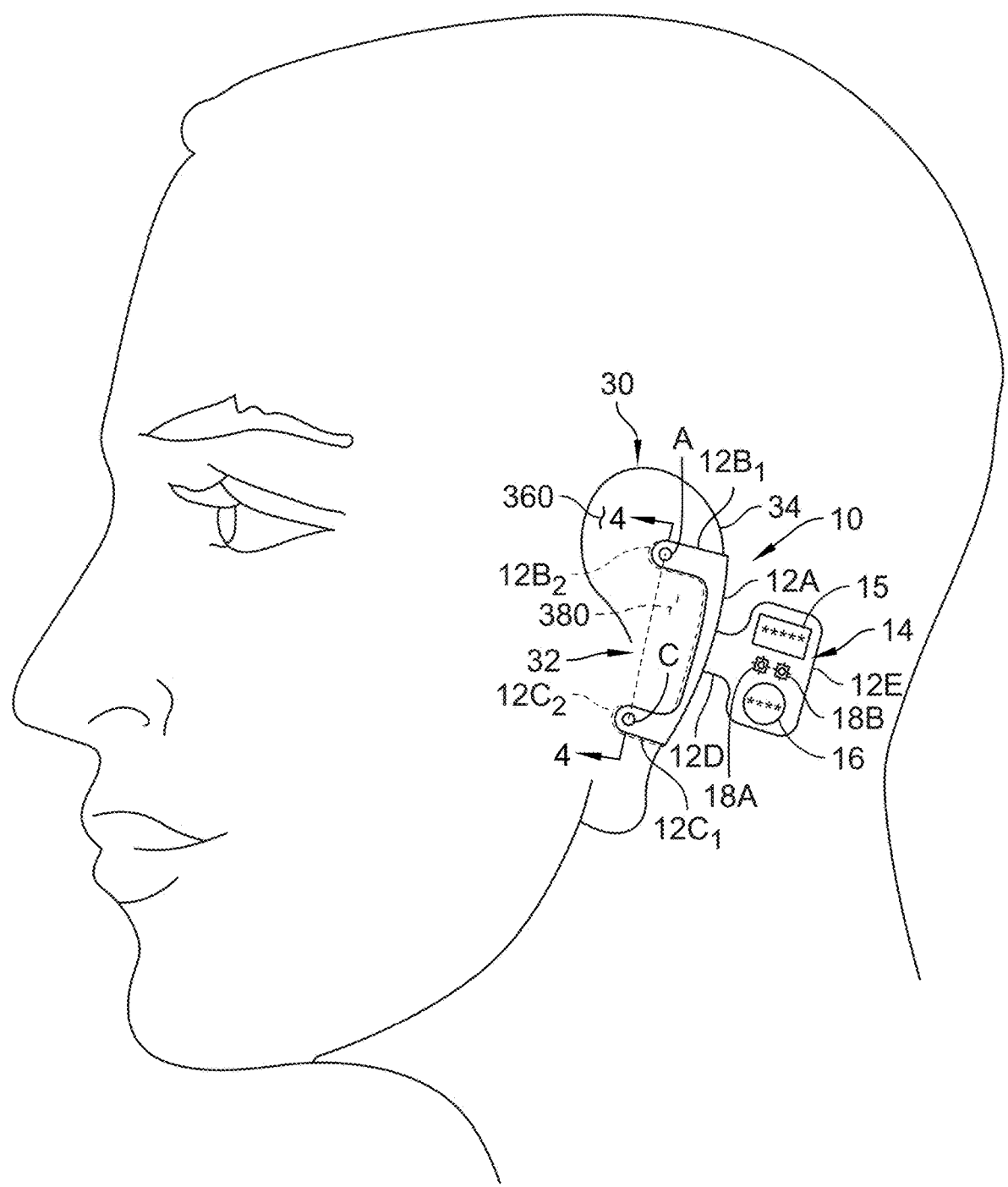
FIG. 3 is a side-elevational view of the device of FIGS. 1 and 2 mounted to ventral and dorsal aspects of an auricle of a human ear.

While the concepts of the present disclosure are susceptible to various modifications and alternative forms, specific exemplary embodiments thereof have been shown by way of example in the drawing and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases may or may not necessarily refer to the same embodiment. Further, when a particular feature, structure or characteristic is described in connection with an embodiment, it is submitted that it is within the knowledge of one skilled in the art to effect such feature, structure or characteristic in connection with other embodiments whether or not explicitly described. Further still, it is contemplated that any single feature, structure or characteristic disclosed herein may be combined with any one or more other disclosed feature, structure or characteristic, whether or not explicitly described, and that no limitations on the types and/or number of such combinations should therefore be inferred.

Definitions

For purposes of this disclosure, the following terms are defined. Like terms recited in the appended claims are to be interpreted consistently with the following terms:

Auricle—the visible portion of a human or animal hear residing outside of the human or animal head.

Dorsal aspect—rear surface of the auricle.

Ventral aspect—front surface of the auricle.

Coronal plane of the auricle—a plane dividing the auricle into the dorsal and ventral aspects.

Transverse plane of the auricle—a plane passing through the dorsal and ventral aspects of auricle, perpendicular to the coronal plane of the auricle, and dividing the auricle into top and bottom portions.

Trans-auricular—transversely through the auricle from the dorsal aspect to the ventral aspect and/or vice versa.

Trans-auricular current—current passing transversely through the auricle from the dorsal aspect to the ventral aspect and/or vice versa.

Non-percutaneous(ly) contact or contacting—physically contacting but not penetrating, piercing or otherwise breaking the skin.

Percutaneous insertion—penetrating or piercing the skin.

Interferential current—as between four electrodes placed on the auricle with two spaced apart along the ventral aspect and the remaining two spaced apart along the dorsal aspect, and with a current having a first frequency established diagonally through the auricle between one ventral electrode and a spaced apart one of the dorsal electrodes and another current having a second frequency established diagonally through the auricle between the other ventral electrode and the spaced apart other dorsal electrode, an interferential current in a space within the auricle intersected by the two currents has a frequency equal to the difference between the first and second frequencies.

The term "about" as used herein means greater or lesser than the value or range of values stated by 10 percent, but is not intended to designate any value or range of values to only this broader definition. Each value or range of values preceded by the term "about" is also intended to encompass the embodiment of the stated absolute value or range of values.

As used herein, the term "pharmaceutically acceptable carrier" includes any of the standard pharmaceutical carriers, such as a phosphate buffered saline solution, water, emulsions such as an oil/water or water/oil emulsion, and various types of wetting agents. The term also encompasses any of the agents approved by a regulatory agency of the US Federal government or listed in the US Pharmacopeia for use in animals, including humans.

As used herein the term "pharmaceutically acceptable salt" refers to salts of compounds that retain the biological activity of the parent compound.

As used herein "effective" refers to nontoxic but sufficient conditions to provide the desired effect. Conditions constituting "effective" will vary from subject to subject, depending on the age and general condition of the individual, mode of administration, and the like.

In accordance with the invention, "clinical benefit" means a response of a patient to treatment with a stimulating method described herein where the response includes overall reduction of pain, discomfort, and inflammation, or any combination thereof.

In accordance with the invention, the term "administering" as used herein includes all means of introducing the stimulating methods and devices described herein to the patient.

Referring to FIGS. 1-4, an embodiment is shown of a non-percutaneous trans-auricular nerve field stimulation device 10. It should be appreciated that the devices of the present disclosure, e.g. device 10, allows for a noninvasive external access to central pathways via electrical stimulation of the ear using percutaneuos electrical nerves field stimulation (PENFS). The external ear in both rats and humans contains branches of four cranial nerves (V, VII, IX, and X) that have projections to brainstem nuclei. The device 10 includes multiple non-percutaneous electrodes, e.g., A, B, C and D in the embodiment illustrated in FIGS. 1-4, and electrical circuitry, e.g., circuitry 14 illustrated in FIGS. 1 and 3, for generating electrical stimulation signals and supplying the generated electrical stimulation signals to the electrodes. The electrodes are non-percutaneous in that they are configured to be positioned in contact the surface of the skin but not to pierce, penetrate or otherwise break through the surface of the skin, and electrical circuitry for generating and applying electrical stimulation signals to the electrodes. The electrodes are also electrically conductive and serve to deliver the electrical stimulation signals to the tissues within the auricle via contact with the skin surfaces of the ventral and dorsal aspects of the auricle as will be described in greater detail below. In one example embodiment, the electrodes are provided in the form of a low-resistance, high electrical conductivity, high-density silicone connecters such as those commercially available from Fujipoly America Corp. of Carteret, N.J. under the trade name ZEBRA® Elastomeric Electronic Connectors. In alternate embodiments, one or more of the electrodes may be provided in the form of rigid, semi-rigid or flexible electrodes made from or including one or more electrically conductive materials, examples of which include, but are not limited to, copper, aluminum, gold, silver, platinum, palladium, beryllium, nickel, tungsten, titanium, stainless steel, or the like. In some embodiments, the material(s) used to form the electrodes may be restricted, for example, to omit or minimize common allergy-causing materials such as nickel. In some embodiments, low-resistance contact between one or more of the electrodes A, B, C, D and the skin of the auricle 30 may be enhanced by providing conventional electrically conductive gel or other electrically conductive substance on the skin of the auricle 30 and/or on the surface(s) of one or more of the electrodes A, B, C, D prior to making contact between the electrodes and the auricle 30.

In some embodiments, the electrodes, e.g., A, B, C and D depicted in FIGS. 1-4, and the electrical circuitry, e.g., 14 depicted in FIGS. 1 and 3, are mounted to or otherwise carried by a flexible (or semi-flexible) carrier 12 configured to be operatively attached to an auricle of a human or animal. In the illustrated embodiment, the flexible carrier 12 is specifically shaped for operative attachment to an auricle 30 of a human, although it will be understood that alternative shapes for attachment to human ears and/or other shapes specific to one or more animal ears are intended to fall within the scope of this disclosure. In the embodiment illustrated in FIGS. 1 and 3, the flexible carrier 12 illustratively includes an elongated main body portion 12A which is sized and configured to extend longitudinally along at least a portion of a helix 34 of an auricle 30 of a human ear 32 and to wrap transversely at least partially about that portion of the helix 34 as illustrated most clearly in FIG. 3.

An upper wing member 12B is defined at an upper or top end of the elongated main body 12A and a lower wing member 12C is defined at a lower end of body 12A. The upper wing member 12B is sized to extend over at least a first portion of the ventral aspect 360 of the auricle 30 and to extend over at least a first portion of the dorsal aspect 380. In this regard, the upper wing member 12B includes a first wing $12B_1$ which extends transversely away from the corresponding upper end of the main body 12A in one direction, e.g., a forward direction, and a second wing $12B_2$ extending transversely away from the corresponding upper end of the main body 12A in an opposite direction, e.g., a rearward direction. The first wing $12B_1$ is configured to extend over and attach to the first portion of the ventral aspect 360, and the second wing $12B_2$ is configured to extend over and attach to the first portion of the dorsal aspect 380, with the upper wing member 12B wrapped around the helix 34 and attached to the helix 34 between the first and second wings $12B_1$, $12B_2$ as illustrated in FIG. 3.

One of the electrodes A is illustratively mounted to the first wing $12B_1$ and another of the electrodes B is mounted to the second wing $12B_2$. At least a portion of the electrode A is exposed at the bottom surface of the first wing $12B_1$, as illustrated by example in FIG. 2, such that the electrode A contacts, and remains in contact with, the skin of the first portion of the ventral aspect 360 of the auricle 30 when the upper wing 12B is attached to the first portion of the ventral aspect 360 of the auricle 30. Likewise, at least a portion of the electrode B is exposed at the bottom surface of the second wing $12B_2$ such that the electrode B contacts, and remains in contact with, the skin of the first portion of the dorsal aspect 380 of the auricle 30 when the upper wing 12B is attached to the first portion of the dorsal aspect 380 of the auricle 30. It is to be understood that the first portion of the ventral aspect 360 to which the electrode A makes contact may be or include any portion of the ventral aspect 360 including, but not limited to, the scapha, the antihelical fold, the antihelix, the upper crus of the antihelix, the lower crus of the antihelix, the triangular fossa, the concha, the crux of the helix and the concha and the concha cava, as these anatomical terms are generally understood. The first portion of the dorsal aspect 380 to which the electrode B makes contact may be or include any portion of the dorsal aspect 380 that is generally opposite (transversely) the portion of the ventral aspect 360 to which the electrode A is disposed in contact.

A lower wing member 12C is defined at a lower or bottom end of the elongated main body 12A opposite the upper or top end of the main body 12A. The lower wing member 12C is sized to extend over at least a second portion of the ventral aspect 360 of the auricle 30 and to extend over at least a second portion of the dorsal aspect 380. In this regard, the lower wing member 12C includes a first wing $12C_1$ which extends transversely away from the corresponding lower end of the main body 12A in the same direction as that of the first wing $12B_1$ of the upper wing member 12B, and a second wing $12C_2$ extending transversely away from the corresponding lower end of the main body 12A in an opposite direction, i.e., in the same direction as that of the second wing $12B_2$ of the upper wing member 12B.

The first wing $12B_1$ is configured to extend over and attach to the first portion of the ventral aspect 360, and the second wing $12B_2$ is configured to extend over and attach to the first portion of the dorsal aspect 380, with the upper wing member 12B wrapped around the helix 34 and attached to the helix 34 between the first and second wings $12B_1$, $12B_2$ as illustrated in FIG. 3. The electrode C is illustratively mounted to the first wing $12C_1$ and the electrode D is mounted to the second wing $12C_2$. At least a portion of the electrode C is exposed at the bottom surface of the first wing $12C_1$ such that the electrode C contacts, and remains in contact with, the skin of the second portion of the ventral aspect 360 of the auricle 30 when the lower wing 12C is attached to the second portion of the ventral aspect 360 of the auricle 30. Likewise, at least a portion of the electrode D is exposed at the bottom surface of the second wing $12C_2$ such that the electrode D contacts, and remains in contact with, the skin of the second portion of the dorsal aspect 380 of the auricle 30 when the lower wing 12C is attached to the second portion of the dorsal aspect 380 of the auricle 30. The second portion of the ventral aspect 360 to which the electrode C makes contact may be or include any portion of the ventral aspect 360 below that to which the electrode A makes contact. Depending upon the area of the ventral aspect 360 to which the electrode A makes contact, which may illustratively vary from application to application, may be or include any suitable remaining portion of the ventral aspect 360 including, but not limited to, the scapha, the antihelical fold, the antihelix, the upper crus of the antihelix, the lower crus of the antihelix, the triangular fossa, the concha, the crux of the helix, the concha and the concha cava. The second portion of the dorsal aspect 380 to which the electrode D makes contact may be or include any portion of the dorsal aspect 380 that is generally opposite (transversely) the portion of the ventral aspect 360 to which the electrode D is disposed in contact.

The carrier 12 further includes an electrical circuit mounting portion 12E to which electrical circuitry 14 is mounted, as will be described in detail below, and a circuit extension member 12D between the main body 12A and the electrical circuit mounting portion 12E. Illustratively, the circuit extension member 12D extends rearwardly from a portion the main body 12A between the upper and lower wing members 12B, 12C, e.g., in the same directions as the wings 12B$_2$ and 12C$_2$, and the electrical circuit mounting portion 12E is thus likewise rearward relative to the main body 12A. In alternate embodiments, the electrical circuit mounting portion 12E may extend from other portions of the main body 12A. In any case, a number, M, of electrical conductors extend along the various portions of the carrier 12 to electrically connect each of the electrodes A, B, C and D to the electrical circuitry 14. M may be any positive integer. In some embodiments, one or more, or all, of the electrical conductors are embedded within the carrier 12, and in other embodiments one or more, or all, of the electrical conductors are attached to the top or bottom surface of the carrier 12.

As illustrated by example in FIG. 2, an adhesive layer 21 may cover all or one or more portions of the bottom surface of the carrier 12 for the purpose of attaching, e.g., affixing, the carrier 12 to the auricle 30 as illustrated in FIG. 3 and described above. In some such embodiments, a removable layer 23, such as paper or other such layer, may cover the adhesive layer 21 to protect the adhesive layer 21 prior to application. The removable layer 23, in embodiments which include it, is to be removed prior to attachment of the carrier 12 to the auricle 30 as illustrated in FIG. 3. It will be appreciated that the adhesive layer 21 illustrated in FIG. 2 represents only one example structure and technique for attaching the flexible carrier 12 to the auricle 30, and that this disclosure contemplates alternatively or additionally using one or more other conventional structures and techniques for attaching, affixing, mounting or otherwise securing the flexible carrier 12 to the auricle 30. In one example embodiment, the carrier 12 is provided in the form of a woven fabric material, although this disclosure contemplates alternate embodiments in which the carrier 12 may be or include, but should not be limited to, a non-woven fabric, one or more other woven or non-woven textiles, latex or one or more suitable plastic materials such as polyvinylchloride (PVC), polyethylene, and/or polyurethane.

Referring now specifically to FIG. 1, the electrical circuitry 14 mounted to or otherwise carried by the electrical circuit mounting portion 12E of the carrier 12 illustratively includes signal generation circuitry 15 and at least one power source 16 electrically connected to the signal generation circuitry 14 via at least one corresponding electrical conductor 17. In some embodiments, the electrical circuitry 14 further illustratively includes a number, N, of voltage adjustment switches 18$_1$-18$_N$, electrically connected to the signal generation circuitry 14 via a corresponding number, N, of electrical conductors 19$_1$-19$_N$, where N may be any positive integer. The signal generation circuitry 15 is configured and operable, as will be described in greater detail below, to selectively apply electrical stimulation signals to one or more of the electrodes A, B, C, D to cause one or more trans-auricular currents to flow through the tissue of the auricle 30 between one or more of the electrodes A, B in contact with the ventral aspect 360 and one or more of the electrodes C, D in contact with the dorsal aspect 380 so as to stimulate one or more auricular nerve fields within the auricle 30.

As further illustrated in FIG. 1, an embodiment of the signal generation circuitry 15 illustratively includes at least one control circuit 400 electrically coupled to the at least one power source 16 and to any number, N, conventional gating circuits 46$_1$-46$_N$, wherein N may be any positive integer as described above. In one embodiment, the at least one control circuit 400 is illustratively provided in the form of at least one conventional processor or controller 42 communicatively coupled to a conventional memory 47, wherein the memory 47 has instructions, i.e., one or more programs, stored therein which, when executed by the processor or controller 42, cause the processor or controller 42 to generate electrical stimulation control signals which are provided to the one or more gating circuits 46$_1$-46$_N$. The one or more gating circuits 46$_1$-46$_N$ is/are, in turn, responsive to the electrical stimulation control signals produced by the processor or controller 42 to produce the electrical stimulation signals to be applied to one or more of the electrodes A, B, C, D using electrical power produced by the at least one power source 16. In alternate embodiments, the at least one control circuit 400 may be provided in other forms such as one or a combination of analog and/or digital hardware circuits.

The one or more gating circuits 46$_1$-46$_N$ are illustratively controlled by the at least one control circuit 400 to selectively apply voltages to one or more of the electrodes A, B, C, D as will be described in greater detail below. In some embodiments, the at least one control circuit 400 may include the one or more gating circuits 46$_1$-46$_N$. In some embodiments, one or more voltage adjustment switches 18$_1$-18$_N$, e.g., one for each gating circuit, is/are provided to allow adjustment of the maximum and/or minimum voltage(s) produced by the gating circuits. Illustratively, such gating circuit(s), in embodiments which include it/them, may be provided in the form of conventional pressure sensitive voltage adjustment switches, although other conventional voltage adjustment switches or actuators may alternatively be used. In any case, one or more of the voltage adjustment switches 18$_1$-18$_N$ may be configured and/or modified in one embodiment so as to be adjusted only during manufacturing and/or subsequent testing, and in other embodiments one or more of the voltage adjustment switches 18$_1$-18$_N$ may be configured and/or modified so as to be adjustable by the user and/or person(s) assisting the user.

In the embodiment illustrated in FIG. 1, a single power source 16 is shown mounted to or otherwise carried by the carrier 12. In one embodiment, the power source 16 is a DC power source, e.g., illustratively provided in the form of a conventional battery. In other embodiments, the power source 16 may be or include one or more other conventional AC and/or DC voltage and/or current sources or storage devices. In some embodiments, two or more power sources 16 of any type may be included. In embodiments which include only a single power source 16 as shown, the single power source 16 supplies electrical power to all electrical power consuming circuits including the one or more gating circuits $18_1$-$18_N$. In some embodiments which include two or more such gating circuits, the signal generation circuitry 14 may be configured such that all such gating circuits illustratively share a common electrical power reference potential, e.g., ground reference. In other embodiments which include two or more gating circuits, the signal generation circuitry 14 may be configured such that the electrical power references of at least two of the gating circuits are decoupled from one another. In any case, the circuit components of the signal generation circuitry 15 is/are illustratively operable, e.g., programmed, electrically interconnected and/or otherwise configured, to control one or more attributes of one or more of the electrical stimulation signals provided to one or more of the electrodes A, B, C, D. Examples of such attributes may be or include, but should not be limited to, switching frequency, duty cycle, signal duration, pause time between signal applications, maximum and/or minimum voltage level, maximum and/or minimum current level, polarity of voltage applied across two or more of the electrodes, signal sequence application duration and overall therapy duration in which at least one electrical stimulation signal is produced.

Figure 4:
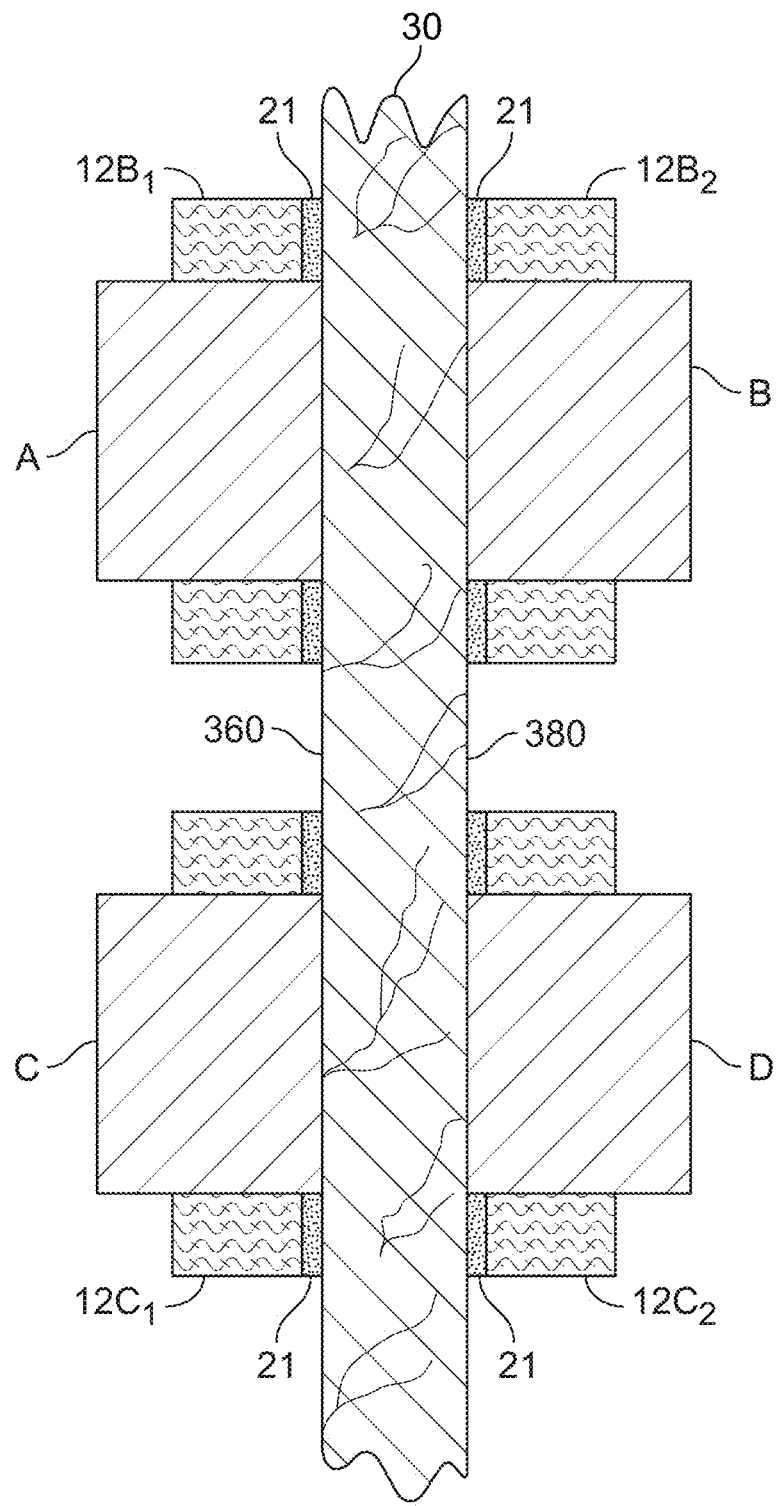
FIG. 4 is a cross-sectional view of the device illustrated in FIG. 3 as viewed along section lines 4-4.

Referring now to FIG. 4, a cross-sectional diagram is shown as viewed along section lines 4-4 of FIG. 3. As illustrated in FIG. 4, the carrier 12 is attached to the auricle 30, e.g., via an adhesive layer 21, such that the electrodes A and C are in contact with the skin surface of the ventral aspect 360 of the auricle 30 and are spaced apart from one another along the ventral aspect 360, and such that the electrodes B and D are similarly in contact with the skin surface of the dorsal aspect 380 of the auricle 30 and are spaced apart from one another along the dorsal aspect 380. The electrode B is illustratively aligned with the electrode A and the electrode D is illustratively aligned with the electrode C. The illustrated arrangement is preferred but not strictly required as, in practice, the electrodes A, B and or the electrodes C, D may be somewhat offset relative to one another. In either case, the electrodes A, B, C, D are arranged to be responsive to electrical stimulation signals supplied thereto to cause trans-auricular current to flow through the auricle 30, in either direction, between electrodes A and B, between electrodes C and D, between electrodes A and D and between electrodes B and C. As will be described in greater detail below, the electrical stimulation signals may be controlled to cause only one such trans-auricular current to flow through the auricle 30 at any one time, to cause any combination of such trans-auricular currents to simultaneously flow through the auricle 30 and/or to cause a sequence of any such trans-auricular current(s) to flow through the auricle 30 over time and/or a sequence of times.

Figure 5:
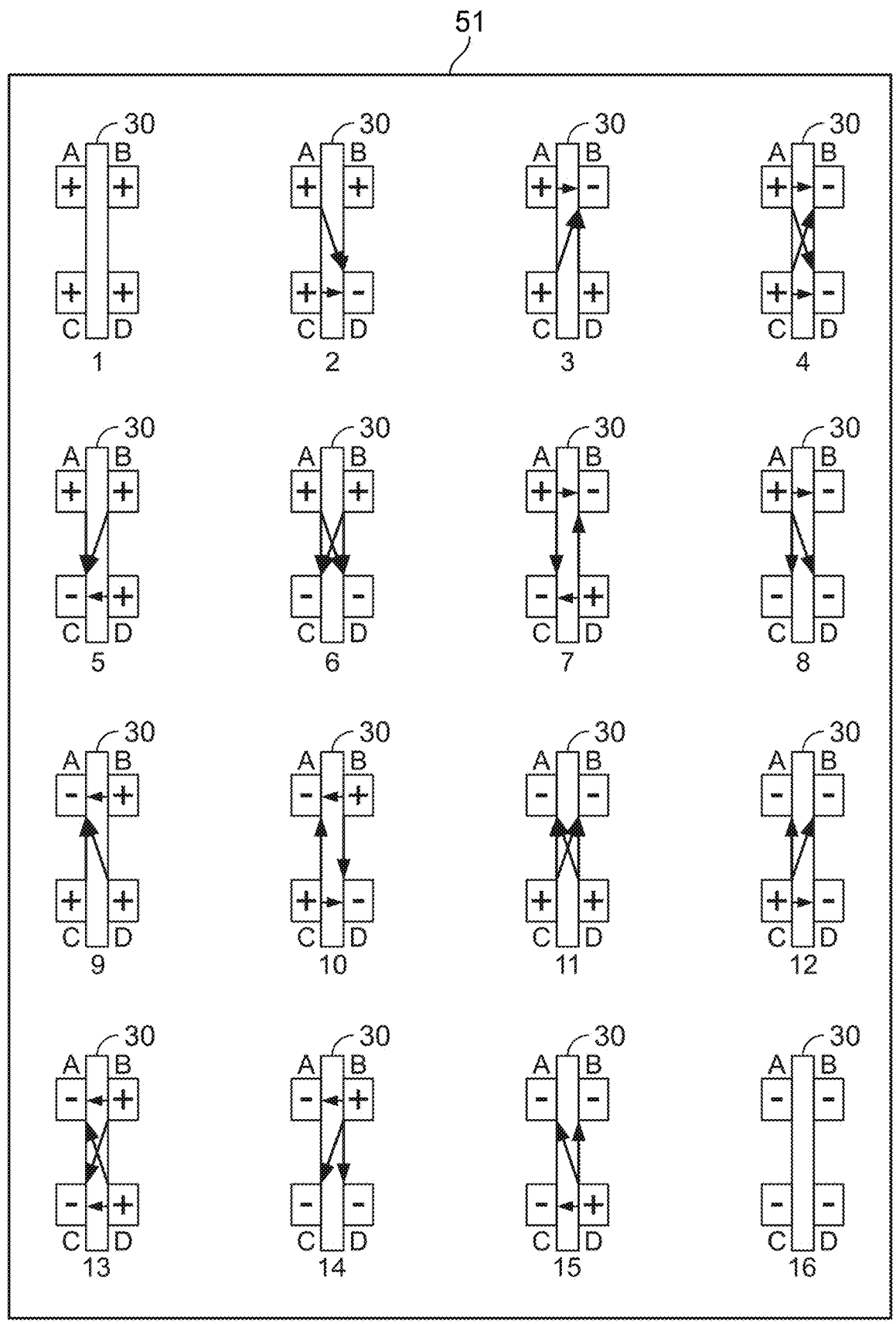
FIG. 5 is a table illustrating the possible combinations of trans-auricular current flow between the four electrodes of the device illustrated in FIGS. 1-4 using a single voltage gating circuit or multiple voltage gating circuits with common ground references.

Referring now to FIG. 5, a table 51 is shown of all possible voltage polarity combinations that could be applied to the electrodes A, B, C, D using at least one DC voltage source 16. As there are four such electrodes A, B, C, D, there are $2^4=16$ possible combinations. Indeed, in embodiments which include K electrodes, where K is any positive, and typically even, integer, the total number of possible voltage polarity combinations that could be applied to such electrodes is 2K. The arrow-tipped lines represent the directions of current flow through the auricle 30 in response to the applied voltages. It is evident from these depictions that the voltages applied to the electrodes A, B, C, D are applied simultaneously, and are physically applied either by a single gating circuit 46 or by multiple gating circuits sharing a common electrical power source reference. Only polarity combinations 1 and 16 fail to produce current flow, and the remaining combinations result in current flow through the auricle 30 in a direction parallel to the transverse plane of the auricle 30, e.g., the two through-currents depicted in polarity combination 7, current flow through the auricle 30 diagonally between electrodes A, D and/or B, C, e.g., the two diagonal currents depicted in polarity combination 6, and/or current flow along the skin, and at least partially into the auricle tissue, of the ventral aspect 360 and/or the dorsal aspect 380, e.g., the current flowing between electrodes A and C along the skin surface of the ventral aspect 360 and the current flowing between electrodes D and B along the skin surface of the dorsal aspect 380, as depicted in polarity combination 7.

Figure 6:
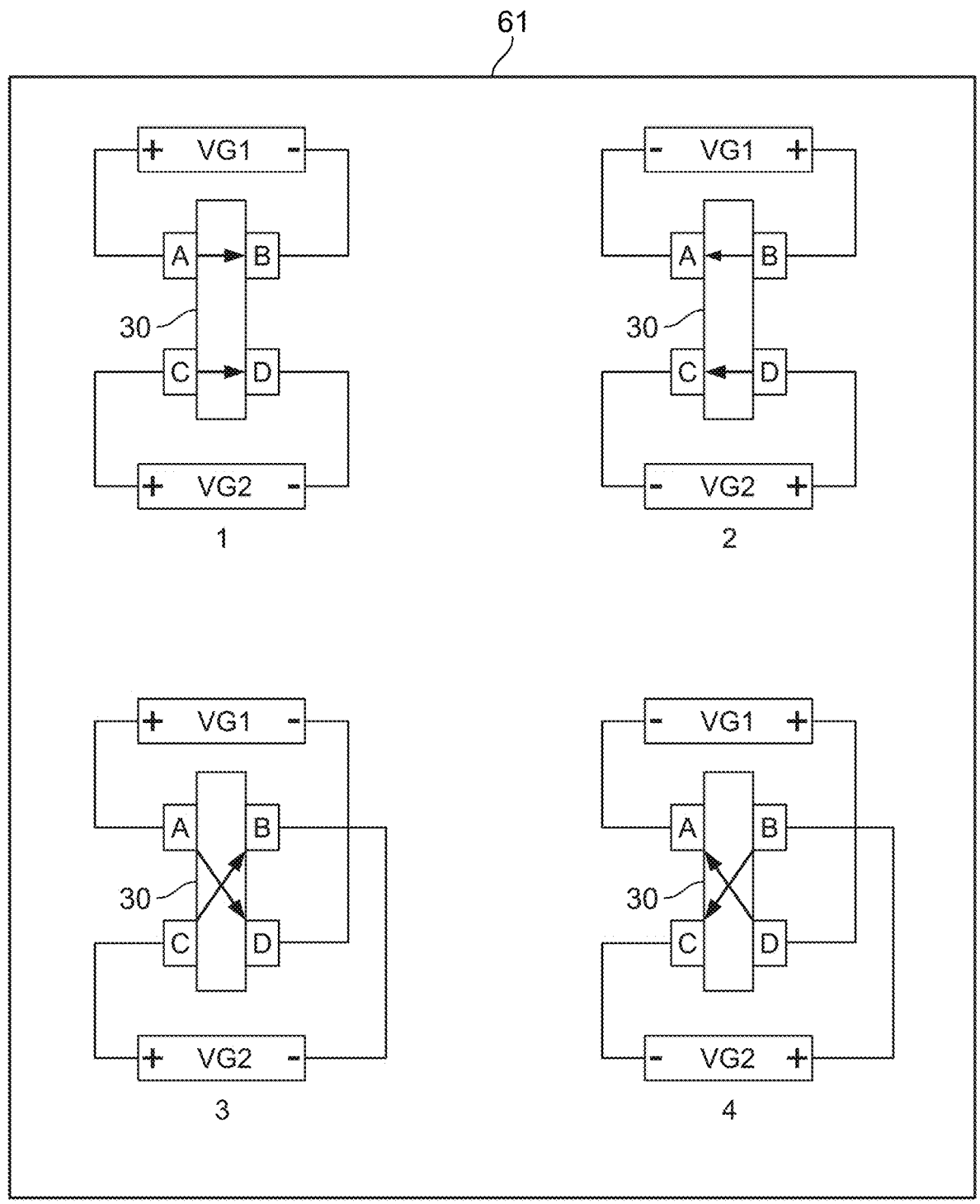
FIG. 6 is another table illustrating some of the possible combinations of trans-auricular current flow between the four electrodes of the device illustrated in FIGS. 1-4 using two voltage gating circuits with decoupled ground references.

As described above, it is also possible to decouple the power source references of two or more gating circuits which apply electrical stimulation pulses to the electrodes A, B, C, D. Such an arrangement effectively modifies the current flow possibilities depicted in FIG. 5 by directing current flow only between specifically paired ones of the electrodes A, B, C, D. Referring to FIG. 6, for example, a table 61 is shown depicting four possible trans-auricular current flow scenarios using two reference (ground) decoupled gating circuits VG1 and VG2. In gating combination 1, a positive voltage is applied by VG1 between electrodes A and B, and a separate (i.e., decoupled) positive voltage is simultaneously applied by VG2 between electrodes C and D. The result is the simultaneous flow of a first trans-auricular current through the auricle 30 from electrode A toward electrode B, and a second trans-auricular current through the auricle 30 from electrode C toward electrode D. Both such currents flow in a direction that is parallel to the physiological transverse plane of the auricle 30. In gating combination 2, the polarities of the VG1 and VG2 are reversed, resulting in the flow of the same first and second trans-auricular currents but in the opposite direction as those depicted in gating combination 1.

In gating combination 3, a positive voltage is applied by VG1 between electrodes A and D, and a separate (i.e., decoupled) positive voltage is simultaneously applied by VG2 between electrodes C and B. The result is the simultaneous flow of a third trans-auricular current through the auricle 30 from electrode A toward electrode D, and a fourth trans-auricular current through the auricle 30 from electrode C toward electrode B. The third trans-auricular current flows through the auricle 30 in a downward diagonal direction between electrodes A and D and the fourth trans-auricular current flows through the auricle 30 in a downward diagonal direction between the electrodes C and B. In gating combination 4, the polarities of the VG1 and VG2 are reversed, resulting in the flow of the same third and fourth trans-auricular currents but each in opposite directions as those depicted in gating combination 3.

As is evident from FIGS. 5 and 6, various trans-auricular current flows can be established by controllably and selectively pairing the electrodes A and C contacting the ventral aspect 360 of the auricle 30 with different ones of the electrodes B and D contacting the dorsal aspect 380, and then further controlling the polarities of the applied voltages to control trans-auricular current flow direction. Using the gating combinations illustrated in FIG. 6 as one example, VG1 and VG2 are set in gating combinations 1 and 2 to a first pairing in which electrode A is paired with electrode B and in which electrode C is paired with electrode D. In gating combinations 3 and 4, VG1 and VG2 are set to a second pairing in which electrode A is paired with electrode D and in which electrode B is paired with electrode C. Electrical stimulation signals generated by the electrical circuitry 14 are then applied to the different pairings, e.g., one pairing after the other to cause a first set of trans-auricular currents to flow through auricle 30, e.g., using gating combinations 1 and/or 2, and to then cause a second set of trans-auricular currents to flow through the auricle 30, e.g., using gating combinations 3 and/or 4. Such applications of the electrical generation signals can be applied sequentially, i.e., such that one set of trans-auricular current flows but not the other and then vice versa, or simultaneously using gating circuits that share a common reference potential, e.g., ground reference, as illustrated in FIG. 5, or using gating circuits having decoupled references, e.g., ground references, as illustrated in FIG. 6.

It should be apparent from the foregoing description that the electrical circuit 14 may be programmed or otherwise configured to selectively apply electrical stimulation signals, e.g., in the form of voltage or voltage differentials, to various combinations of the electrodes A, B, C, D, simultaneously and/or sequentially and with any desired signal attributes as described above, for the purpose of causing corresponding trans-auricular currents to flow through the auricle 30 to provide therapy by stimulating at least one auricular nerve field within the auricle 30. One example sequence of such electrical stimulation signals for providing auricular nerve field stimulation is the following, although those skilled in the art will recognize that this sequence represents only one of many different possible therapy approaches that may be implemented using the device 10. It will be understood that all such different therapy approaches implementable using the device 10 are intended to fall within the scope of this disclosure. In any case, the following example sequence will assume the use of two ground reference-decoupled gating circuits controllable to selectively apply voltages and voltage differentials to the electrodes A, B, C, D as illustrated in FIG. 6.

Example Therapy Sequence

The following pattern of items 1-16 is illustratively repeated sequentially for P time units with a rest or pause time between each repeated pattern (in which no electrical stimulation signals are applied) of Q time units. The total therapy time is R time units.

1. Apply S volts according to combination 1 at T hertz for U time units.
2. Rest or pause V time units.
3. Apply S volts according to combination 2 at T hertz for U time units.
4. Rest or pause V time units.
5. Apply S volts according to combination 1 at W hertz for U time units.
6. Rest or pause V time units.
7. Apply S volts according to combination 2 at W hertz for U time units.
8. Rest or pause V time units.
9. Apply S volts according to combination 3 at T hertz for U time units.
10. Rest or pause V time units.
11. Apply S volts according to combination 4 at T hertz for U time units.
12. Rest or pause V time units.
13. Apply S volts according to combination 3 at W hertz for U time units.
14. Rest or pause V time units.
15. Apply S volts according to combination 4 at W hertz for U time units.
16. Rest or pause V time units.
17. Example values of variables P-W are the following, although it will be understood that in other implementations one or more of P-W may take on different values:

P=15 minutes.
Q=1 minute.
R=72 hours.
S=4.2 volts.
T=1 Hz.
U=1 millisecond.
V=2000 milliseconds.
W=10 Hz.

It will be further understood that in some embodiments one or more of the items 1-16 may be omitted and/or executed at a different point in the pattern, such that the sequential pattern may include any combination of any of items 1-16 executed in any order. In some alternate embodiments, the voltage applied between electrodes A and D in any or all of steps 9, 11, 13 and 15 may have a different frequency than the voltage applied between electrodes B and C so as to establish an interferential current in a space within the auricle 30 intersected by the two currents flowing between the pairs A, D and B, C of the four electrodes A, B, C and D.

Figure 7:
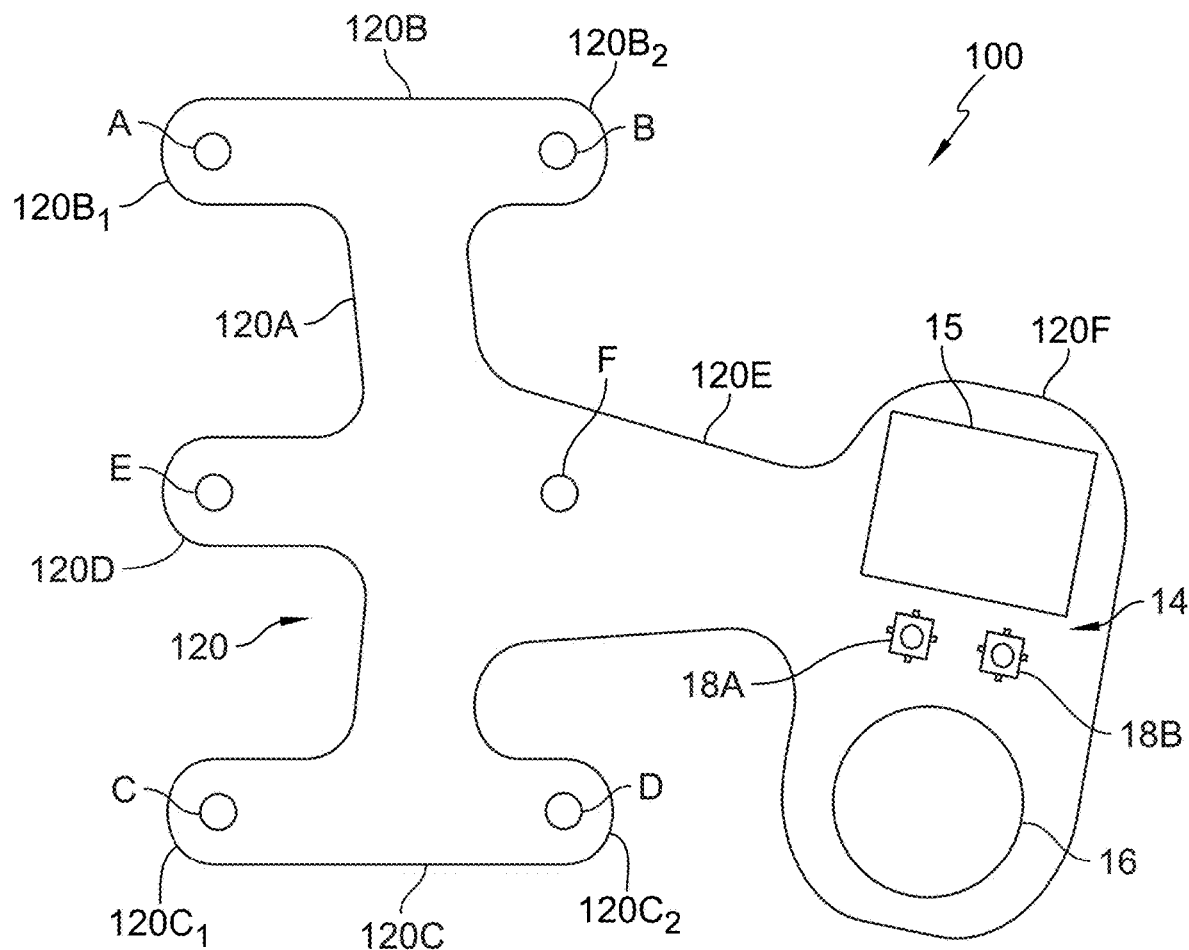
FIG. 7 is a side elevational view of another embodiment of a non-percutaneous trans-auricular nerve field stimulation device.
Figure 8:
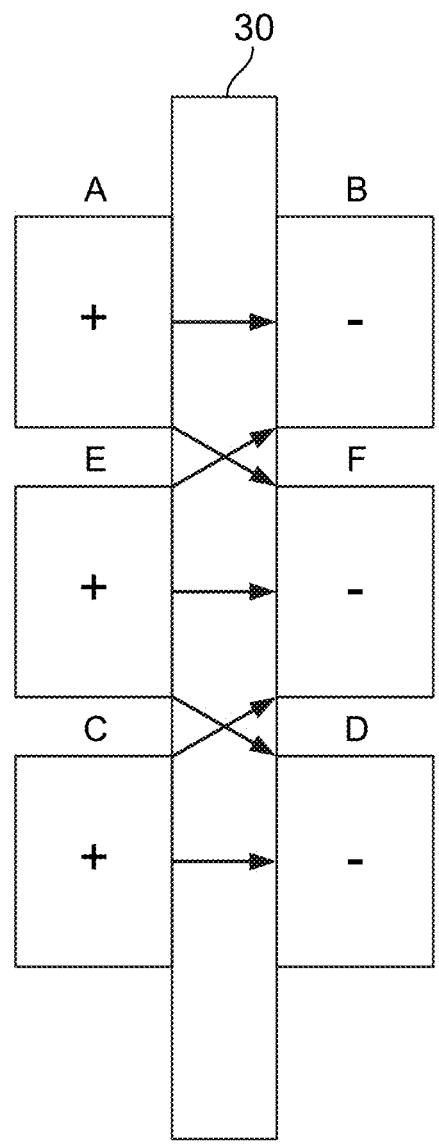
FIG. 8 is a simplified diagram illustrating one example trans-auricular current flow between the six electrodes of the device illustrated in FIG. 7 using voltage gating circuits with common ground references.

The above described embodiment of the non-percutaneous trans-auricular nerve field stimulation device 10 is illustrated in FIGS. 1-6 and described above as including four electrodes A, B, C, D with two electrodes in spaced-apart contact with the ventral aspect 360 of the auricle 30 and with the remaining two electrodes in spaced-apart contact with the dorsal aspect 380. It will be understood, however, that no limit on the total number of electrodes and/or electrode pairs is intended or should be inferred. In this regard, another embodiment of a non-percutaneous trans-auricular nerve field stimulation device 100 is illustrated in FIGS. 7 and 8 which includes a total of 6 electrodes A-F with three of the electrodes A, E and C in spaced-apart contact with the ventral aspect 360 of the auricle 30 and with the remaining three electrodes B, F and D in spaced-apart contact with the dorsal aspect 380. The carrier 120, like the carrier 12 illustrated in FIGS. 1-3, includes a main body 120A, an upper wing member 120B defining first and second wings $120B_1$ and $120B_2$ to which the electrodes A and B are respectively mounted, a lower wing member 120C defining first and second wings $120C_1$ and $120C_2$ to which the electrodes C and D are respectively mounted, an electrical circuit mounting portion 120F to which the electrical circuitry 14 is mounted and a circuit extension member 120E between the main body 120A and the electrical circuit mounting portion 120F. Unlike the carrier 12 illustrated in FIGS. 1-3, the carrier 120 further includes a middle wing 120D extending transversely away from the main body between, and in the same direction as, the wings $120B_1$ and $120B_2$. The electrode E is mounted to the middle wing 120D and the electrode F is mounted to the circuit extension member 120F. In the illustrated embodiment, the electrodes A, E and C are respectively aligned with one another transversely about an imaginary longitudinal line bisecting the main body 120A, although it will be understood that such alignment is not strictly required as other possible locations of the electrodes relative to the carrier 120 are contemplated.

With the illustrated electrode arrangement, a total of $2^6=64$ possible combinations of current flow combinations can be realized via selective application of voltage potentials to and between various ones of the electrodes A-F, and in this regard one example combination is illustrated in FIG. 8. As with the device 10 illustrated in FIGS. 1-6, the electrical circuitry 14 may include one or more gating circuits. If multiple gating circuits are included, two or more such gating circuits may share a common reference potential, e.g., ground reference, and/or two or more gating circuits may have decoupled references, e.g., decoupled ground references.

The embodiments of the auricular nerve field stimulation device 10 and 100 illustrated in FIGS. 1-6 and 7-8 respectively include four or more non-percutaneous electrodes spaced apart from one another in trans-auricular pairs as described above. Another embodiment replaces at least one of the multiple non-percutaneous, trans-auricular electrode pairs with hybrid, trans-auricular electrode pairs each having at least one non-percutaneously contacting electrode and at least one needle electrode for percutaneous insertion into the auricle 30 of the ear 32. An embodiment of such a hybrid electrode is illustrated in FIGS. 9A and 9B in the form of a hybrid electrode assembly 200.

Figure 9A:
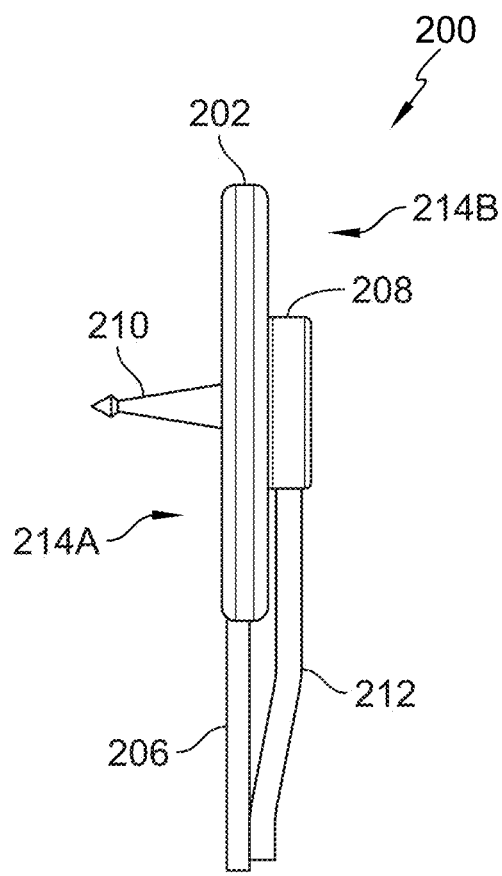
FIG. 9A is a side elevational view of an embodiment of a hybrid electrode assembly having a non-percutaneous electrode surrounding a percutaneously insertable needle electrode.
Figure 9B:
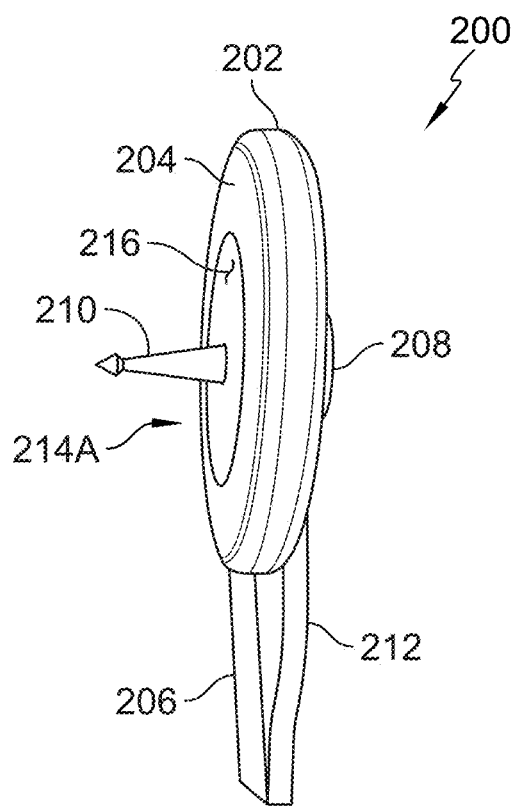
FIG. 9B is a perspective view of the hybrid electrode assembly of FIG. 9A.

Referring to FIGS. 9A and 9B, the hybrid electrode assembly 200 includes an electrically non-conductive (i.e., electrically insulating) housing 202 in the form of a generally circular disk having a generally planar surface 214A upon which an electrically conductive ring 204 is formed or attached in a conventional manner, and into which an insulated electrical conductor 206 extends into electrical contact, i.e., attachment, with the ring 204. In the illustrated embodiment, the ring 204 circumscribes the housing 202, although in alternate embodiments the ring 204 may be segmented into two or more pieces each electrically connected to the conductor 206. An outer periphery of the ring 204 is illustratively adjacent to an outer periphery of the circular housing 202, although in alternate embodiments the outer periphery of the ring 204 may be inboard of the outer periphery of the housing 202 such that at least a portion of the surface 214A of the housing 202 extends beyond the outer periphery of the ring 204. In one example implementation, which should not be considered to be limiting in any way, the circular housing 202 has a height or thickness of about 2 millimeters (mm) and a diameter of about 3 mm, although in alternate implementations the height or thickness may be more or less than 2 mm and/or the diameter may be more or less than 3 mm. Moreover, it will be understood that the circular disk configuration of the housing 202 illustrated in FIGS. 9A and 9B is provided only by way of illustration, and that in alternate embodiments the housing 202 may have other shapes or configurations.

A needle housing 208, also illustratively in the form of a generally circular disk, is coupled to a surface 214B of the housing 202 opposite the surface 214A. In one embodiment, the needle housing 208 is separate from the housing 202 and is attached or affixed thereto in a conventional manner, although alternate embodiments are contemplated in which the needle housing 208 is integral with the housing 202 such that the housings 202 and 208 are of unitary construction. In any case, an insulated electrical conductor 212 extends into the needle housing 208 and is electrical connected to an electrically conductive needle or needle electrode 210 carried by the needle housing 208. The needle or needle electrode 210 extends from the needle housing 208 and centrally through the housing 202 such that a portion of the needle 210 extends outwardly away from the surface 214A of the housing 202. As best shown in FIG. 9B, an inner periphery of the electrically conductive ring 204 surrounds the needle electrode 210 with the needle electrode 210 spaced apart from the ring 204 by a ring-shaped portion 216 of the surface 214A of the housing 202. The electrically conductive needle electrode 210 is thus electrically isolated from the electrically conductive ring 204 by the housings 202 and 218, and the electrical conductors 206, 212 are independent from one another with each attached to a respective one of the ring 204 and the needle electrode 210. In the illustrated embodiment, the hybrid electrode assembly 202 carries a single needle electrode 210, although in alternate embodiments the needle electrode 210 may be augmented with one or more additional needle electrodes each electrically connected to the electrical conductor 212.

In some embodiments, at least one trans-auricular pair of non-percutaneous electrodes illustrated in FIGS. 1-8 may be replaced by a pair of the hybrid electrode assemblies 200 likewise placed in a trans-auricular relationship relative to one another with the needle electrodes 210 thereof percutaneously inserted into the auricle 30 and advanced therein until the electrically conductive rings 204 thereof non-percutaneously contact the skin about the respective needle electrodes 210. In some such embodiments, all of the trans-auricular pairs of non-percutaneous electrodes illustrated in FIGS. 1-8 may be replaced by corresponding pairs of the hybrid electrode assemblies 200. In other embodiments, the hybrid electrode assemblies 200 may be placed, in trans-auricular pairs, at locations or positions along the auricle 30 different from that illustrated in FIG. 3, as can the non-percutaneous electrodes illustrated in FIGS. 1-8.

Figure 10:
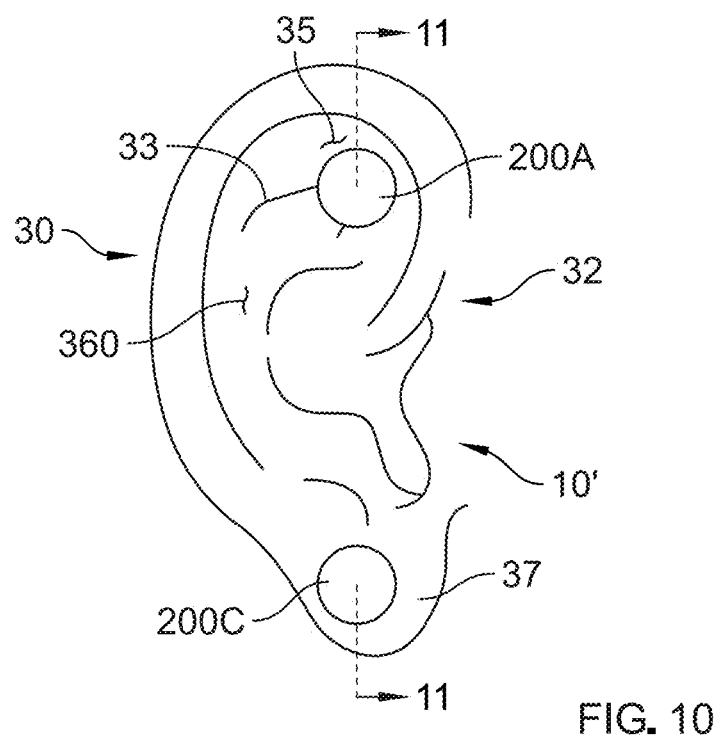
FIG. 10 is a plan view of a human ear demonstrating an example placement of multiple ones of the hybrid electrode assemblies of FIGS. 9A and 9 B.
Figure 11:
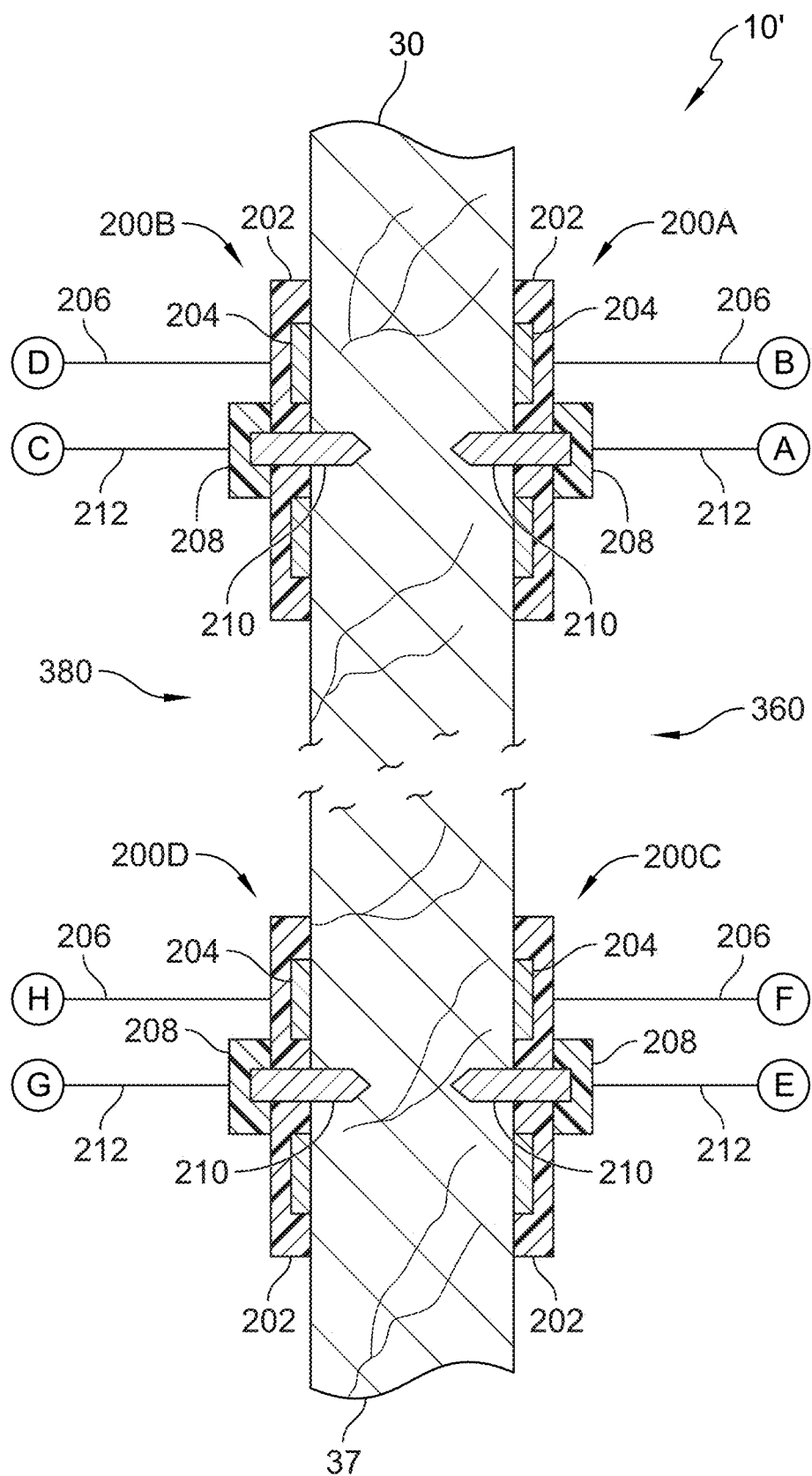
FIG. 11 is a cross-sectional view of the placed hybrid electrode assemblies illustrated in FIG. 10 as viewed along section lines 11-11.

Referring to FIGS. 10 and 11, for example, an implementation of an alternate auricular nerve field stimulation device 10' is shown in which the electrodes are provided in the form of two trans-auricular pairs 200A, 200B and 200C, 200D of the hybrid electrode assemblies 200. The hybrid electrode assembly 200A may illustratively be placed on the ventral aspect 360 of the auricle 30 generally above the antihelix 33 and in the triangular fossa 35, and the hybrid electrode assembly 200B may be placed on the dorsal aspect 380 across from the hybrid electrode assembly 200A such that the electrode assemblies 200A, 200B form a trans-auricular pair of electrodes. The hybrid electrode assembly 200C may, in the illustrated embodiment, be placed on the ventral aspect 360 of the ear lobe 37, and the hybrid electrode assembly 200D may be placed on the dorsal aspect 380 of the ear lobe 37 across from the hybrid electrode assembly 200C such that the electrode assemblies 200C, 200D form another trans-auricular pair of electrodes. It will be understood that in other implementations either or both trans-auricular pairs of the electrode assemblies 200A-200D may be placed at other locations along the auricle, and/or that the device 10' may include two or more additional trans-auricular pairs of hybrid electrode assemblies 200 and/or non-percutaneous electrodes placed at any location(s) along the auricle 30.

In any case, the hybrid electrode assemblies 200 may, in some embodiments, be carried by, i.e., be operatively coupled to, the flexible carrier 12 illustrated in FIGS. 1-4 and 7, although in other embodiments the hybrid electrode assemblies may each be individually coupled to the auricle 30. In the latter case, each of the housings 202 may illustratively be fitted with an individual, adhesive-backed, flexible carrier as described above. Alternatively, a suitable adhesive or other attachment medium may be applied to the region 216 of the housing 202 for promoting and maintaining contact between the ring 204 and the skin surface of the auricle 30. A removable film, such as the film 23 described above, may be used to protect such adhesive or other attachment medium prior to placement of the electrode assemblies 200.

The electrical conductors 208, 212 of the hybrid electrode assemblies 200A-200D are electrically coupled to the electrical circuitry 14 similarly as illustrated in FIGS. 1, although electrical control of the device 10' differs from that of the devices 10, 100 in that the electrical circuitry 14 in the device 10' has independent control of each of two electrode structures within each electrode assembly 200A-200D. Example processes for controlling the hybrid electrode assemblies 200A-200D will be described in detail below. The electrical circuitry 14 may, as illustrated in FIG. 3, be attachable to the patient, e.g., behind the ear 32 or other location. In alternate embodiments, the electrical circuitry 14 may be housed in a suitable circuitry housing that may be carried by and/or be attached to the patient.

In the example illustrated in FIGS. 10 and 11, each hybrid electrode assembly 200A-200D is connected to two insulated electrical conductors 208, 212, as illustrated in FIGS. 9A and 9B and described above, for a total of eight electrical conductors. In FIG. 11, the electrical conductors 212 electrically coupled to the needle electrodes 210 are labeled A, C, E and G, and the electrical conductors 208 electrically coupled to the ring electrodes 204 are labeled B, D, F and H respectively. The electrical circuit 14 may be programmed or otherwise configured to selectively apply electrical stimulation signals, e.g., in the form of voltage or voltage differentials, to various combinations of the electrodes A-H, simultaneously, individually and/or sequentially and with any desired signal attributes as described above, for the purpose of causing corresponding currents to flow through the auricle 30 to provide therapy by stimulating at least one auricular nerve field within the auricle 30.

In one embodiment, the electrical circuitry 14 is illustratively configured to selectively supply voltages/currents solely to the percutaneously inserted needle electrodes 210 during a first phase of electrical stimulation treatment followed by selectively supplying voltages/currents solely to the non-percutaneous ring electrodes 204 during a second phase of electrical stimulation treatment separate from the first phase. In some such embodiments, any number of first phase treatments may be carried out prior to conducting each second phase treatment and vice versa. In one particular example implementation, each first phase treatment is following by one second phase treatment. In another example implementation, two first phase treatments are conducted, followed by one second phase treatment, followed by two first phase treatments, and so forth. In yet another example implementation, three or four first phase treatments are conducted, followed by one second phase treatment, followed by three or four first phase treatments, and so forth. In any of the foregoing examples, alternate implementations may include conducting two or more second phase treatments between each one or more first phase treatments. In still other alternate embodiments, multiple second phase treatments may conducted between each single first phase treatment. Those skilled in the art will recognize other treatment combinations, and it will be understood that all such other combinations are intended to fall within the scope of this disclosure.

An example therapy sequence of electrical stimulation signals applied by the circuitry 14 to the electrodes A-H during successive first and second phase treatment sequences are the following, although those skilled in the art will recognize that these treatment sequences represent only one of many different possible sequence combinations and therapy approaches that may be implemented using the device 10'. It will be understood that all such different sequence combinations and/or therapy approaches implementable using the device 10' are intended to fall within the scope of this disclosure.

Example Therapy Sequence

First Phase Treatment:

The following example first phase treatment sequence utilizes only the needle electrodes A, C, E and G, with an arbitrary one of the needle electrodes A, C, E and G used as a ground or reference electrode. In this example, needle electrode G will be used as the reference electrode, although it will be understood that the reference electrode in other therapy sequences and/or in other instances of the first phase treatment in this example therapy sequence may be any of the other needle electrodes A, C and E. The following pattern of items 1-8 is illustratively repeated sequentially for P time units with a rest or pause time of Q time units following repeated execution of the pattern of items 1-8 for P time units.

1. Apply S volts simultaneously to A, C and E at T hertz for U time units.
2. Rest or pause V time units.
3. Apply S volts simultaneously to A, C and E at W hertz for U time units.
4. Rest or pause V time units.
5. Apply −S volts simultaneously to A, C and E at T hertz for U time units.
6. Rest or pause V time units.
7. Apply −S volts simultaneously to A, C and E at W hertz for U time units.
8. Rest or pause V time units.

Example values of variables P-W are the following, although it will be understood that in other implementations one or more of P-W may take on different values:

P=15 minutes.
Q=2 minutes.
S=3.2 volts.
T=1 Hz.
U=1 millisecond.
V=2 seconds.
W=10 Hz.

It will be further understood that in some embodiments one or more of the items 1-8 may be omitted and/or executed at a different point in the pattern, such that the sequential pattern may include any combination of any of items 1-8 executed in any order.

Second Phase Treatment:

The following second phase treatment sequence utilizes only the ring electrodes B, D, F and H, which will assume the use of two ground reference-decoupled gating circuits controllable to selectively apply voltages and voltage differentials to the electrodes B, D, F and H as illustrated in FIG. 6 with respect to electrodes A, B, C and D thereof. In this regard, gating combination 1 refers to a positive voltage applied by VG1 between electrodes B and D, and a separate (i.e., decoupled) positive voltage simultaneously applied by VG2 between electrodes E and F, gating combination 2 refers to gating combination 1 with the polarities of VG1 and VG2 reversed, gating combination 3 refers to a positive voltage applied by VG1 between electrodes B and H, and a separate (i.e., decoupled) positive voltage simultaneously applied by VG2 between electrodes F and D, and gating combination 4 refers to gating combination 3 with the polarities of VG1 and VG2 reversed.

The following pattern of items 1-16 is illustratively repeated sequentially for P time units with a rest or pause time between each repeated pattern (in which no electrical stimulation signals are applied) of Q time units.

1. Apply S volts according to combination 1 at T hertz for U time units.
2. Rest or pause V time units.
3. Apply S volts according to combination 2 at T hertz for U time units.
4. Rest or pause V time units.
5. Apply S volts according to combination 1 at W hertz for U time units.
6. Rest or pause V time units.
7. Apply S volts according to combination 2 at W hertz for U time units.
8. Rest or pause V time units.
9. Apply S volts according to combination 3 at T hertz for U time units.
10. Rest or pause V time units.
11. Apply S volts according to combination 4 at T hertz for U time units.
12. Rest or pause V time units.
13. Apply S volts according to combination 3 at W hertz for U time units.
14. Rest or pause V time units.
15. Apply S volts according to combination 4 at W hertz for U time units.
16. Rest or pause V time units.

Example values of variables P-W are the following, although it will be understood that in other implementations one or more of P-W may take on different values:

P=15 minutes.
Q=1 minute.
S=4.2 volts.
T=1 Hz.
U=1 millisecond.
V=2 seconds.
W=10 Hz.

It will be further understood that in some embodiments one or more of the items 1-16 may be omitted and/or executed at a different point in the pattern, such that the sequential pattern may include any combination of any of items 1-16 executed in any order. In any case, a sequence of one or more cycles of the first phase treatment followed by one or more cycles of the second phase treatment is illustratively carried out over a time period of 120 hours, after which the therapy is discontinued. In one non-limiting example implementation, at least 2 sequences of the first phase treatment are carried out between each second phase treatment. In some alternate embodiments, the voltage applied between electrodes B and H in any or all of steps 9, 11, 13 and 15 may have a different frequency than the voltage applied between electrodes F and D so as to establish an interferential current in a space within the auricle 30 intersected by the two currents flowing between the pairs B, H and F, D of the four electrodes B, H, F and D.

Figure 12:
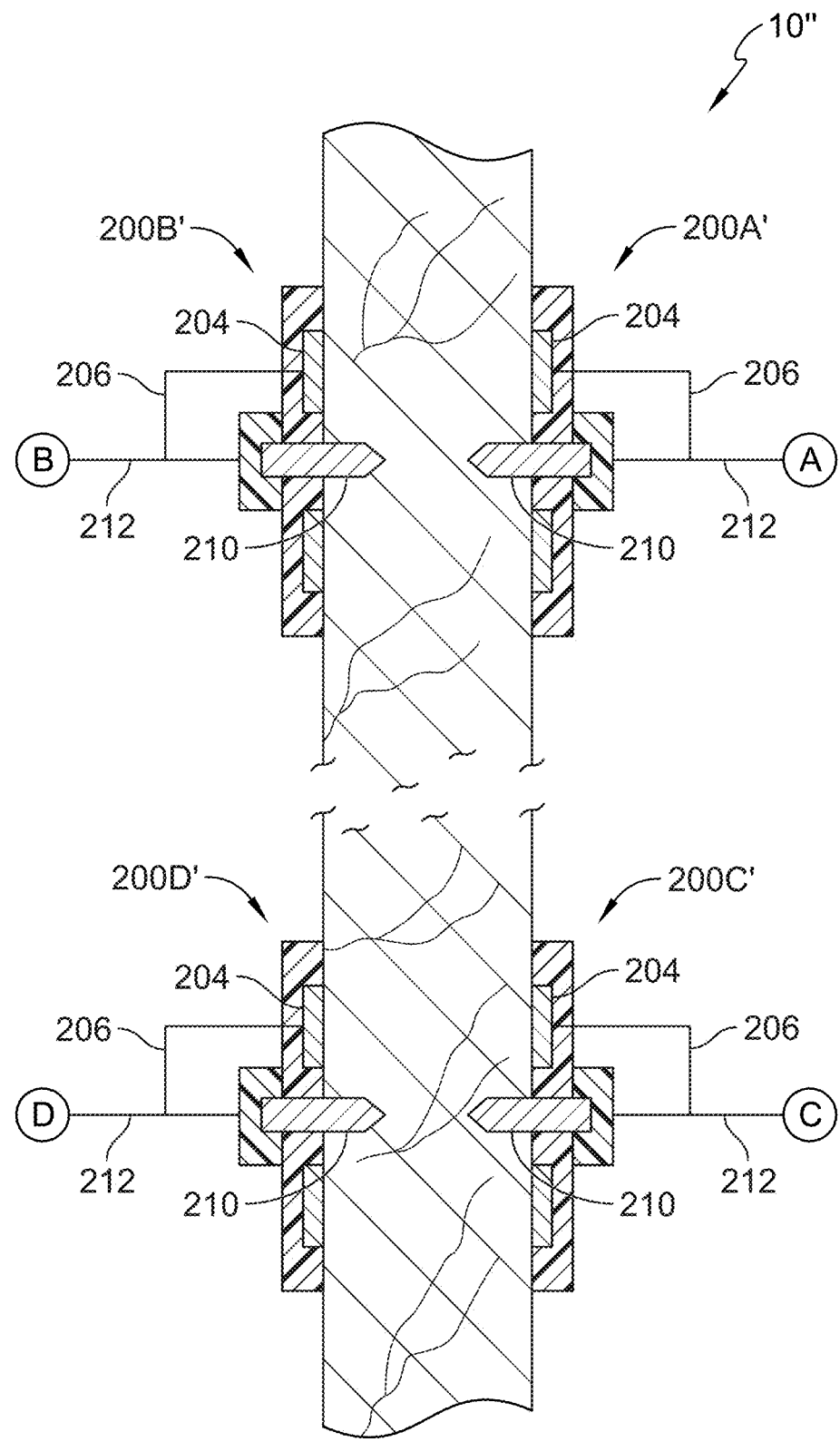
FIG. 12 is a cross-sectional view similar to FIG. 11 illustrating an alternate wire connection scheme to the hybrid electrode assemblies of FIG. 11.

The above embodiment of the auricular nerve field stimulation device 10' is illustrated in FIGS. 9A-11 and described above as including eight electrodes A-H each with a separate, dedicated electrical conductor connected to the electrical circuitry 14 such that the electrical circuitry 14 has independent control of each electrode A-H. In a fourth embodiment 10", in contrast, the ring electrode 204 of each electrode assembly 200A'-200D' is electrically connected to the needle electrode 210 thereof, as illustrated by example in FIG. 12. Such connections may illustratively be made within the housing(s) 202, 208 or outside of the housing(s) 202, 208 adjacent thereto, and in either case only a single electrical conductor extends between the electrical circuitry 14 and each of the electrode assemblies 200A'-200D'. In the embodiment illustrated in FIG. 12, electrical signals applied to the electrode assemblies 200A'-200D' are simultaneously applied to each electrode 204, 210 thereof. In this regard, conducting the first phase treatment described above not only provides percutaneous therapy via the needle electrodes 210 as described above, but further simultaneously provides conventional TENS therapy via the ring electrodes 204. Similarly, conducting the second phase treatment described above not only provides second phase treatment therapy via the ring electrodes 204 as described above, but further simultaneously provides focused second phase treatment therapy via the percutaneously inserted needle electrodes 210. It will be understood that further alternate embodiments are contemplated in which the ring electrode(s) 204 is/are electrically connected to the needle electrode(s) 210 in fewer than all of the electrode assemblies 200A'-200D', e.g., only in one or more of the electrode assemblies 200A'-200D'.

The following discussion is directed to FIGS. 13-29 and the reference numbers recited in the following section only pertain to FIGS. 13-29.

Figures 13A, 13B:
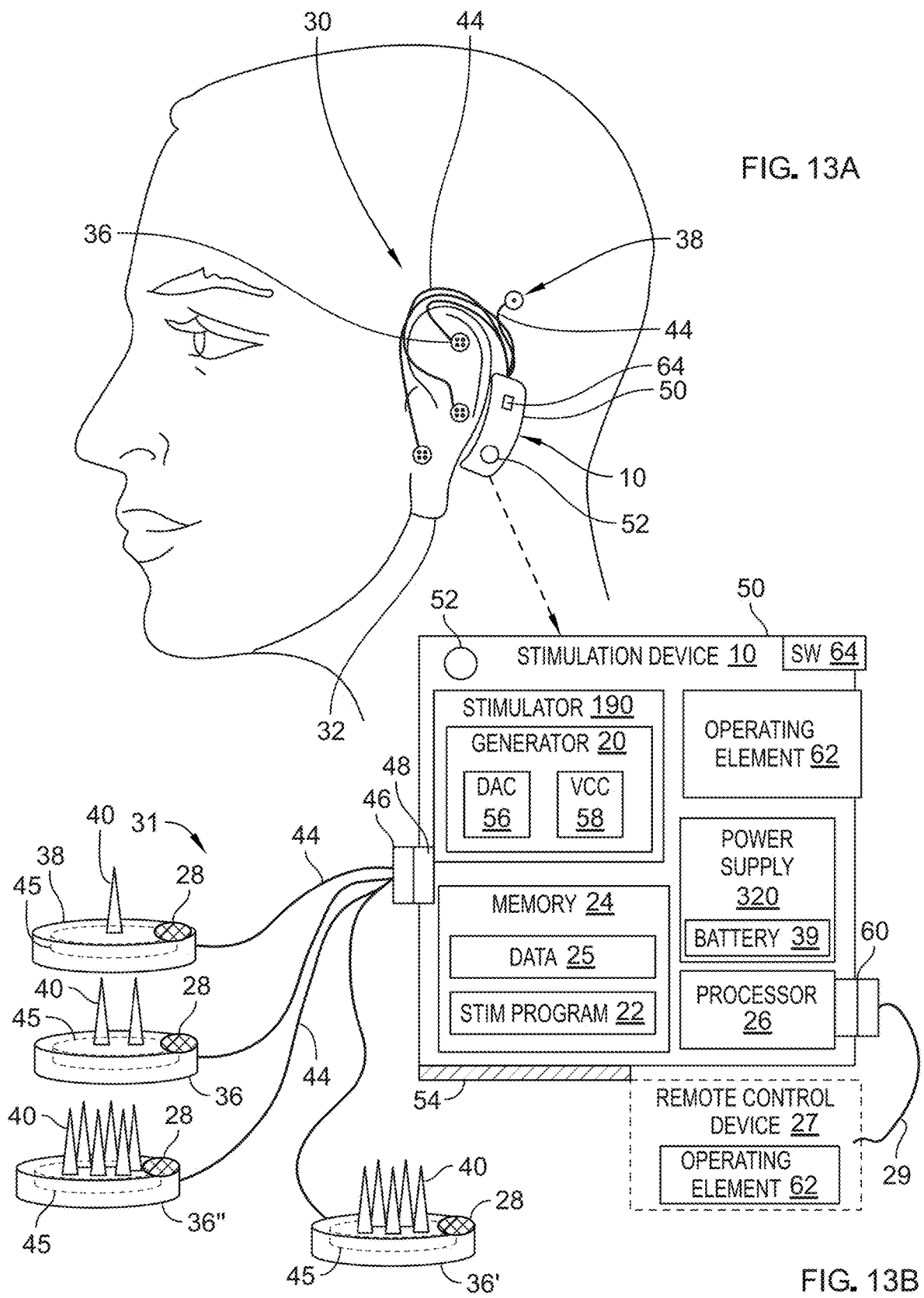
FIG. 13A is a side view of a head of a human being with an electrical stimulation device in an auricular application, according to one embodiment.
FIG. 13B is a block diagram of the electrical stimulation device of FIG. 13B, according to one embodiment.
Figures 14, 15:
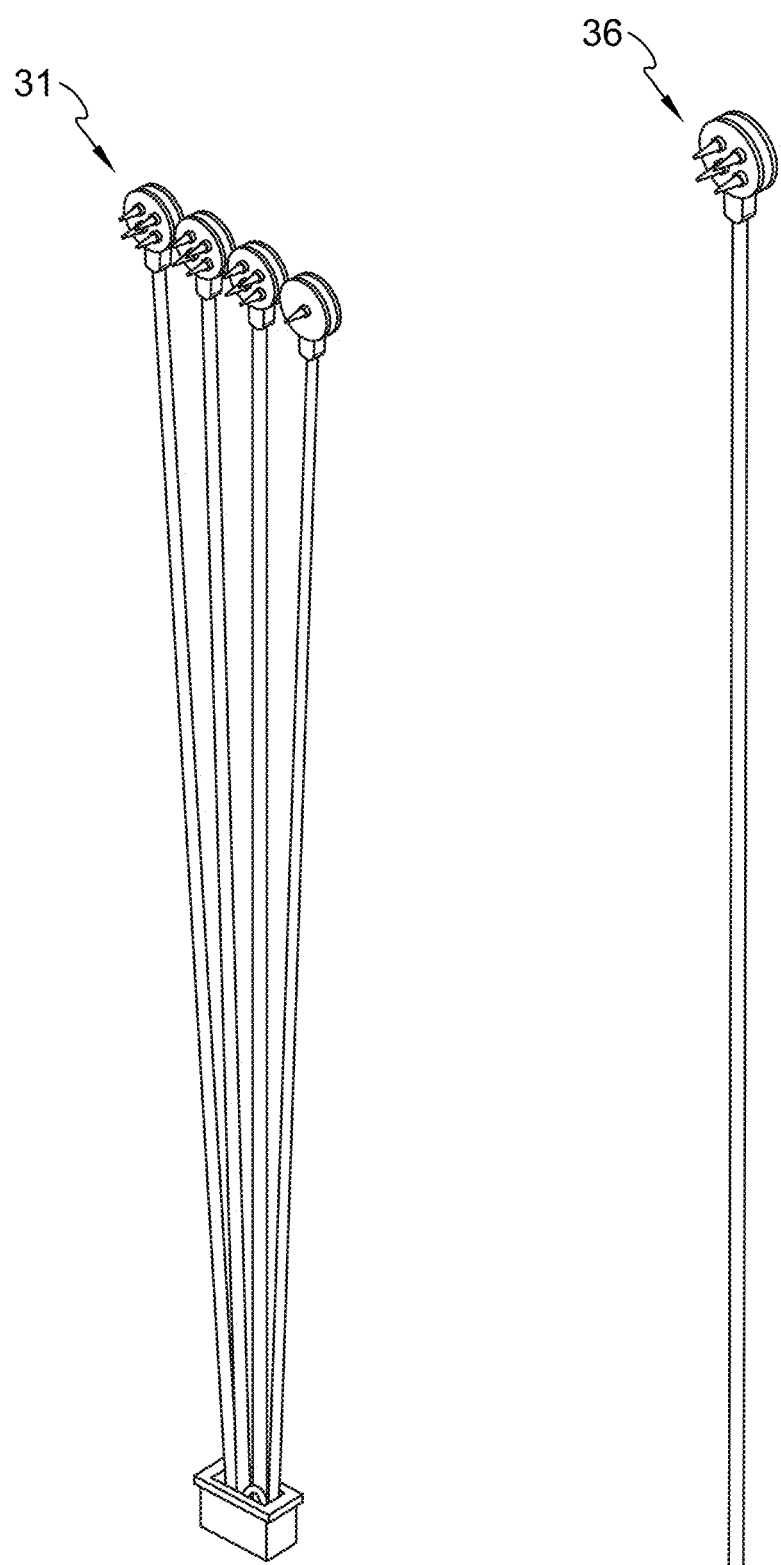
FIG. 14 is a perspective view of an electrode needle array of the electrical stimulation device of FIG. 13.
FIG. 15 is a perspective view of a single therapy electrode and line of the electrode needle array of FIG. 14, according to one embodiment.
Figure 16:
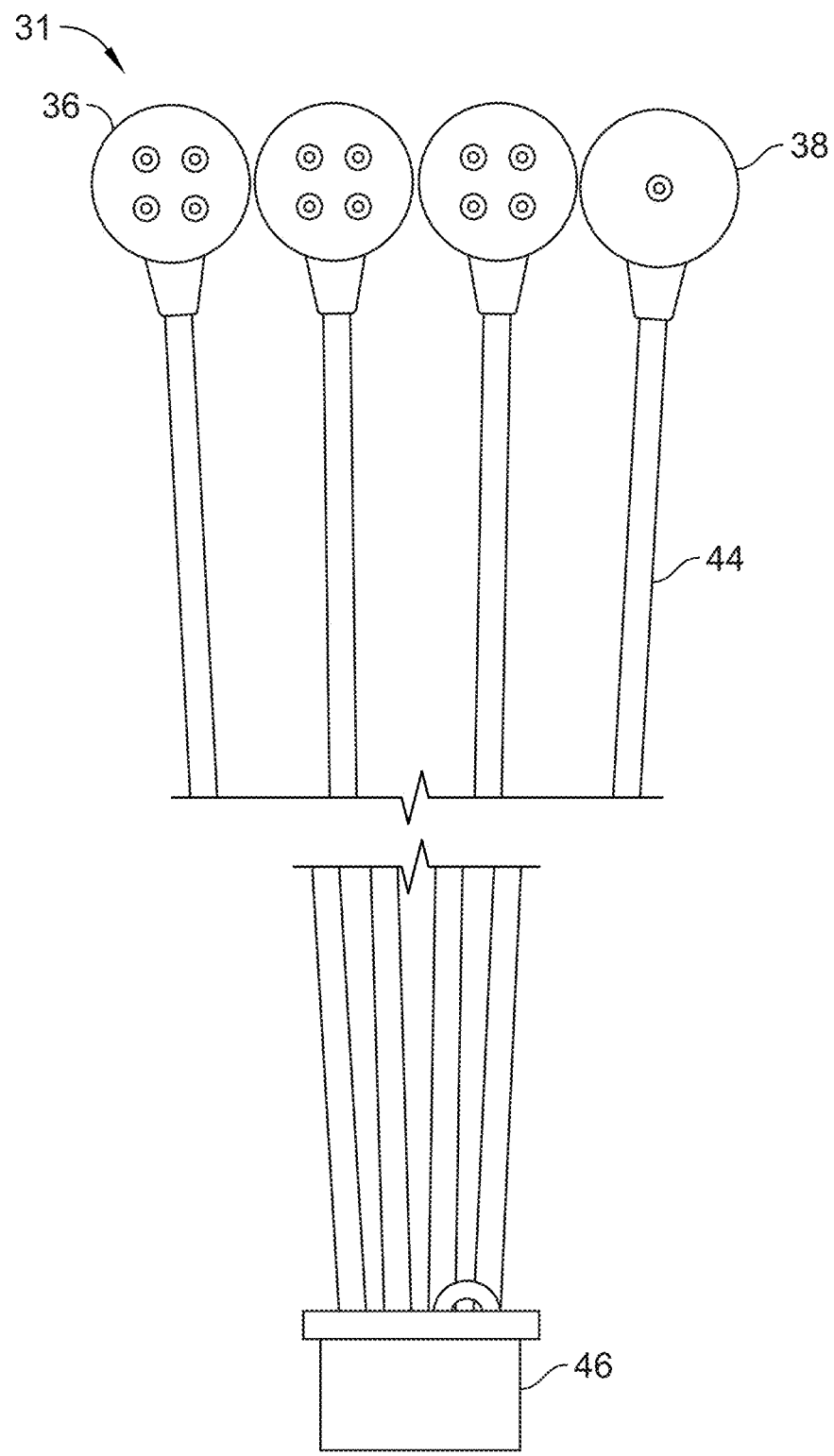
FIG. 16 is a front side view of the electrode needle array of FIG. 14, according to one embodiment.
Figure 24:
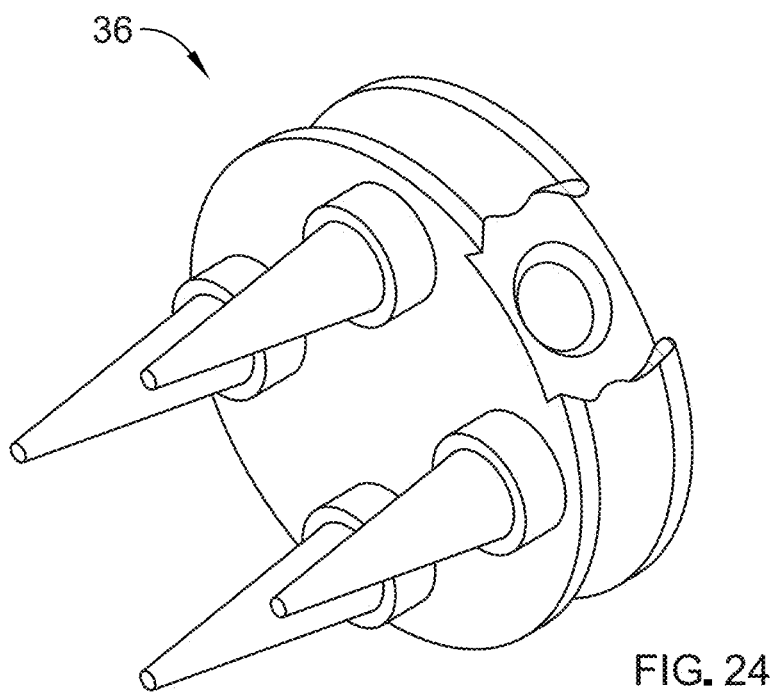
FIG. 24 is a perspective view of the single therapy electrode of FIG. 15, according to one embodiment.
Figure 25:
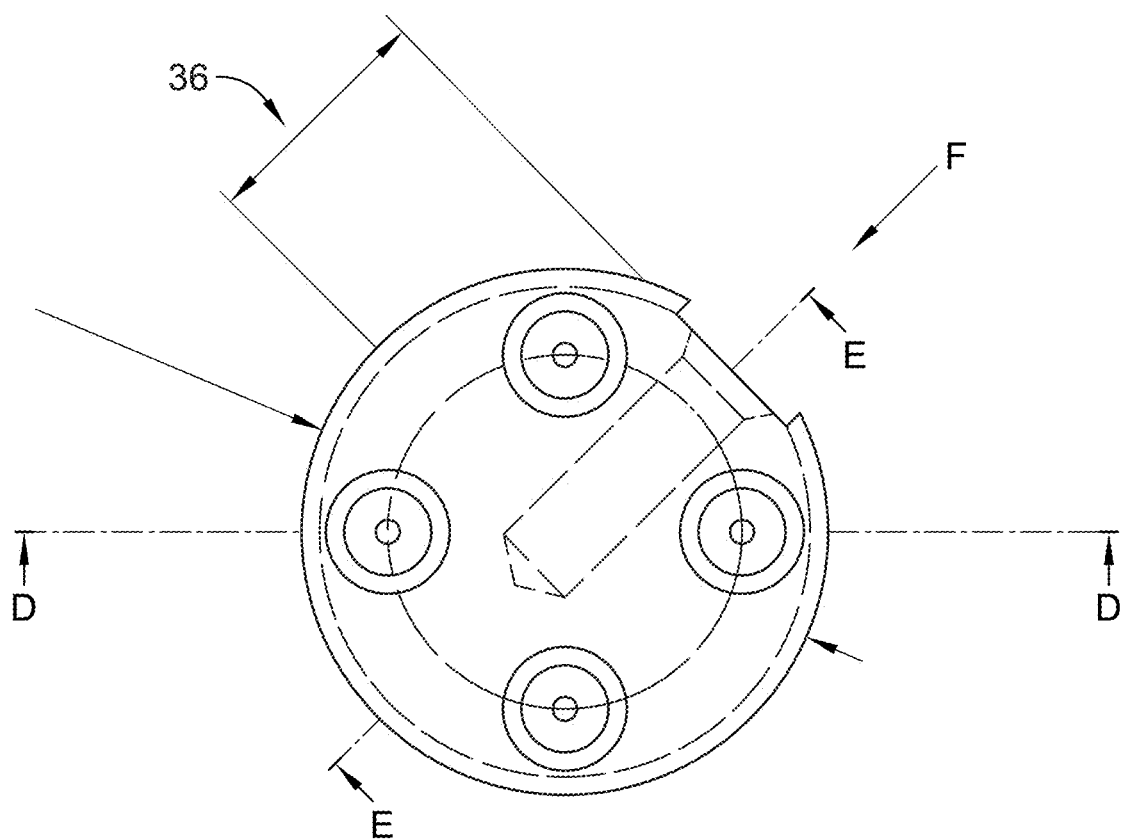
FIG. 25 is a side view of the single therapy electrode of FIG. 15 with a line port illustrated in phantom, according to one embodiment.
Figure 26:
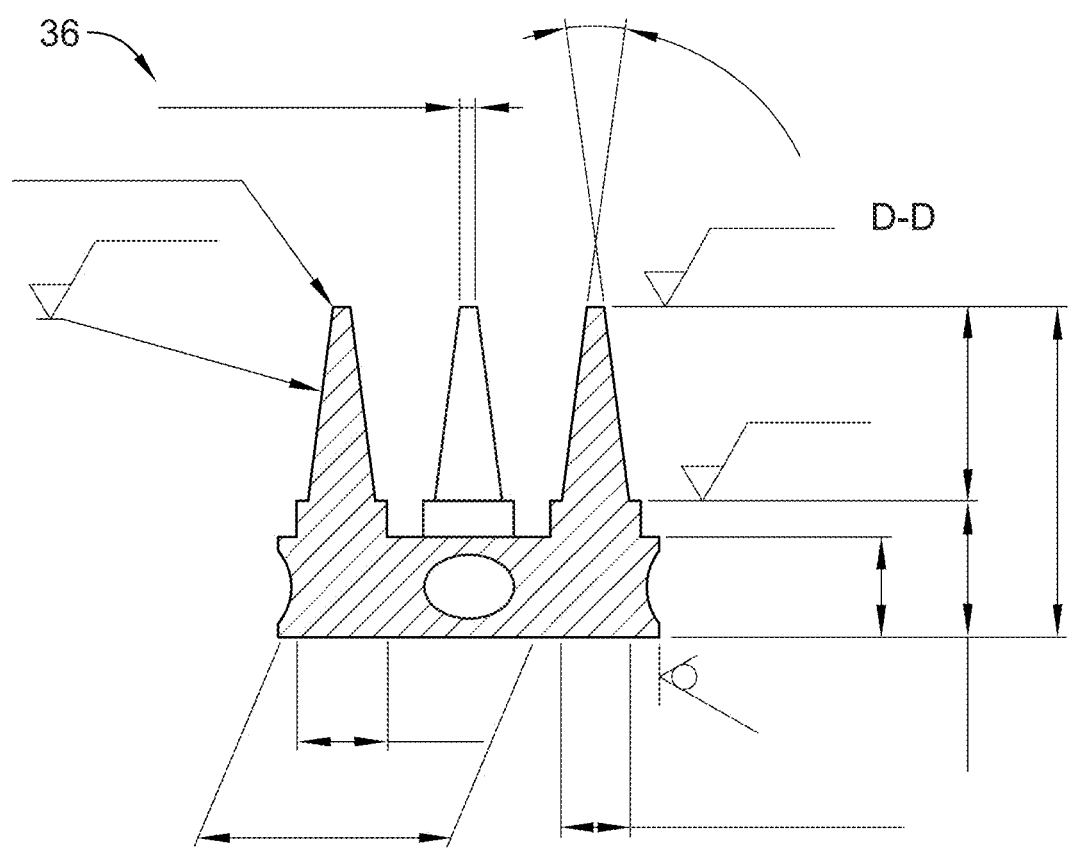
FIG. 26 is a side view of the single therapy electrode of FIG. 25 in cross section view taken along lines D-D, according to one embodiment.
Figure 27:
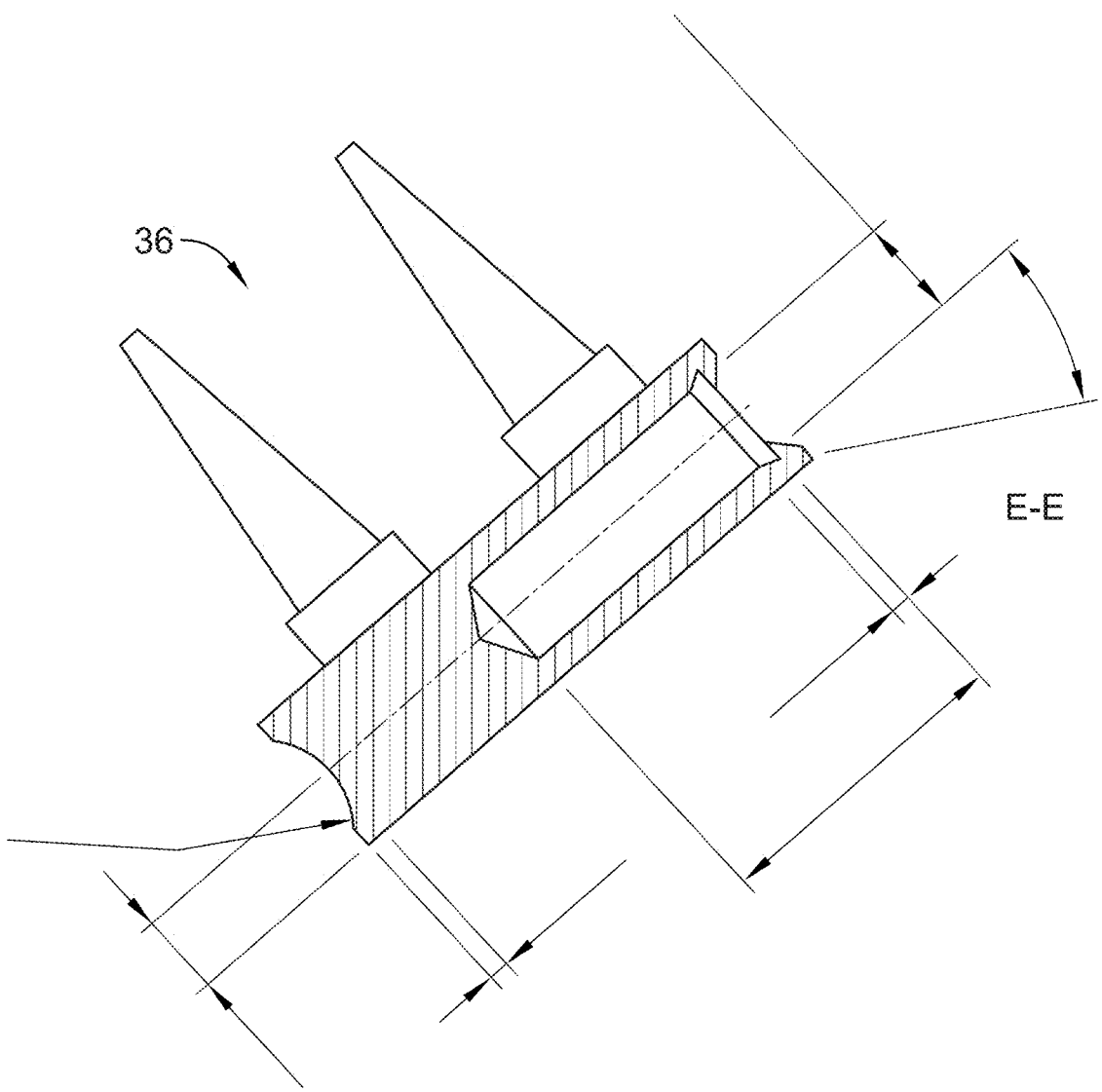
FIG. 27 is a side view of the single therapy electrode of FIG. 25 in cross section view taken along lines E-E, according to one embodiment.
Figure 28:
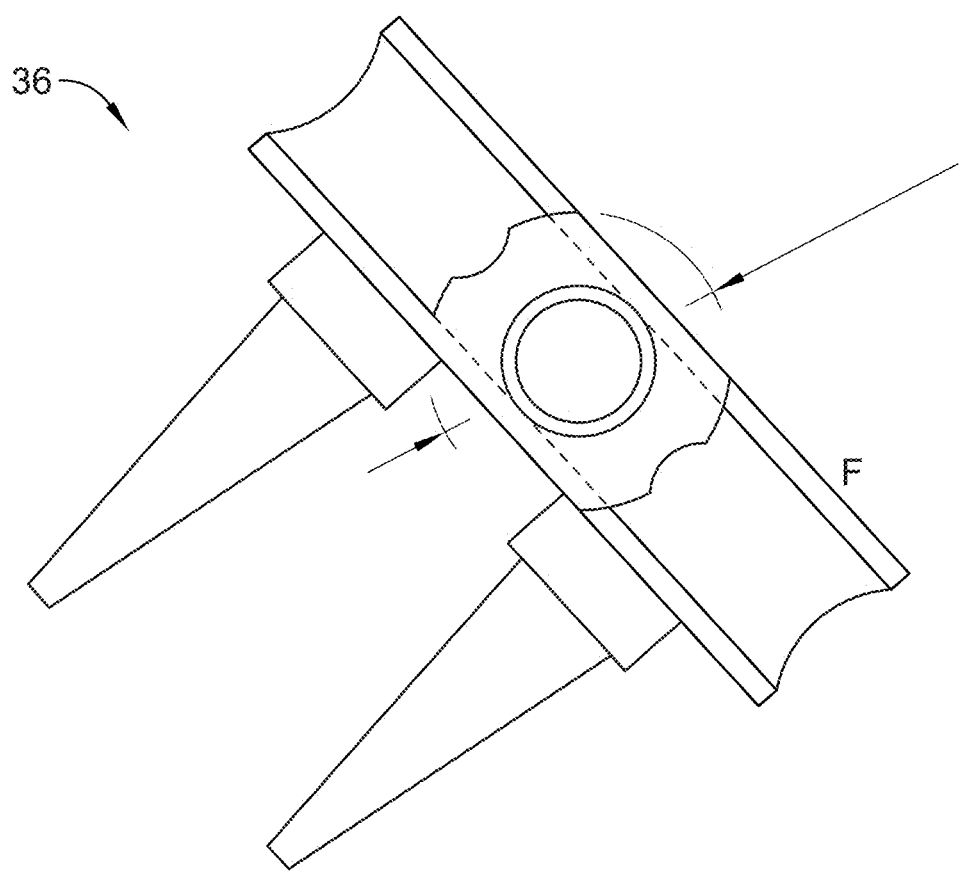
FIG. 28 is a side view of the single therapy electrode of FIG. 25 from a perspective of line F, according to one embodiment.

Turning to the drawings, FIGS. 13A-13B depict an electrical stimulation device 10 for, in particular, an electrical acupuncture therapy in the region of an ear 32 of a human being. The stimulation device 10 includes a stimulator 190 containing a generator 20 for generating stimulation pulses with defined stimulation parameters, i.e. a defined voltage or a defined current, a defined duration, a defined repetition frequency and a defined duty cycle etc. In one embodiment, the electrical stimulation device 10 comprises an electrical signal generator 20 configured to generate electrical stimulation pulses having a repetition frequency of 0.5 to 100 Hz, preferably 1-10 Hz, and a duty cycle of 10 to 90%, preferably 40-60%. In one embodiment, the stimulation pulses are generated at a constant current amplitude.

With particular reference to FIG. 13B, electronic aspects of the electrical stimulation device 10 may be implemented by means of an analogue circuit, a digital circuit or a computer arrangement with a processor instructed by a suitable computer program, or any combination thereof. In one embodiment, a program 22 for performing stimulation is resident in memory 24 and executed by a microprocessor 26 to control the stimulator 190. The memory 24 may be implemented as several memory units of different types (RAM, ROM, etc.). The memory 24 stores instructions of a program 22 to allow a microprocessor 26 to perform one or more functions. Optionally, memory 24 stores a number of detected parameter values as obtained from detection devices 28, such as incorporated in an electrode needle array 31. The memory 24 may be any suitable memory 24 for storing a predetermined function such as a computer readable memory 24. The predetermined function may be a mathematical function or correlation. Suitable functions may be functions that are suitable for determining whether a determined parameter value is equal to, greater than or smaller than a predetermined threshold value. Based on his knowledge the skilled person will be able to determine suitable functions on the basis of which a response is required as a function of the determined parameter values. For example, the function may relate the absence of certain parameter values below a certain threshold value to a certain time frame. Such a function may be determined to detect the absence of breathing during a certain time period e.g. 1 second and longer, 2 seconds and longer or 5 seconds and longer.

Based on the program 22 as stored in the memory 24, the microprocessor 26 is able to process the number of detected parameter values as obtained from the detection device in said function. For this, the detected parameter values are loaded into the microprocessor 26 either directly from the detection devices 28 or alternatively from the memory 24 into which the detected parameter values were previously loaded. The function is loaded in the microprocessor 26 from the memory 24 or in an alternative embodiment the predetermined function may be embedded in said microprocessor 26. In the latter embodiment at least one memory 24 is (partially) integrated in the microprocessor 26. In one embodiment, the memory 24 records the stimulation parameters as a function of time as data 25 to enable the performance of a quality control check or check of the proper operation by a remote control device 27 that is periodically or permanently in communication with the stimulation device 10 via wireless or wired connection 29.

The detection device 28 may be any suitable device for detecting a number of parameter values. In the present specification, a "number" shall mean one or more unless explicitly stated otherwise. Parameters suitable for determining whether a subject is in need of resuscitation include but are not limited to parameters corresponding to muscle activity, parameters corresponding to breathing, or parameters corresponding to cerebral activity, such as electrical activity of neural cells including brain cells, or electrical activity recorded from the ear 32 or any other suitable point on the body of a human being. Other sensors may be applied as well, like a sensor to measure body temperature, a sensor to measure pressure, and a sound sensor, like a microphone.

A power supply 320 is provided in order to supply the components of the stimulator 190 with electrical energy. In one embodiment, the power supply 320 is formed by a suitable battery 39 or an accumulator. The electrical pulses generated in the generator 20 of the stimulator 190 are delivered via at least one needle electrode array 31 comprising at least two therapy electrode arrays 36 and at least one ground or reference electrode 38.

Each therapy electrode 36 has two or more needle electrodes 40, which in an exemplary embodiment is four (4) in number. In one embodiment, the number of therapy electrodes 36 is selected from the group consisting of 2, 3, 4, 5, 6, 7, 8, 9, 10, or more. In another embodiment, the number of needle electrodes 40 per therapy electrode 36 is selected from the group consisting of 2, 3, 4, 5, 6, 7, 8, 9, 10, or more. In one embodiment, the number of needle electrodes 40 per therapy electrode 36 is 2-10. In one embodiment, the number of needle electrodes 40 per therapy electrode 36 is 3-9. In one embodiment, the number of needle electrodes 40 per therapy electrode 36 is 4-8. As seen in FIG. 13B, the array may include one or more therapy electrode 36' and 36", alone or in combination, with five (5) and six (6) needle electrodes 40, respectively.

The present invention has shown that the use of therapy electrode 36 having a plurality of two or more needle electrodes 40—and preferably 3 or more and more preferably 4 or more—provides for the unexpected result of a synergistic field effect and not merely an additive electrical stimulation for pain reduction.

Each reference electrode 38 includes at least at least one needle electrode 40. The therapy electrodes 36 and reference electrode 38 are inserted into the skin surface in the area to be stimulated. The reference electrode 38 provides a ground connection for electronic circuit located within the stimulator 190.

In one embodiment, the needle electrodes are made of an electrically conductive material, in particular a metal such as titanium, stainless steel or the like. In addition to metals, conductive synthetics are also conceivable for the production of the needle electrodes.

In one embodiment, the at least two needle electrodes 40 of the therapy electrode 36 are arranged in a common electrode housing with a detection device 28 and connected to the stimulator 190 by an appropriate line 44. A circuit board 45 (FIG. 13B) on which the one or more needle electrodes 40 are mounted is arranged in the common electrode housing. The therapy electrodes 36 can, for instance, be simply connected to the circuit board 45 by a conductive adhesive. The line 44 is likewise connected to the circuit board 45, either by a solder joint or by a screw connection, the conductive tracks of the circuit board 45 safeguarding the electrical connection to the therapy electrodes 36. The arrangement of each therapy electrode 36 in a common electrode housing provides for a defined distance between the individual needle electrodes 40. The line 44 for connecting the therapy electrodes 36 to the stimulator 190 can be fixedly, i.e. inseparably, or even detachably configured. Each line 44 can be fixedly connected respectively to the corresponding therapy electrode 36 or reference electrode 38. Each line 44 can also be fixedly connected to the stimulator 190. In the illustrative embodiment, each line 44 terminates at a plug 46 that is physically and electrically connected to a socket 48 mounted on an electronic housing 50 that contains the stimulator 190.

In order to attach the electronic housing 50 to the skin surface, a fastening element 54 (FIG. 13B), such as an adhesive element, may be provided. Besides the adhesive element, other fastening methods, e.g. via magnets, elastic bands or the like can be used. The fastening element can be integrated in the electrode housing. For example, the electronic housing 50 can adhesively mount behind the ear 32 of the human being (FIG. 13A). The electronic housing 50, which may be made of a synthetic material and is preferably designed to be water-proof. The components depicted in FIG. 13A can be arranged in a preferably sterile package (not illustrated) so as to prevent any contamination of the needle electrode array 31.

The present invention provides an electrical stimulation system that provides unexpected results in terms of performance and efficacy. In one aspect, the present disclosure provides an electrical stimulation device 10 with a stimulator 190 containing a generator 20 for generating electrical stimulation impulses with defined stimulation parameters, and a power supply 320 for supplying the generator 20 with electrical energy, and with at least two needle electrodes 40 for insertion into the skin surface of an area that is to be stimulated.

In another aspect, the present disclosure provides an apparatus for stimulating auricular points on the human ear is provided using low voltage pulses that are generated and delivered by portions of the apparatus, particularly by percutaneously implanted needle electrodes into the cranial and/or peripheral nerves and corresponding neural vascular bundles of the auricular and periauricular areas.

In another aspect, methods of evaluating and implanting of the electrode/needle array include transillumination of the auricular and periauricular tissues and surrounding neurovascular anatomy.

Where the control device is coupled to operating elements for changing the stimulation parameters, manual adjustment and change of the stimulation parameters may be provided. Where no operating elements are provided, the respective adjustment of the stimulation parameters can be performed by programming the control device. To this end, the stimulator preferably comprises a suitable interface for connecting to a control computer.

An actuator or switch can be provided to activate the stimulator. Alternatively, the activation can, for instance, also be realized by removing an insulator on the battery 39 constituting the power supply 320.

In order to give a feedback on the operation of the stimulation device to the patient or the physician, an operation indicator 52, e.g. a light-emitting diode, can be provided in the stimulator. In addition to an optical operation indicator, an acoustic indicator of the proper operation or proper start-up can also be provided.

In another embodiment, the auricular peripheral nerve stimulator system is a battery-operated, single-use device that has a pre-programmed frequency, pulse and duration for the stimulation of selected cranial and/or peripheral nerves and corresponding neural vascular bundles of auricular and periauricular areas. The power supply 320 connects via four lines 44 of stainless steel wires, sheathed in a plastic overmolding, to three therapy electrodes 36 comprised of four (4) needle electrodes 40 each and one reference electrode 38 comprised of only one (1) needle electrode 40.

In another embodiment, the auricular peripheral nerve stimulator is a single use device that is physician applied for ambulatory, continuous, home based therapy. It is to be percutaneously implanted into the cranial and/or peripheral nerves and corresponding neural vascular bundles of the auricular and periauricular areas as ascertained by the disclosed method of evaluating and implanting of the electrode/needle array. This includes transillumination of the auricular and periauricular tissues and surrounding neurovascular anatomy. The auricular peripheral nerve stimulator system allows for continuous, intermittent neural stimulation for up to five days.

In another embodiment, the device is an ambulatory, physician applied, minimally invasive application of electrical neural stimulation implanted directed into the neurovascular bundles of the external ear verified by transillumination co joined with skin impedance measurement. In another embodiment, a generator located behind the ear, produces electrical stimulation impulses, which are transferred via an electrode/needle array to branches of cranial and/or occipital nerves and sympathetic fibers of the arterial branches.

In another embodiment, electrode/needle array implantation into the skin of the ear allows for direct access to branches of cranial nerves V, VII, IX, and X as well as branches of the occipital nerves. Direct access to the arterial branches of the head and neck are accessible and reduction of sympathetic stimulation results in an increase of vascular flow rate, reduction of vascular resistance and increase of perfusion. The arterial branches of the superficial temporal artery and the posterior auricular artery form a rich interconnecting complex network the terminal branches of which anastomose throughout the ear.

In another embodiment, the auricular peripheral nerve stimulator alters production and utilization of serotonin via vagal stimulation, and meningovascular dilation secondary to decreased sympathetic (or increased parasympathetic) tone.

In one embodiment, the device is powered by three lithium batteries, each with a voltage of 3 volts. In another embodiment, the device modulates a duty cycle between 2 hours on, 2 hours at rest. In another embodiment, the maximum performance time frame is 5 days or 120 hours (5 days×24 hours).

In another embodiment, the auricular peripheral nerve stimulator is a single use device that is physician applied for ambulatory, continuous, home based therapy. In another embodiment, it is to be percutaneously implanted into the cranial and/or peripheral nerves and corresponding neural vascular bundles of the auricular and periauricular areas as ascertained by the disclosed methods of evaluating and implanting of the electrode/needle array. The methods include transillumination of the auricular and periauricular tissues and surrounding neurovascular anatomy. In another embodiment, the auricular peripheral nerve stimulator system allows for continuous, intermittent neural stimulation for up to five days.

In one embodiment, the generator 20 for generating electrical stimulation pulses is comprised of a digital/analog converter (DAC) 56 and a voltage/current converter (VCC) 58. The therapy electrodes 36 are connected to the stimulator 190 via lines 44. The power supply 320 is preferably formed by a battery 39. The actuation of the generator 20, and the fixation of the stimulation parameters and control of the stimulation procedure, are effected via a control device, such as the microprocessor 26. The microprocessor 26 can be programmed, and its parameters can be changed, via an interface 60. A change in the stimulation parameters can also be effected manually by the aid of appropriate operating elements 62 coupled to the microprocessor 26 either on the electronic housing 50 or in the remote control device 27. The current amplitude of the stimulation pulses can, for instance, be adjusted and changed via operating elements 62, e.g. buttons. Activation of the stimulator 190 and the power supply 320 provided therein can be effected via a switch 64. In accordance with the invention, stimulation pulses are delivered to the lines 44 connected to the therapy electrodes 36 at constant current amplitudes in order to be more independent of the strongly varying impedance of the skin.

The stimulator 190 can store the stimulation parameters as data 25 in memory 24 as a function of time for subsequent examinations or for quality control. The memory 24 can be read out by an appropriate computer such as the remote control device 27 via the interface 60. To indicate the proper functioning of the electrical stimulation device 10 and the stimulator 190, respectively, an appropriate operation indicator 52 can be provided, which may, for instance, be formed by a light-emitting diode.

In some embodiments of the invention, the electrical stimulation device 10 comprises controls for the ability to adjust the voltage output to the therapy electrodes 36 by manipulation of controls. It is contemplated that in some instances the healthcare professional may wish to make changes to the voltage output to the devices of the present invention, such as the pulse frequency, the pulse width, the provision of sequential pulses, the output of more than one pulse at a time and the like. In one embodiment, variations in the operation of device are made using a serial interface. The term "serial interface" as used herein refers to device that may be coupled to the electronic circuit via an electrical port and to a computer or the like having software capable of being downloaded to the microprocessor 26 of the circuit. Once downloaded to the microprocessor 26, such software, such as program 22, would control the voltage output to the therapy electrodes 36, as desired.

The electrical stimulation device 10 can be operated for auricular use as follows. Initially, auricular points on the outer part of the ear 32 are identified depending upon the symptoms or other conditions of a particular patient. It should be appreciated that one skilled in the art can identify auricular points and/or their correlation with different health. Once such points are identified by a health care professional, the device of this invention is employed to deliver a pulsed voltage to such points.

Figure 29:
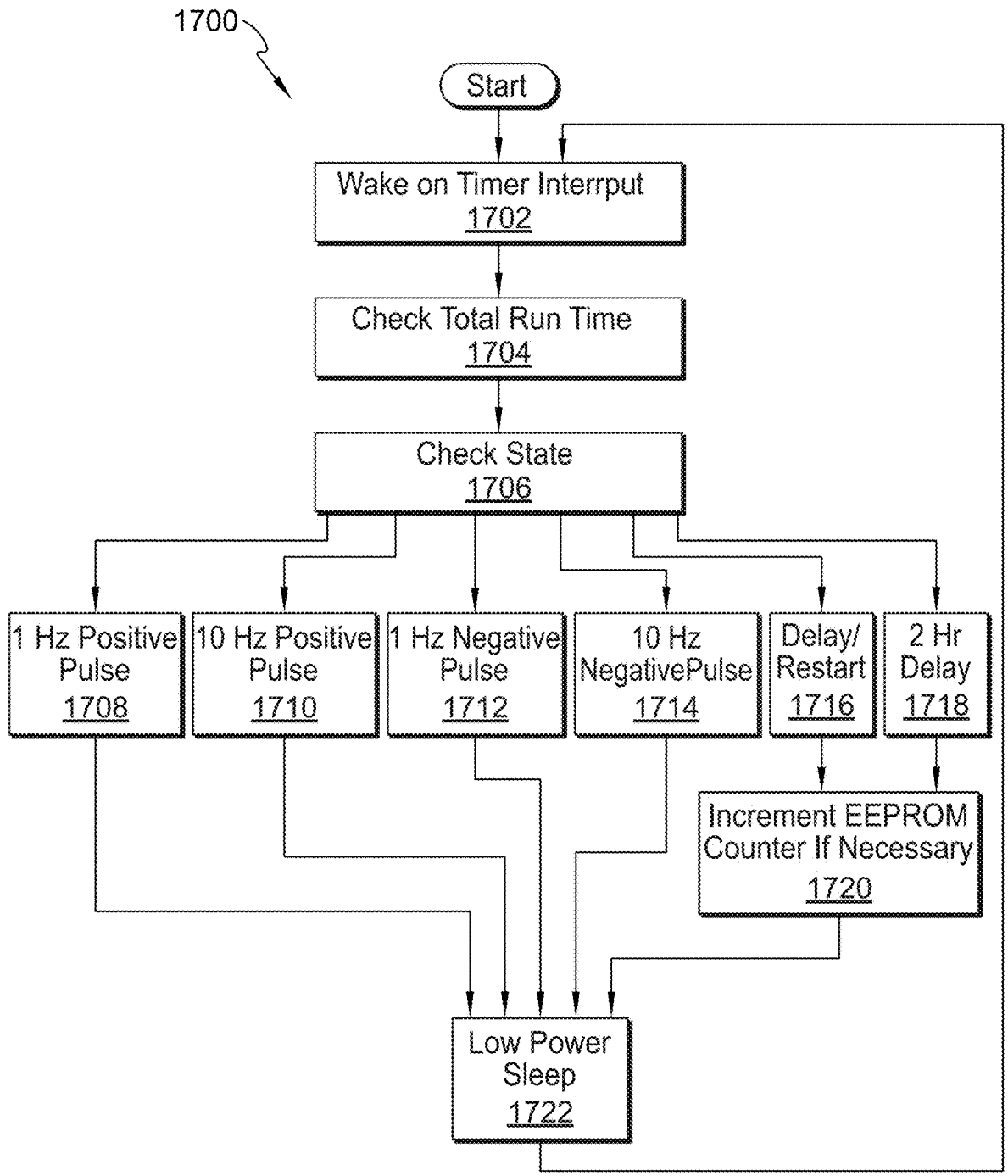
FIG. 29 is a flow diagram of a method of electrical stimulation using the electrical stimulation device of FIG. 13, according to one embodiment.

For example, FIG. 29 illustrates a method 1700 of electrical stimulation using the electrical stimulation device 10 (FIG. 13). In one embodiment, the method 1700 includes the processor of the electrical stimulation device being awoken by a timer interrupt (block 1702). The processor checks a total run time (block 1704). As discussed below, the processor determines what state is appropriate for the current run time by checking state in block 1706. For example, the processor can prompt the generator to produce a 1 Hz positive pulse (block 1708). The processor can prompt the generator to produce a 10 Hz positive pulse (block 1710). The processor can prompt the generator to produce a 1 Hz negative pulse (block 1712). The processor can prompt the generator to produce a 10 Hz negative pulse (block 1714). The processor can determine that a delay timer has expired and restart time (block 1716) or the processor can delay of two hours is warranted (block 1718). Then the processor can increment an EEPROM counter if necessary (block 1720).

It should be appreciated that in one embodiment, the auricular peripheral nerve stimulator placement method comprises the steps:
a) In some embodiments, the electrode/needle harness will be attached to the generator activating the device. Confirmation of successful activation may be tested by use of the provided ohmmeter to assure the circuit is complete.
b) The subject's external ear will be chosen for application.
c) The chosen external ear and the anatomical location of the generator placement distal to the ear will be cleaned with an astringent to remove any surface oils or debris. Furthermore, the subject's external ear and the generator location may be disinfected by alcohol pads.
d) The location of the auricular neurovascular bundles will be first visualized by the clinician using the transilluminator per protocol.
e) The electrode/needle array connected to the lead wires are percutaneously implanted into the proper anatomical location being sure to penetrate the skin so implantation is percutaneous within 1 mm of the chosen neurovascular bundles.
f) The duration of treatment is 120 hours.

In one embodiment, the electrically erasable programmable read-only memory (EEPROM) is updated each minute to ensure the unit repeats the pulse train for 2 hours, follows with a 2 hour low power delay cycle with no pulse output, then repeats the pulse and delays for a total of 120 hours regardless. EEPROM ensures run time data and the current action of the state machine are saved even if power is removed from the board. After 120 hours, all interrupts and timers are disabled and unit is allowed to go into an endless sleep state-effectively disabling the unit permanently.

The actual location and determination of needle placement (called points) may be based upon tradition and theory of acupuncture. While the ascribed "points" may vary, depending upon the type of acupuncture to which one prescribes, the rationale and needle placement varies little and the theory is the same.

The addition of electrical stimulation to the individual, non-connected needles does not alter the rationale and the location of application is still based upon the original theory. The addition of electricity, while considered an enhancement, still falls within the realm of auricular acupuncture.

The present invention also provides methods not based upon acupuncture technique or "points" but rather peripheral nerve field stimulation, anatomical location of cranial nerves, peripheral nerves, arterial branches and/or neurovascular bundles, and energy transfer based upon accepted laws of energy transfer in human tissue. Peripheral nerve field stimulation is an accepted procedure for the affecting of targeted nerves to alter pain transmission on a local (peripheral) and CNS (central nervous system) level. PNFS is commonly used in the occipital nerves (branches of the cervical nerves) for headache control, and the femoral nerve of the leg for control of phantom limb pain, stump pain, and other types of peripheral pain. The PNFS technique is based upon neuro-anatomy, blood vessel anatomy, proximity of the electrodes to the actual nerves being stimulated, and verification of electrode proximity.

Without wishing to be bound by theory, the method of auricular application of PNFS relies on the fact that located within the ear are cranial nerves V, VII, IX, X which anastomose (connect) directly into the brain and branches of the greater and lesser occipital nerves anastomosing directly into the cervical spine. There are distinct areas of the auricle on both the dorsal and ventral aspect which carry a predominance/concentration of the cranial nerves, peripheral nerves, arterial branches, and neurovascular bundles.

Branches of the superior temporal artery and the posterior auricular artery are found within the external ear, entering from the anterior (ventral) and posterior (dorsal) aspect of the ear. These arteries converge in the lobe, branching eventually into the cellular level forming a complex, interconnecting network branching according to Mandelbrot's set.

These physical entities can be selectively targeted by percutaneous implantation of one or more electrode/needle complex(s) either with a single needle or an array connected to a generator set at a selected frequency or modulating frequency range.

The nerves and arteries converge into neurovascular bundles. Visualization of the bundles can be achieved by transillumination of the ear, ultrasonic imaging or other techniques used to visualize or infer these particular kinds of anatomy.

Application of these procedures, is rationale, and verification is unique to the disclosed technique(s) and varies from the previously held concepts of auricular acupuncture in the following manner:
a) The verification of the bundles is ascertained by physical anatomy and visualization.
b) There are anatomical areas, which have concentrations of the cranial nerves and arterial branches but no set "points" to learn and follow. Location of placement of the electrode/needle complex must be individualized and is not "pre set".
c) The theory is based on neurovascular stimulation and targeted stimulation of the cranial nerves or peripheral nerves, not acupuncture points (chi, hot/cold, or reflex points).

This is accomplished due to the thickness of the tissue of the external ear is thin enough that a focused light (transilluminator) can pass through the tissue (transillumination). Also, there is a difference in density between the auricular tissues and the auricular neurovascular bundles allowing the bundles to be visualized and outlined. Finally, both measurement of the rate of arterial blood flow and the vessel anatomy can be visualized and isolated using ultra sonic imaging and other techniques used to directly visualize neurovascular or vascular tissues.

The electrode/needle complex(s) are implanted percutaneously to stimulate the arterial branches, the cranial nerves, peripheral nerves and the neurovascular bundles. There is a natural tissue resistance to electricity. The implantation must be within 2 mm of the nerve and vascular tissue to have an effect. The implanted needle cannot be directly into an arterial branch. percutaneous implantation of one or more needle/electrode complex(s) or an array beyond the capability of the tissue to transfer the electricity will cause tissue damage and pain with little or no energy transfer to the neurovascular bundles, arterial branches, peripheral or cranial nerves. Percutaneous implantation of a needle or needle/array directly into a main arterial branch will cause pain and bleeding. This application technique/method and energy transfer is based on both Coulomb's law and Ohm's law.

The verification of the cranial nerves, peripheral nerves, arterial branches, and neurovascular bundles are ascertained by anatomy and visualization. There are anatomical areas (zones), which have predictable and reproducible concentrations of the cranial nerves, peripheral nerves, arterial branches, and neurovascular bundles but no set "points" to learn and follow. Electrode/needle implantation must be within parameters of the electrode design, generator design, and tissue resistance as determined by Coulomb's and Ohm's laws. The combination of the understanding of anatomy, visualization, and proper percutaneous implantation of the needle/electrode array will determine proper transfer of the electricity into the neurovascular bundles. Without using this unique method, the electrode/needle implantation into the auricle is not accurate.

In one embodiment, the application method can be performed as follows:

Clean off the skin of the dorsal and ventral of the ear with an astringent. This removes surface oils, make up, etc. which may interfere with implantation and energy transfer from the generator.

Using a transilluminator, ultra sonic imaging, or other visualization techniques, the area (zone) into which there is a concentration of cranial nerves, occipital nerves, neurovascular bundles, and branches of the superficial temporal and posterior auricular arteries are targeted as per our guidelines. Choose the area that corresponds to the neuroanatomy, which is to be targeted.

In one embodiment, transillumination technique can be performed as follows:

a) Place the lighted, optic tip of the transillumination device directly against the skin on the ventral or dorsal aspect of the ear at 90 degrees so the concentrated light passes through the tissue. The light can be a direct, focused light or an array of lights of any color spectrum. Since the light passes through the tissue and the auricular tissue has a different density than the neurovascular bundles, this will in essence outline the arterial branches and the neurovascular vascular bundles so they can be seen.

b) Implant the needle/electrode complex(s) percutaneously within 2 mm of the neurovascular bundles (as visualized) but not directly into an arterial branch by placing the needle into the skin at 90 degrees from either the dorsal or ventral aspect of the ear depending upon which of the cranial nerves, occipital nerves, neurovascular bundles, or arterial branches are to be targeted. The needle should not be inserted directly into a main arterial branch. The needle must pass through the outer dermis to be classified as percutaneous. Placing any type of stimulation to the outer skin without complete skin penetration is considered transcutaneous.

c) Verification of correct placement is by determined by patients noting the pulsing of the electricity, and/or enlarging of the associated arteries by unaided visual inspection. In one embodiment, the method further comprises following up with transillumination as per described protocol to help verify arterial reaction. In another embodiment, the method further comprises measurement of an increase in blood flow, as measured or determined by any method or device.

Now turning to methods of utilizing the above described devices. For example, methods for treating pain and inflammation. As touched upon above, the external ear contains branches of nerves, which project to the nucleus tractus solitarius (NTS) and communicate with other brain structures involved in autonomic control and pain such as the amygdala. The dorsal and ventral aspects of the auricle are heavily vascularized from branches of the superficial temporal artery (STA) and the posterior auricular artery (PAA). Cranial Nerves V, VII, IX, X; as well as branches of the greater and lesser occipital nerves are also present in a predicable anatomical fashion. Thus, in some embodiments, the method described herein comprises a clinician targeting specific cranial neurovascular bundles.

The methods described herein may comprise stimulated sources of extrinsic perivascular innervation, such as those that carry sensory, sympathetic, and parasympathetic nerves. A neurovascular unit includes the functional unit of the endothelial cells, perivascular nerves, and astrocytes. These nerves have different origins and neurotransmitters that can be extrinsic or intrinsic. The external auricle is includes all three embryological tissues that can have influences on the autonomic nervous system. In particular, the trigeminal nerve, vagus nerve, and cervical plexus innervate different areas of the ear. The methods described herein may comprise stimulating one or more of the trigeminal nerve, the vagus nerve, and the cervical plexus.

The auriculotemporal branch of the trigeminal nerve (CNV) supplies the anterior upper part of the helix consisting mostly of mesodermal tissue. This nerve runs with the superficial temporal artery that supplies the ear. The vagus nerve (CN X) innervates the auricular concha which consists mostly of endodermal tissue. The auricular branch of the vagus nerve passes into the jugular fossa and enters the superior vagal ganglion where their nerve cell bodies are located. Finally, the lesser occipital nerve (C3) innervates the posterior part of the helix and the great auricular nerve (C2, C3) innervates the auricular lobule both of which are mostly ectodermal in embryological origin.

The extended amygdala has been shown to play a role in pain processing. The methods and devices described herein may be utilized to treat these symptoms. For example, in some embodiments, the devices and methods described herein may show a reduction in the baseline firing of neurons in the central nucleus of the amygdala and a decrease in response to somatic stimulation. In some embodiments, the methods and devices described herein result in neuromodulation of limbic structures that could help alleviate pain and offer a noninvasive, drug free alternative to pain therapy.

The apparatuses and methods disclosed herein may reduce sympathetic activity and increase parasympathetic activity by electrical stimulation of the associated cranial nerve bundles via percutaneous implantation of needle arrays into the dermis of the peri-auricular region. Without intending to be bound by theory, it is believed that the methods and devices describes herein activate the nucleus tractus solitarious (NTS), the hypothalamus, the amygdala, and the rostral ventromedial medulla (RVM), affecting both sympathetic and parasympathetic feedback loops into the gray matter of the dorsal horn of the spinal column. As such, the methods and devices described herein may result in disruption of ascending nociceptive stimuli and blocking of descending signals releasing endogenous endorphins and other cytokines.

In one embodiment, the methods and devices described herein can be used for both human clinical medicine and veterinary applications. Thus, a "patient" can be administered a method herein, and can be human or, in the case of veterinary applications, can be a laboratory, agricultural, domestic, or wild animal. In one aspect, the patient can be a human, a laboratory animal such as a rodent (e.g., mice, rats, hamsters, etc.), a rabbit, a monkey, a chimpanzee, domestic animals such as dogs, cats, and rabbits, agricultural animals such as cows, horses, pigs, sheep, goats, and wild animals in captivity such as bears, pandas, lions, tigers, leopards, elephants, zebras, giraffes, gorillas, dolphins, and whales.

It should be appreciated that the methods and devices disclosed herein constitute an effective, non-pharmacological approach for treating patients having pain and/or inflammation issues. This non-pharmacological approach may 1) entail minimal clinician training, 2) be readily available to physicians and advanced care providers, and 3) have minimal to no side-effects. In some embodiments, the methods and devices described herein can be used by physician extenders without limitations on the number of subjects treated. In general, the methods and devices described herein offer rapid and effective treatment for undesirable symptoms that could lead to improved treatment outcomes.

Electrical Nerve Field Stimulation Devices

The nerve may be stimulated by a device including a generator for generating electrical stimulation pulses, as described herein, with defined stimulation parameters. As discussed above, the stimulator may comprise at least one needle electrode array for insertion into the skin surface of an area to be stimulated. Also, the stimulator device may comprise a power supply for supplying the generator with electrical energy. Examples of devices that may be used in accordance with this disclosure include the electrical devices described herein along with the various parameters and conditions described above.

In one embodiment, the auricular peripheral nerve stimulator devices of the present disclosure are a battery-operated, single-use devices that have a preprogrammed frequency, pulse, and duration for the stimulation of selected cranial and/or peripheral nerves and corresponding neural vascular bundles of auricular and periauricular areas. In one embodiment, the device power supply connects via three or more electrical conduit wires, sheathed in electrically insulating material, to one or more therapy electrode arrays comprised of multiple needles each and one reference electrode.

In another embodiment, the device comprises two or more needle arrays comprised of multiple needles each. In another embodiment, the device comprises three or more needle arrays comprised of multiple needles each. In another embodiment, the device comprises four or more needle arrays comprised of multiple needles each. In another embodiment, the needle arrays are comprised of two or more needles each. In another embodiment, the needle arrays are comprised of three or more needles each. In another embodiment, the needle arrays are comprised of four or more needles each. In another embodiment, the needle arrays are comprised of five or more needles each. In another embodiment, the needle arrays are comprised of six or more needles each.

The stimulation devices of the present disclosure may include a generator for generating stimulation pulses with defined stimulation parameters, such a defined voltage or a defined current, a defined duration, a defined repetition frequency and a defined duty cycle.

The electrical stimulation device electrical stimulation pulses may have a repetition frequency of about 0.5 to about 100 Hz, about 0.5 to about 50 Hz, about 0.5 to about 25 Hz, about 0.5 to about 10 Hz, about 1 to about 100 Hz, about 1 to about 50 Hz, about 1 to about 25 Hz, or about 1 to about 10 Hz. Also, the electrical stimulation device electrical stimulation pulses may have a duty cycle of about 10 to about 90%, about 10 to about 70%, about 20 to about 90%, about 20 to about 70%, about 30 to about 90%, about 30 to about 70%, or about 40 to 60%. In some embodiments, the stimulation pulses are generated at a constant current amplitude.

In some embodiments, the stimulation conditions may be adjusted based on a patient's muscle activity, parameters corresponding to breathing, or parameters corresponding to cerebral activity, such as electrical activity of neural cells including brain cells, or electrical activity recorded from the ear or any other suitable point on the body of a human being. Other sensors may be applied as well, like a sensor to measure body temperature, a sensor to measure pressure, and a sound sensor, like a microphone.

In some embodiments, each therapy electrode has two or more needle electrodes, which in an exemplary embodiment is four (4) in number. In one embodiment, the number of therapy electrodes is selected from the group consisting of 2, 3, 4, 5, 6, 7, 8, 9, 10, or more. In another embodiment, the number of needle electrodes per therapy electrode is selected from the group consisting of 2, 3, 4, 5, 6, 7, 8, 9, 10, or more. In one embodiment, the number of needle electrodes per therapy electrode is 2-10. In one embodiment, the number of needle electrodes per therapy electrode is 3-9. In one embodiment, the number of needle electrodes per therapy electrode is 4-8.

Each reference electrode includes at least at least one needle electrode. The therapy electrodes and reference electrode are inserted into the skin surface in the area to be stimulated. The reference electrode provides a ground connection for electronic circuit located within the stimulator.

The devices of the present disclosure provide an apparatus for stimulating auricular points on the human ear is provided using low voltage pulses that are generated and delivered by portions of the apparatus, particularly by percutaneously implanted needle electrodes into the cranial and/or peripheral nerves and corresponding neural vascular bundles of the auricular and periauricular areas.

In order to attach the devices described herein to a patient's skin surface, a fastening element, such as an adhesive element, may be provided. Besides the adhesive element, other fastening methods, e.g. via magnets, elastic bands or the like can be used.

In yet another embodiment, the devices described herein are single use devices that are physician applied for ambulatory, continuous, home based therapy. These devices may be percutaneously implanted into the cranial and/or peripheral nerves and corresponding neural vascular bundles of the auricular and periauricular areas as ascertained by the disclosed method of evaluating and implanting of the electrode/needle array. This includes transillumination of the auricular and periauricular tissues and surrounding neurovascular anatomy. The auricular peripheral nerve stimulator system allows for continuous, intermittent neural stimulation for about 1 day, about 2 days, about 3 days, about for days, or about 5 days.

In another embodiment, the devices are ambulatory, physician applied, minimally invasive applications of electrical neural stimulation implanted directed into the neurovascular bundles of the external ear verified by transillumination co-joined with skin impedance measurement. In another embodiment, a generator located behind the ear, produces electrical stimulation impulses, which are transferred via an electrode/needle array to branches of cranial and/or occipital nerves and sympathetic fibers of the arterial branches.

In another embodiment, electrode/needle array implantation into the skin of the ear allows for direct access to branches of cranial nerves V, VII, IX, and X as well as branches of the occipital nerves. Direct access to the arterial branches of the head and neck are accessible and reduction of sympathetic stimulation results in an increase of vascular flow rate, reduction of vascular resistance and increase of perfusion. The arterial branches of the superficial temporal artery and the posterior auricular artery form a rich interconnecting complex network the terminal branches of which anastomose throughout the ear.

In another embodiment, the auricular peripheral nerve stimulator alters production and utilization of serotonin via vagal stimulation, and meningovascular dilation secondary to decreased sympathetic (or increased parasympathetic) tone.

In some embodiments, the devices described herein are provided in disposable convenience kits comprising one or more of a generator, sterile wire leads with arrays attached, transilluminator, tweezers, surgical marking pen, several adhesives, bandages, disinfectant, and IFU (instructions for use).

Methods of Electrical Nerve Field Stimulation

The methods described herein may comprise using a stimulator device as described herein. The device may be physician applied for ambulatory, continuous, home based therapy. In one embodiment, a stimulator is percutaneously implanted into the cranial and/or peripheral nerves and corresponding neural vascular bundles of the auricular and periauricular areas as ascertained by the method of evaluating and implanting of the electrode/needle array provided in the present invention. This includes transillumination of the auricular and periauricular tissues and surrounding neurovascular anatomy. The auricular peripheral nerve stimulator system allows for continuous, intermittent neural stimulation.

First, the chosen external ear may be cleaned with an astringent to remove any surface oils or debris. Furthermore, the subject's external ear and the generator location may be disinfected by alcohol pads.

Next, the patient's ear is transilluminated to identify neurovascular bundles that are to be avoided during needle implantation. More particularly, methods described herein may include transillumination of the auricular and periauricular tissues and surrounding neurovascular anatomy depending upon the symptoms or other conditions of a particular patient. It should be appreciated that one skilled in the art can identify auricular points and/or their correlation with different health. Once such points are identified by a health care professional, the device of this invention is employed to deliver a pulsed voltage to such points.

Visualization may be accomplished due to the thickness of the tissue of the external ear being thin enough that a focused light (transilluminator) can pass through the tissue (transillumination). Also, there is a difference in density between the auricular tissues and the auricular neurovascular bundles allowing the bundles to be visualized and outlined. In other embodiments, both measurement of the rate of arterial blood flow and the vessel anatomy can be visualized and isolated using ultra sonic imaging and other techniques used to directly visualize neurovascular or vascular tissues.

The verification of the cranial nerves, peripheral nerves, arterial branches, and neurovascular bundles may be ascertained by anatomy and visualization. There are anatomical areas (zones), which have predictable and reproducible concentrations of the cranial nerves, peripheral nerves, arterial branches, and neurovascular bundles but no set "points" to learn and follow. The combination of the understanding of anatomy, visualization, and proper percutaneous implantation of the needle/electrode array may determine proper transfer of the electricity into the neurovascular bundles.

Also, as discussed above, the dorsal and ventral aspects of the auricle are heavily vascularized from branches of the superficial temporal artery (STA) and the posterior auricular artery (PAA). Cranial Nerves V, VII, IX, X; as well as branches of the greater and lesser occipital nerves are also present in a predicable anatomical fashion. In some embodiments, this helps the clinician to target specific cranial neurovascular bundles.

In one particular embodiment, a lighted, optic tip of a transillumination device is placed directly against the skin on the ventral or dorsal aspect of the ear at 90 degrees so the concentrated light passes through the tissue. The light can be a direct, focused light or an array of lights of any color spectrum. Since the light passes through the tissue and the auricular tissue has a different density than the neurovascular bundles, this may in essence outline the arterial branches and the neurovascular vascular bundles so they can be seen.

Random percutaneous implantation of the arrays into a heavily vascularized area could result in a high incidence of bleeding. The technique of transillumination avoids random placement and may help reduce the incidence of insertion directly into the peripheral arterial branches, greatly reducing the potential of bleeding. The use of FDA approved bio-compatible materials, sterilization of the arrays and proper skin disinfecting technique, as outlined in the IFU (instructions for use) reduces the incidence of dermatitis, and practically eliminates the chance of infection.

The electrode/needle complex(s) may be implanted to stimulate the nerves including but not limited to the arterial branches, the cranial nerves, peripheral nerves, and the neurovascular bundles. The generator may be attached with adhesive to the skin behind the ear just over the mastoid process. Needles are inserted into the dorsal and ventral aspects of the ear. The needles may be placed within about 1 to about 1.5 mm of the visible arterial branches to create a field effect. In some embodiments, the electrode/needle array connected to the lead wires are percutaneously implanted into the proper anatomical location being sure to penetrate the skin so implantation is percutaneous within about 1 mm or within about 2 mm of the chosen neurovascular bundles. The devices may be implanted using a percutaneous or transcutaneous approach.

There is a natural tissue resistance to electricity. The implanted needle cannot be directly into an arterial branch. Percutaneous implantation of one or more needle/electrode complex(s) or an array beyond the capability of the tissue to transfer the electricity will cause tissue damage and pain with little or no energy transfer to the neurovascular bundles, arterial branches, peripheral or cranial nerves. Percutaneous implantation of a needle or needle/array directly into a main arterial branch will cause pain and bleeding.

In one particular embodiment, the needle/electrode complex(s) is implanted percutaneously within 2 mm of the neurovascular bundles (as visualized) but not directly into an arterial branch by placing the needle into the skin at 90 degrees from either the dorsal or ventral aspect of the ear depending upon which of the cranial nerves, occipital nerves, neurovascular bundles, or arterial branches are to be targeted. The needle should not be inserted directly into a main arterial branch. The needle must pass through the outer dermis to be classified as percutaneous. Placing any type of stimulation to the outer skin without complete skin penetration is considered transcutaneous.

The actual location and determination of needle placement (called points) may be similar to those of the tradition and theory of acupuncture. However, the present invention provides methods not based upon acupuncture technique or "points" but rather peripheral nerve field stimulation, anatomical location of cranial nerves, peripheral nerves, arterial branches and/or neurovascular bundles, and energy transfer based upon accepted laws of energy transfer in human tissue. Therefore, in some embodiments, the method does not require precise placement of needles in specific "acupoints." Peripheral nerve field stimulation considers neuroanatomy, blood vessel anatomy, proximity of the electrodes to the actual nerves being stimulated, and verification of electrode proximity.

The methods described herein vary from auricular acupuncture in several ways. For example, the verification of the bundles may ascertained by physical anatomy and visualization; there are anatomical areas, which have concentrations of the cranial nerves and arterial branches but no set "points" to learn and follow; location of placement of the electrode/needle complex must be individualized and is not "pre set;" and the methods comprise neurovascular stimulation and targeted stimulation of the cranial nerves or peripheral nerves, not acupuncture points (chi, hot/cold, or reflex points).

Verification of correct placement may be determined by patients noting the pulsing of the electricity, and/or enlarging of the associated arteries by unaided visual inspection. In one embodiment, the method further comprises following up with transillumination as described herein to help verify arterial reaction. In another embodiment, the method further comprises measurement of an increase in blood flow, as measured or determined by any method or device.

In some embodiments, upon percutaneous implantation and activation of a generator, a fractal geometric electronic field is produced which is designed to stimulate the targeted neurovascular bundles.

The methods may comprise delivering about 0.5V to about 10V, about 1V to about 7V, about 1V to about 5V, about 2 to about 4V or about 3.2V. The voltage may be delivered with alternating frequencies of stimulation.

The methods described herein may be applied for about 10 minutes, about 15 minutes, about 30 minutes, about 1 hour, about 3 hours, about 6 hours, about 12 hours, about 1 day, about 2 days, about 3 days, about 4 days, about 5 days, up to about 10 minutes, up to about 15 minutes, up to about 30 minutes, up to 1 about hour, up to 3 about hours, up to 6 about hours, up to about 12 hours, up to about 1 day, up to about 2 days, up to about 3 days, up to about 4 days, up to about 5 days, or up to about 7 days. In some embodiments, stimulation is provided for a total of about 120 hours, allowing for physician applied ambulatory treatment of, e.g. pain.

The method may comprise careful monitoring of the patient's vital signs and the availability of immediate supportive care. In some embodiments, a patient is assessed by measuring heart rate, sweating, restlessness, pupil size, somatic pain, runny nose, GI upset, tremors, yawning, anxiety or irritability, gooseflesh skin, or a combination thereof. In some embodiments, due to the stimulation of the peripheral branches of the Vagus nerve, possible vaso-vagal response may be taken into consideration. Patient's pre-existing health conditions such as seizures, bleeding disorders, on-demand electrical implants, medications, and autonomic nervous system status may be taken into consideration.

Depending upon the type of pain or discomfort as described herein, a wide range of permissible conditions for treatment are contemplated herein. The treatment sessions may be single or divided, and may be administered according to a wide variety of protocols, including q.d., b.i.d., t.i.d., or even every other day, biweekly (b.i.w.), once a week, once a month, once a quarter, and the like. Further, a staggered regimen, for example, one to five days per week can be used as an alternative to daily treatment, and for the purpose of the methods described herein, such intermittent or staggered daily regimen is considered to be equivalent to every day treatment and is contemplated. In various embodiments of the invention, the methods and devices described herein may be administered more than once and intermittently. By "intermittent administration" is intended administration of effectivive conditions, followed by a time period of discontinuance, which is then followed by another administration of the effective conditions. Additional treatment sessions may be administered to the patient to prevent the reccurence of symptoms.

Any effective regimen for administering the devices and methods described herein can be used. Effective conditions, as herein defined, may be dependent upon many factors, including but not limited to, the type of disease or condition and its severity, i.e., the extend of the patient's pain or discomfort, the patient's general health, size, age, and the nature of the treatment, i.e. short-term or chronic treatment.

As further described herein, the methods of the present disclosure lead to low reported incidences of bleeding, dermatitis, infection, and syncope support these positions. Nevertheless, in some embodiments the methods described herein further comprise monitoring of the patient's vital signs and/or immediate availability of supportive care.

Drug(s)

In accordance with one embodiment of the present disclosure, the methods and devices described herein can be utilized in combination with a pharmacological approach. For example, the methods and devices described herein may comprise co-administering one or more drugs. The term "co-administered" as used herein means that the drug may be administered together with the devices and methods of the present disclosure as part of a single treatment step or as separate, multiple steps. For example, a drug(s) can be administered before, after, or in conjunction with the methods and devices of the present disclosure to enhance or supplement their effectiveness in treating pain, inflammation, or discomfort. In accordance with one embodiment, the patient is treated with the methods and devices described herein, immediately followed by administering a drug(s). Advantageously, when the methods and devices described herein are administered in conjunction with other agents used for treating pain or discomfort, the amount of the active agents needed for efficacy may be reduced relative to when one agent is used alone.

Alternatively, the additional agent may be administered prior to, consecutively with, or following the administration of a device of the present disclosure. The co-administration of a device and a second therapeutic agent to a patient does not preclude the separate administration of that same therapeutic agent, any other second therapeutic agent or any therapeutic compound to the patient at another time during a course of treatment.

In some aspects of these embodiments, a parenteral dosage form selected from the group consisting of intradermal, subcutaneous, intramuscular, intraperitoneal, intravenous, and intrathecal may be employed to administer a drug(s).

In some embodiments the drug(s) is provided as a salt. Suitable acid addition salts are formed from acids which form non-toxic salts. Illustrative examples include the acetate, aspartate, benzoate, besylate, bicarbonate/carbonate, bisulphate/sulphate, borate, camsylate, citrate, edisylate, esylate, formate, fumarate, gluceptate, gluconate, glucuronate, hexafluorophosphate, hibenzate, hydrochloride/chloride, hydrobromide/bromide, hydroiodide/iodide, isethionate, lactate, malate, maleate, malonate, mesylate, methylsulphate, naphthylate, 2-napsylate, nicotinate, nitrate, orotate, oxalate, palmitate, pamoate, phosphate/hydrogen phosphate/dihydrogen phosphate, saccharate, stearate, succinate, tartrate, tosylate and trifluoroacetate salts.

Suitable base salts of the secondary drug described herein are formed from bases which form non-toxic salts. Illustrative examples include the arginine, benzathine, calcium, choline, diethylamine, diolamine, glycine, lysine, magnesium, meglumine, olamine, potassium, sodium, tromethamine and zinc salts. Hemisalts of acids and bases may also be formed, for example, hemisulphate and hemicalcium salts.

In one embodiment, a patient is administered a composition comprising the secondary drug in a standard pharmaceutically acceptable carrier using any of the standard routes of administration known those skilled in the art. The carriers can be excipients. The choice of carrier will to a large extent depend on factors such as the particular mode of administration, the effect of the carrier on solubility and stability, and the nature of the dosage form. Pharmaceutical compositions suitable for the delivery of a therapeutic compound and methods for their preparation will be readily apparent to those skilled in the art. Such compositions and methods for their preparation may be found, for example, in Remington: The Science & Practice of Pharmacy, 21th Edition (Lippincott Williams & Wilkins, 2005), incorporated herein by reference.

In one illustrative aspect, a pharmaceutically acceptable carrier includes any and all solvents, dispersion media, coatings, antibacterial and antifungal agents, isotonic and absorption delaying agents, and the like, and combinations thereof, that are physiologically compatible. In some embodiments, the carrier is suitable for parenteral administration. Pharmaceutically acceptable carriers include sterile aqueous solutions or dispersions and sterile powders for the extemporaneous preparation of sterile injectable solutions or dispersions. Supplementary active compounds can also be incorporated into compositions of the invention.

The pharmaceutical compositions of the invention include those suitable for oral, rectal, nasal, topical (including buccal and sublingual), vaginal or parenteral (including subcutaneous, intramuscular, intravenous and intradermal) administration. In certain embodiments, the drug is administered transdermally (e.g., using a transdermal patch or iontophoretic techniques). Other formulations may conveniently be presented in unit dosage form, e.g., tablets, sustained release capsules, and in liposomes, and may be prepared by any methods well known in the art of pharmacy.

In certain embodiments, the drug is administered orally. Compositions of the present invention suitable for oral administration may be presented as discrete units such as capsules, sachets, or tablets each containing a predetermined amount of the active ingredient; a powder or granules; a solution or a suspension in an aqueous liquid or a nonaqueous liquid; an oil-in-water liquid emulsion; a water-in-oil liquid emulsion; packed in liposomes; or as a bolus, etc. Soft gelatin capsules can be useful for containing such suspensions, which may beneficially increase the rate of compound absorption.

In one aspect, a drug as described herein may be administered directly into the blood stream, into muscle, or into an internal organ. Suitable routes for such parenteral administration include intravenous, intraarterial, intraperitoneal, intrathecal, epidural, intracerebroventricular, intraurethral, intrasternal, intracranial, intratumoral, intramuscular and subcutaneous delivery. Suitable means for parenteral administration include needle (including microneedle) injectors, needle-free injectors and infusion techniques.

In various embodiments, formulations may be for immediate and/or modified release. In one illustrative aspect, active agents of the drug compound may be administered in a time-release formulation, for example in a composition which includes a slow release polymer. The second compound can be prepared with carriers that will protect the second compound Biodegradable, biocompatible polymers can be used, such as ethylene vinyl acetate, polyanhydrides, polyglycolic acid, collagen, polyorthoesters, polylactic acid and polylactic, polyglycolic copolymers (PGLA). Methods for the preparation of such formulations are generally known to those skilled in the art. In another embodiment, the secondary drug described herein may be continuously administered, where appropriate.

In one embodiment a kit is provided for administering the devices and a drug(s) described herein to a patient. The kit comprises a device of the present disclosure, optionally one or more secondary drugs, and optionally means for separately retaining the compositions, such as a container, divided bottle, or divided foil packet. Depending on the route of administration, the kit may include an inhaler if said second composition is an inhalable composition; a syringe and needle if said second composition is an injectable composition; a syringe, spoon, pump, or a vessel with or without volume markings if said composition is an oral liquid composition; or any other measuring or delivery device appropriate to the dosage formulation of the composition present in the kit. In one embodiment the kit is provided with a device for administering the second composition to a patient, e.g. syringe needle, pen device, jet injector or other needle-free injector. In one embodiment the device is a syringe. In some embodiments, the kit includes instructions for use of the bridge and optionally one or more secondary drugs.

Analgesia and Hemodynamics

In some embodiments, stimulating cranial nerves by peri-auricular PENFS may alter intracranial hemodynamics. More particularly, the methods disclosed herein provide a nonpharmaceutical approach to alteration of intracranial hemodynamics to achieve analgesia.

In some embodiments, the methods disclosed herein stimulate the cranial nerves anatomically located in the peri-auricular area directly affecting the extrinsic perivascular innervation, as well as the micro-vascular bed, of the intracranial arteries to decrease flow resistance and increase cerebral perfusion.

Auto-regulation of cerebral blood flow refers to the ability to maintain a relatively constant blood flow despite changes in perfusion pressure. Auto-regulation is particularly well developed in the brain. Chronic pain, inflammation, neuropsychiatric disorders, and stress may alter the autonomic nervous system and bias ANS/CNS auto-regulation through multiple pathways.

Neuromodulation using the methods and devices of the present disclosure alters hemodynamics of cerebral circulation. These devices and methods produce significant changes in cerebral hemodynamics as a result of cranial nerve stimulation.

Neuromodulation utilizing the methods and devices of the present disclosure may be administered as a therapeutic approach for pain conditions. Stimulation of cranial and cervical nerves described herein may have an effect on the neuromatrix, altering the neuro-modulating feedback loops; resulting in pain reduction. Stimulating these cranial nerves, and their posited effects upon the neuromatrix also may predict altered autonomic modulation of intracranial hemodynamics.

Without intending to be bound by theory, the neuromatrix theory predicts pain perception and response to be moderated by a series of entangled feedback loops, consistent with the maintenance of homeostasis. It further predicts pain-modulating factors outside of the somatic sensory pathways. Several cranial and cervical nerves participate in both the somatic and exo-somatic pathways of the neuromatrix, and thus pain modulation. Among these are CN's V, VII, X, and occipital nerve, the terminal branches of which are represented in the external human auricle.

In some embodiments, hemodynamics may be measured using transcranial Doppler (TCD). As used herein, TCD refers to a noninvasive ultrasound evaluation of the cerebral arteries in real-time. It involves using a low frequency, e.g. 2 MHz or less, transducer on specific bone windows to allow for dynamic monitoring of cerebral blood flow velocity and vascular resistance.

Combined with waveform morphology, indices derived from flow velocity readings including the Gosling's pulsatility index (PI) and the Pourcelot resistivity index (RI) identify increased cerebral vascular resistance and hyper dynamic flow states, which may be used to characterize certain clinical conditions. The TCD ultrasound uses pulsed wave Doppler to image at various depths, and the received echoes generate electrical pulses in the ultrasound transducer that are processed to produce spectral waveforms with peak systolic velocity and end diastolic velocity values.

In some embodiments, the device stimulates the extrinsic perivascular innervation and the micro-vascular bed to decrease flow resistance and increase cerebral perfusion after percutaneous implantation and activation in the peri-auricular region. Peripheral vascular constriction is a result of sympathetic stimulation. Vagal stimulation can reduce sympathetic drive.

In some embodiments, the methods and devices described herein produce a neuro-modulating signal ranging from about 1 to about 10 kQ in intervals of about 100 ms, a bipolar impulse width of about 1 ms with a duty cycle of about 2 hr duty/2 hr rest for a total of about 120 hours.

Amygdala

In some embodiments, neurostimulation with the methods and devices described herein decreases the baseline firing of amygdala neurons and attenuates the response to somatic stimulation. The amygdala, in particular, is a brain region which is involved in pain processing, and activation of this area has also been associated with the emotional component of pain and fear. Attenuation may occur within about 10 minutes, within about 15 minutes, within about 30 minutes, or within about 1 hour. Without intending to be bound by theory, this attenuation may modulate pain responses in both humans and animals.

Lumbar Spinal Neurons

In some embodiments, neurostimulation with the methods and devices described herein may also alter the response characteristics of lumbar spinal cord neurons. More particularly, neurostimulation with the methods and devices described herein may decrease the spontaneous firing and response to somatic stimulation of lumbar spinal neurons. In further embodiments, auricular stimulation as described herein influences the descending modulatory effect on spinal neurons.

Abdominal Pain

In some embodiments, the methods and devices described herein may be used as a non-pharmacological treatment option for patients with chronic abdominal pain, such as functional abdominal pain disorders including but not limited to irritable bowel syndrome (IBS). For example, the methods and devices described herein may be used to treat functional abdominal pain associated with IBS in patients from about 11 to about 18 years of age.

In some embodiments, the methods described herein result in about 10%, about 20%, about 30%, or about 40% improvement in abdominal pain. Abdominal pain may be measured based on patient reported outcomes (PROs). In some embodiments, auricular neurostimulation as described herein may significantly prevent the development of post-inflammatory visceral and somatic hypersensitivity, scuh as that associated with TNBS colitis.

Hyperalgesia occurs with IBS and refers to an exaggerated pain response to a normally noxious stimulus. Visceral and somatic hyperalgesis can occur in humans and animals following inflammation in the colon. In some embodiments, a patient develops chronic IBS following a gastrointestinal infection.

The methods and devices described herein include the following examples, i.e. examples 1-4. The examples further illustrate additional features of the various embodiments of the invention described herein. However, it is to be understood that the examples are illustrative and are not to be construed as limiting other embodiments of the invention described herein. In addition, it is appreciated that other variations of the examples are included in the various embodiments of the invention described herein.

Example 1

This Example investigated the intracranial hemodynamic effect of peri-auricular PENFS. For this study the Electro Accupuncture Device (EAD), (Innovative Health Solutions, INC, Versailles, Ind.), was used. The treatment protocol produced significant changes in cerebral hemodynamics as a result of direct cranial nerve stimulation as detected by Transcranial Doppler ultrasonography.

The EAD was powered by 3 1V batteries. After activation the device produced a neuro-modulating signal ranging from 1-10 kQ in intervals of 100 ms, a bipolar impulse width of 1 ms with a duty cycle of 2 hr duty/2 hr rest for a total of 120 hours.

A single 10-minute percutaneous neuromodulating stimulation was performed on a cohort of 12 healthy adult patients during a 3-week span. The cohort, ages 19-64, were randomly recruited. The subjects were interviewed individually. Past medical and surgical histories were collected and screened for potentially disqualifying morbidities. All subject's questions were answered to the subject's satisfaction. Informed consents were signed. Patients were appointed individually at the test site. Upon arrival, the subjects were informed of the nature of the study. Prewritten instructions were read to assure uniform understanding of the instructions. After instructions were read, vital signs were taken and recorded.

Statistics for the variables that were measured prior to EAD implantation and TCD ultrasound measurements are presented in Table 1. The data were used to access any clinical indications for potentially disqualifying morbidities.

Next, the subject was left undisturbed for 10 minutes before an active NSS device (also Innovative Health Solutions, INC, Versailles, Ind.) was placed in a similar way as the shame device. Thereafter, the activated NSS device was implanted according to protocol. Following 10 minutes of NSS device activation, a TCD ultrasound assessment of hemodynamics of the arterial branches performed as previously indicated. The mean velocity, peak systolic velocity, end diastolic velocity, PI and RI data are respectively presented as "Tx-mean", "Tx-Peak", "Tx-Edv", "Tx-PI" and "Tx-RI" for the ACA, MCA, and PCA.

The mean baseline flow in the ACA was found to be 37.3±7.3 cm/s (mean±standard deviation). Upon activation, the mean flow was 46.5±8.1 cm/s. The mean PI and RI

TABLE 1

Collected data before TCD ultrasound measurements (N = 12)

|  | Age | Systolic | Diastolic | Pulse | Temperature | $O_2$ Air | Weight | Height | BMI |
| --- | --- | --- | --- | --- | --- | --- | --- | --- | --- |
| Mean | 34.6 | 122.5 | 74.6 | 76.6 | 97.9 | 98.4 | 161.0 | 66.8 | 25.8 |
| Median | 24.5 | 124.0 | 76.0 | 78.0 | 97.8 | 99.0 | 154.5 | 66.0 | 25.0 |
| Minimum | 19.0 | 104.0 | 62.0 | 56.0 | 97.2 | 93.0 | 125.8 | 63.0 | 20.0 |
| Maximum | 64.0 | 148.0 | 88.0 | 92.0 | 98.5 | 100.0 | 220.0 | 71.0 | 33.0 |
| Std. Dev | 16.9 | 15.0 | 8.0 | 9.8 | 0.4 | 2.1 | 30.2 | 2.4 | 3.9 |

Each subject was placed on an exam table in the supine position. For each subject, the chosen ear was disinfected with a 70% isopropyl alcohol pad and left undisturbed for 10 minutes.

After 10 minutes, a baseline TCD assessment of hemodynamics of the middle cerebral, anterior cerebral, posterior cerebral, basilar, in vertebral arteries was performed. Each TCD ultrasound assessment involved measuring the blood flow (mean, peak systolic, and end diastolic) velocities and the downstream cerebral resistance using Gosling's pulsatility index (PI) and Pourcelots resistivity index (RI). The mean velocity, peak systolic velocity, end diastolic velocity (Edv), PI and RI are designated as "Pre-mean", "Pre-Peak", "Pre-Edv", "Pre-PI" and "Pre-RI" for the anterior cerebral artery (ACA), the middle cerebral artery (MCA), and the posterior cerebral artery (PCA).

Next, a Neuro-Stem System (NSS) sham Device, (Innovative Health Solutions, INC, Versailles, Ind.), which had no batteries and percutaneous needles removed, was then placed according to protocol. Before application of the device, the serial number and bar code of the device was recorded. Each patient was placed in the supine position and left undisturbed for 10 minutes. Thereafter, the flow in the transcranial arterial branches was measured using a TCD ultrasound and recorded. The mean velocity, peak systolic, end diastolic velocity, PI and RI values are respectively presented as "Sham-mean", "Sham-Peak", "Sham-Edv", "Sham-PI" and "Sham-RI" for the ACA, MCA, and PCA. The sham device was then removed and disposed.

before activation were both ≤1.0±0.1, but decreased to 0.8±0.1 and 0.6±0.1 upon activation, respectively.

The baseline mean flow in the PCA was found to 35.6±4.9 cm/s. After implantation of the active NSS device, the mean flow rate rose to 36.0±3.9 cm/s. The baseline PI and RI were 1.0±0.2 and 0.6±0.1, respectively. When an active NSS device was implanted, both the mean PI and RI remained almost unchanged.

The mean MCA baseline flow was found to be 53.1±9.3 cm/s, and 59.4±11.8 cm/s after the active NSS device was implanted. Even after activation, the PI and RI remain almost constant at 0.9±0.2 and 0.6±0.1.

Based on a 2-tailed independent sample tests (p=0.05), the ACA, PCA, and MCA data was tested for correlation. The following variables were statistically significantly and positively correlated (p<0.05): Pre-Edv-ACA and Pre-Mean-ACA (p=0.01, r=0.838); TX-PI-PCA and TX-RI-PCA (r=0.98). The TX-PI-ACA significantly statically positively correlated to all MCA (PI, RI, Mean, Peak, EDV). The Peak-ACA and Mean-ACA were negatively correlated to both PI and RI. The Pre-Mean-ACA, Sham-Mean ACA and the TX-Mean values are weakly negatively correlated to PI-MCA and RI-MCA.

The ACA, PCA and MCA data was tested for any significant differences in variables due to differences in treatments using paired samples t-test (5% Significance level). Paired means that were statistically significantly different are presented in Table 2.

TABLE 2

Paired samples test indicating statistically significant differences (p < 0.05) between the paired means. Upper and lower limits were calculated at 95% confidence level

|  | Mean | Std. Dev. | Lower | Upper | t | p-value |
| --- | --- | --- | --- | --- | --- | --- |
| Pre_ACA - Tx_ACA | −8.675 | 10.2426 | −15.183 | −2.1672 | −2.934 | 0.014 |

TABLE 2-continued

Paired samples test indicating statistically significant differences (p < 0.05) between the paired means. Upper and lower limits were calculated at 95% confidence level

|  | Mean | Std. Dev. | Lower | Upper | t | p-value |
|---|---|---|---|---|---|---|
| pre_Peak_ACA - Sham_Peak_ACA | −10.8317 | 11.7884 | −18.322 | −3.3417 | −3.183 | 0.009 |
| Pre_Edv_ACA - Sham_Edv_ACA | −6.863 | 5.3084 | −10.236 | −3.4902 | −4.479 | 0.001 |
| Pre_PI_ACA - Sham_PI_ACA | 0.0931 | 0.0885 | 0.0368 | 0.1494 | 3.642 | 0.004 |
| Pre_PI_ACA - Tx_PI_ACA | 0.1031 | 0.1568 | 0.0034 | 0.2027 | 2.276 | 0.044 |
| Pre_RI_ACA - Sham_RI_ACA | 0.0243 | 0.0317 | 0.0041 | 0.0444 | 2.651 | 0.023 |
| pre_Peak_PCA - Sham_Peak_PCA | 6.9167 | 7.8313 | 1.9409 | 11.8924 | 3.060 | 0.011 |
| pre_Peak_MCA - Tx_Peak_MCA | −7.7106 | 10.3095 | −14.261 | −1.1603 | −2.591 | 0.025 |
| Pre_Edv_MCA - Tx_Edv_MCA | −3.9962 | 5.4508 | −7.4595 | −0.5330 | −2.540 | 0.027 |

EAD application changed the mean hemodynamic flow in the cerebral arteries, increasing by 1-19%, while the PI and RI values decreased by 2-11% from the baseline. Therefore, this Example demonstrates an increase in cerebral perfusion by decreasing resistance (decrease PI and RI) to outflow, and a significant increase in mean flow velocity was observed, which was consistent with an increase in cerebral perfusion via cerebral micro-circulatory recruitment. These results support that peri-auricular implantation of the EAD stimulates the cranial nerves anatomically located in the peri-auricular area affecting the extrinsic perivascular innervation, as well as the micro-vascular bed, of the intracranial arteries to decrease flow resistance and increase cerebral perfusion, and trigger autoregulatory mechanisms within the cranium.

Example 2

A group of 5 rats underwent extracellular single-unit recordings from neurons in the central nucleus of the amygdala (CeA). Animals were anesthetized with Urethane (induction, 1.5 g/kg, i.p.; maintenance, 0.05 mg/kg intravenously bolus to maintain plane of anesthesia). Physiological parameters including respiratory rate, heart rate and core body temperature (kept at 37° C.) were continuously monitored. Each animal was mounted in a stereotaxic frame and a small unilateral craniotomy was made to allow for the insertion of the recording electrode. Single-unit recordings from neurons were made with glass-insulated carbon filament electrodes (4-6MΩ). The following stereotaxic coordinates were used: 2.2 to 3.1 caudal to bregma, 3.8 to 4.2 lateral to midline, depth 6.5 to 8.0. The action potentials were amplified through a low-noise AC differential amplifier (model 3000; AM Systems) and continuously monitored and displayed on an oscilloscope. A dual window discriminator (modeIDDIS-1; BAK Electronics) was used to discriminate the action potentials and to convert the signal to a rectangular TTL pulse. The frequency of TTL pulses was counted on-line by using the Spike 2/CED 1401 data acquisition system (Cambridge Electronic Design). Action potentials and blood pressure were recorded on-line. After the experiments, data were analyzed using the Wave-Mark analysis method of the Spike 4 software (Cambridge Electronic Design) to distinguish individual action potentials.

In each animal, background and evoked activity of only one neuron was recorded from the right amygdala. An individual neuron was identified by its background activity and responses to brief search stimuli, which included compression of deep tissue (left paw) with a consistent force using Von Frey filaments. In each experiment, one amygdala neuron that responded to paw compression was selected and recorded. The background activity in the absence of any intentional stimulation was recorded for 5 min. Following the baseline recording, a 30 s compression of the paw was applied twice with the same Von Frey filament (190 mN) 5 min apart. After recording two compressions, the Bridge device was connected to the ear on the ipsilateral side and left undisturbed for 15 minutes. The baseline firing of the neuron and response to compression of the paw was again recorded.

Statistical analysis was performed using SigmaStat (V2.03, SPSS Inc, Chicago, Ill.). Baseline firing and response of the neurons to paw pinch was measured as action potential counts over 30 sec compression of the paw and were analyzed using one-way repeated.

Figure 30:
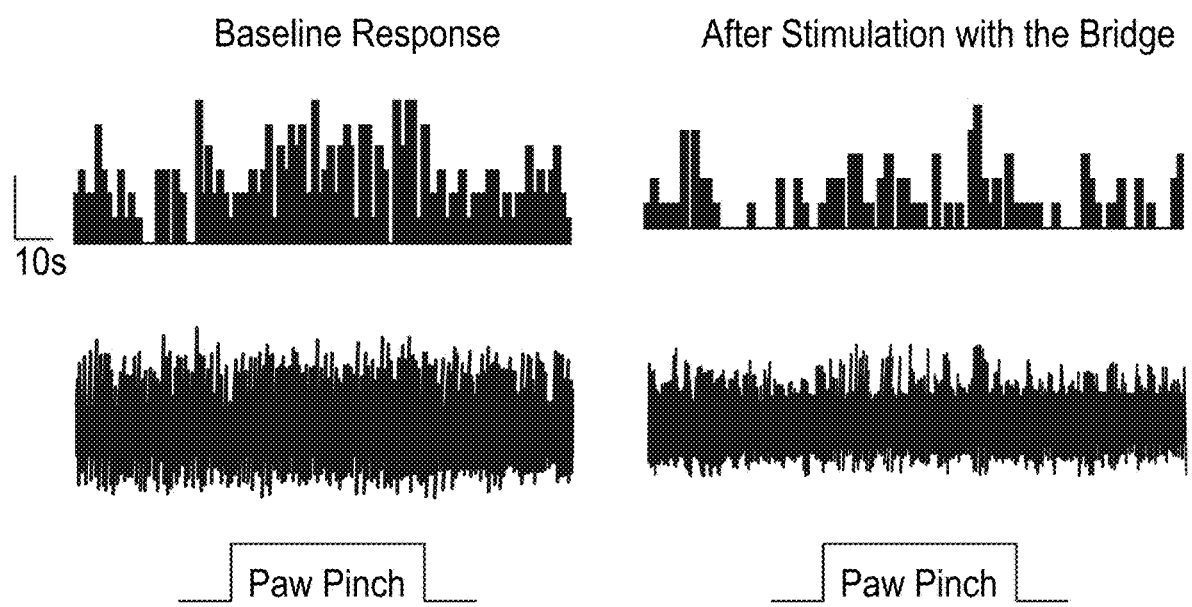
FIG. 30 shows a response of an amygdala neuron before and after auricular stimulation.

Extracellular recordings from amygdala neurons were made in 5 rats. A total of 5 neurons that responded to noxious stimuli (compression) of the hind paw were recorded. All neurons were classified as excitatory with cutaneous receptive fields mainly in the trunk and plantar surface of the paw. A typical response of an amygdala neuron before and after auricular stimulation is shown in FIG. 30, where the top trace shows response as a frequency histogram with 1 s bin width, the middle trace is neuron action potential, and the bottom trace is pay pinch duraction.

Prior to auricular stimulation, the mean spontaneous firing of the neurons was 1.15±0.36 imp/sec with an excitatory response to 3.05±0.46 after paw pinch (190 mN). There was a 52% decrease in the spontaneous firing of the neurons after just 15 minutes of auricular stimulation with the Bridge (0.56±0.21 imp/sec). Similarly, the response to compression of the paw was decreased by approximately 66% after auricular stimulation (1.04±0.29 imp/sec) (p<0.05).

Example 3

The incidence of clinically observed bleeding, localized dermatitis and infections at the implantation sites of the electrode/needle arrays, dermatitis at the site of the generator, and patient syncope was quantified. A total of 1207 Neuro-Stem System (NSS), (Innovative Health Solutions, INC, Versailles, Ind.), devices, each producing up to 16 percutaneous punctures, for a total of 19312 punctures were monitored for adverse effects, based on retrospective chart audits conducted at 6 clinical facilities over a one-year period.

All patients from the 6 participating centers, who qualified within accepted clinical guidelines, for placement of the NSS were included in this study. Both male and female patients, aged 16 to 70 years, were included in the study. Licensed clinicians were asked to retrospectively review their charting for the outlined adverse patient observations.

The six centers, which were from a wide geographic and interdisciplinary background performed a retrospective chart audit for the preceding 12 months to ascertain the incidence of specified adverse reactions to placement of a total of 1207 NSS devices. Each device had four electrode arrays consisting of 4 needles which were percutaneously implanted into the dorsal or ventral aspect of the external ear for a total of 16 percutaneous punctures per application. The result is a total cohort of 19,312 percutaneous punctures. Data from four different categories was collected:
Bleeding at any puncture site
Dermatitis at any puncture site
Dermatitis at the generator attachment site
Syncope at time of implantation The data on discomfort upon insertion of the electrodes from six different treatment centers is presented in Table 3. Out of a total 19312 punctures, 10 episodes of bleeding and 11 episodes of localized dermatitis were observed at the electrode, respectively. No incidences of syncope (fainting) or infection were observed. There were no reported incidences of syncope in this cohort. This report of findings supports a classification of minimal risk.

TABLE 3

Number of NSS device placements and the reported number of incidences of bleeding, dermatitis, severe pain, and syncope from five different treatment centers.

| | Center A | Center B | Center C | Center D | Center E | Center F |
|---|---|---|---|---|---|---|
| NSS devices | 144 | 141 | 67 | 614 | 151 | 90 |
| Bleeding | 2 | 2 | 0 | 5 | 1 | 1 |
| Dermatitis | 2 | 2 | 0 | 6 | 1 | 0 |
| Severe pain | 0 | 0 | 0 | 2 | 0 | 0 |
| Syncope | 0 | 0 | 0 | 0 | 0 | 0 |

Example 4

Rats were anesthetized with an initial dose of urethane (induction, 1.5 g/kg, i.p) and maintained by bolus dosing through the right femoral vein (0.05 mg/kg). The left carotid artery was also cannulated to monitor blood pressure. Following tracheal intubations, the rats were paralyzed with an initial dose of gallamine triethiodide (10 mg·kg$^{-1}$ i.v., Flaxedil) and mechanically ventilated with room air (~60 strokes·min$^{-1}$). Subsequent doses of gallamine triethiodide (5 mg·kg$^{-1}$·h$^{-1}$) were given as needed to maintain paralysis. The body temperature was kept within physiological range (36-37° C.) with an overhead lamp. The rats were placed in a stereotaxic head holder and the thoraco-lumbar (T13-L2) spinal cord was exposed by laminectomy. After removal of the dura membrane, a 1-2 cm saline-soaked gelatin sponge (Gelfoam, Pharmacia Upjohn Company, MI USA) was employed to cover the exposed spinal cord segment. The skin was reflected laterally to make a pool for agar solution that was allowed to cool to 38° C. prior to pouring. The agar was allowed to harden and the dorsal surface of the spinal cord was exposed by removing a cubical slice of agar with a scalpel blade. The exposed surface of the spinal cord was covered with warm mineral oil (37° C.).

Extracellular single-unit recordings were performed on two rats from the lumbar (L1-L2) spinal segments using glass-insulated, carbon filament electrodes. The placement of the electrode was 0.1-0.5 mm lateral from the spinal midline and 0.6-1.8 mm ventral from the dorsal surface. The action potentials were amplified through a low-noise AC differential amplifier (model 3000; A-M Systems) and continuously monitored and displayed on an oscilloscope. A dual window discriminator (model DDIS-1; BAK Electronics) was used to discriminate the action potentials and to convert it to rectangular TTL pulse. The frequency of TTL pulses was counted online by using the Spike2/CED 1401 data acquisition system (Cambridge Electronic Design). Action potentials and blood pressure were recorded. Post experiments, data were analyzed using the Wave-Mark analysis method of the Spike 4 software (Cambridge Electronic Design) to distinguish individual action potentials.

The spontaneous neuronal activity was recorded for each neuron followed by recording of responses to noxious pinch of the paw using Von Frey filament (190 N) for 10 seconds. After obtaining the baseline response, the Bridge device was attached to the contralateral ear. After 15 minutes of stimulation, the baseline firing and response to paw pinch was again recorded.

Figure 31:
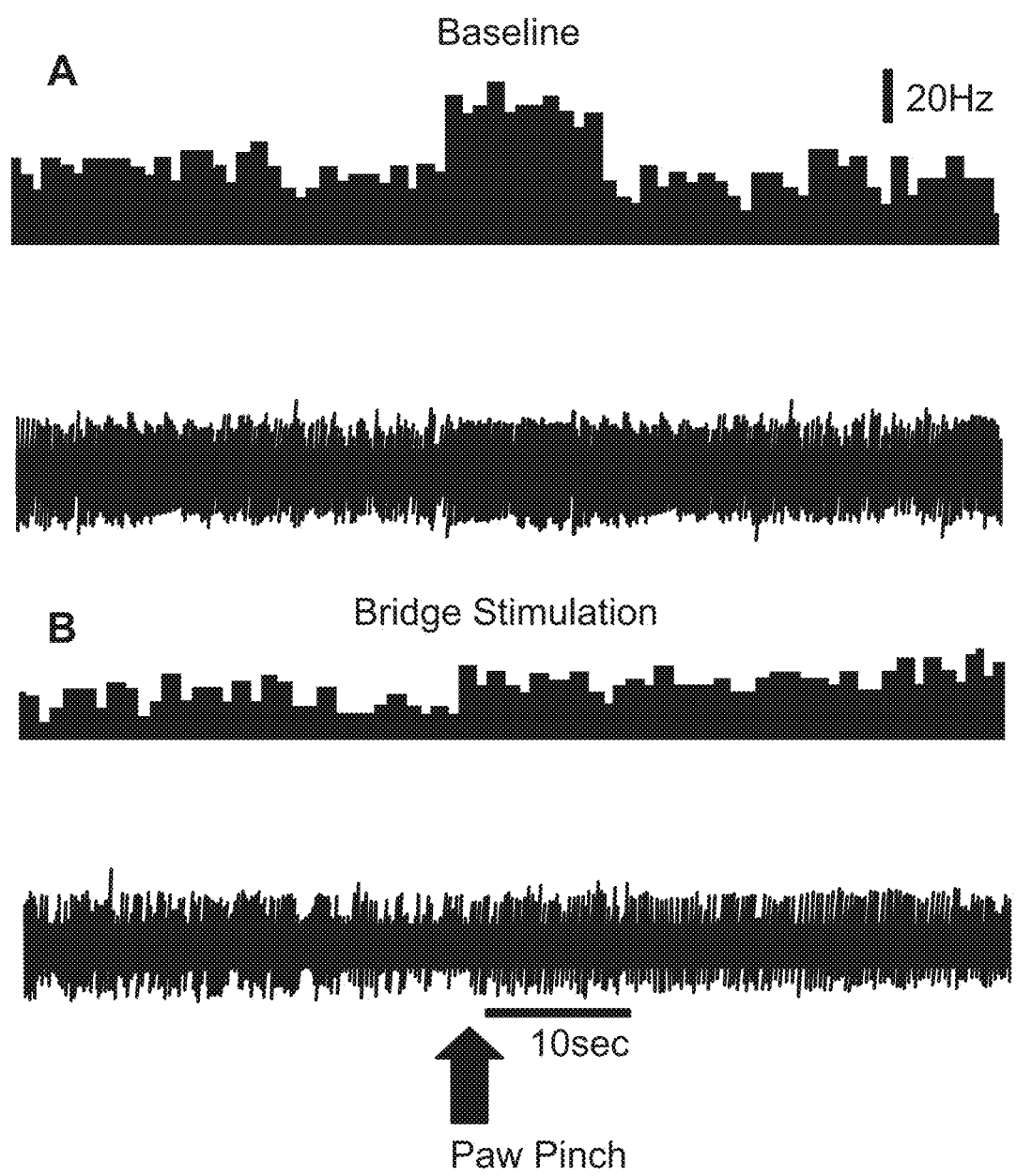
FIG. 31 shows a response of a lumbar spinal neuron before and after auricular stimulation.

One neuron from each animal (n=2) that responded to compression of the hind paw were recorded. All neurons were classified as excitatory and had cutaneous receptive fields mainly in the ipsilateral rump area. An example of one spinal neuron recorded before and after stimulation with the Bridge device is shown in FIG. 31 histograms A and B, respectively. Each frequency histogram in FIG. 31 has a 1 s bin width.

Following stimulation with the Bridge, there was a decrease in the spontaneous baseline firing of the neurons (4.6±0.21 imp/sec) compared to pre-stimulation (9.5±0.43 imp/sec). Similarly, firing of the neurons in response to pinching of the paw was much lower after auricular stimulation (7.7±0.24 imp/sec) compared to the pre-stimulation response (15.8±1.43imp/sec).

Example 5

This Example evaluated the efficacy, safety, and tolerability of a 3 week trial of Neuro-Stem System (NSS), (Innovative Health Solutions, INC, Versailles, Ind.) vs. placebo in children with FAPDs.

This study was a double-blind, randomized, placebo-controlled study that included children ages 11-18 years who satisfied criteria for a FAPD based on the Rome III version of the Questionnaire on Pediatric Gastrointestinal Symptoms (QPGS) and weekly symptoms as assessed by the provider for any of the four FAPDs including irritable bowel syndrome (IBS), functional dyspepsia, functional abdominal pain-not otherwise specified (FAP-NOS), and abdominal migraine. Subjects were required to have an average daily pain rate out of ≥10 (on a 0 to 10-point numerical rating scale for worst abdominal pain the week prior to starting the trial). The primary end point was determined using the Pain Frequency-Severity-Duration (PFSD) scores. The PFSD is a validated pain tool for children designed to incorporate multiple aspects of the pain experience with 3 major weekly scores: usual pain (0-10), worst pain (0-10) and number of days in pain (0-7). Groups were compared for improvement in worst pain over the 3 week treatment and the PFSD composite score for all 3 measures. The composite score was derived by multiplying the number of days of pain, the level of usual pain, and the level of worst pain and then dividing the product by 10. The highest possible score was 70. The key secondary end point percentage of patients who achieved a clinical response at week 3, defined as a patient who reported a decrease of 30% in weekly worst abdominal pain from baseline. This primary outcome was based on the FDA recommendation for IBS in adults and the ROME foundation pediatric subcommittee on clinical trials in children. Also, the proportion of patients who had global improvement of at least +2 in the weekly symptom response scale (SRS) was used as a secondary outcome. Several studies have demonstrated that when using 7-point scale response options in disease-specific measures, a change in score of 0.5 represents the minimally important difference. A change of 1.0 is considered a moderate change in quality of life, and a change in score greater than 1.5 is likely to represent a large change.

For analysis of the PFDS scores, 30% improvement in pain, and symptoms response scale, the Fisher's exact test was used to compare categorical variables and the Mann-Whitney test was used to compare continuous variables. Time, treatment group, and time×treatment group were predictors. All data are presented as mean±S.E.M. Comparison between groups was based on intention-to-treat (ITT) principle. A p-value <0.05 was considered statistically significant.

In the study period, 115 children with abdominal pain due to FAPDs were enrolled and assigned to either neurostimulation (n=57) or sham device (n=47). Two patients were excluded due to a change in diagnosis after starting the study. One patient was found to have helicobacter infection with gastric ulcers and the second patient was found to have eosinophilic esophagitis on endoscopy. Nine patients withdrew from the study after starting due to aesthetic reasons regarding the device. Median worst pain at baseline was very similar between placebo and treatment group. Over time, a greater improvement in worst pain scores from baseline was seen in the group with active treatment. This result was significant at all 3 weeks measured compared to placebo (p<0.001). At week 3, the placebo group had worse pain with a median of 7 compared to treatment group 5 (p<0.001).

PFSD composite scores at baseline (22.8) were similar to those in the treatment group (24.5). Composite scores in the treatment group decreased at week 1(12.4), week 2 (12.0) and week 3 (8.4) (p<0.001). No change was seen from baseline in the placebo group in weeks 1 through 3 (14.4, 14.7 and 15.2, respectively). At week 3, placebo group had worse total score with a median of 15.2 compared to the treatment group 8.4 (p<0.005).

Using a ≥30% reduction in worst pain as a responder threshold, 60% of patients in the active treatment group improved compared to 22% in the control group at week 3 compared to baseline (p<0.001). Similarly, by week 3, 57% of patients in the treatment group had at least a 30% improvement in usual (average) pain scores from baseline compared to 29% in the placebo group (p=0.007).

Subjects rated their symptoms as better, worse or no change based on a 15 point scale: −7 to −1=worse; 0=no change; +1 to +7=better). A score of +2 was considered to be significant improvement in global rating of symptoms. At the end of the 3 week treatment, the placebo group had a median change in score of +1 (−5 to 6). The treatment group was significantly better at the end of 3 weeks with a median score of +3 (−3 to 7) representing a large improvement in global rating of symptoms over placebo (p<0.001).

From the entire cohort, 11 subjects reported side effects in both groups. Six patients reported ear discomfort, (4 of these patients had active device and 2 had sham device). Three patients had adhesive reactions, 1 patient developed dizziness and nausea after device placement (active device). There was 1 patient in the placebo group who had an episode of syncope prior to placement of device. This was later determined to be related to needle phobia.

Treatment with Neuro-Stim device significantly improved worst pain and composite pain scores from baseline in all 3 weeks measured. There was also a improvement in the treatment group compared to placebo using the responder definition of ≥30% improvement in weekly pain. Overall global symptoms improvement was significantly better in those with active treatment compared to placebo.

Inflammation

The devices of the present disclosure can be utilized to treat inflammation. For example, colonic inflammation. In animals, colonic inflammation has been widely used to investigate the pathogenesis of post-inflammatory pain and as a model for irritable bowel syndrome (IBS) since many patients develop IBS following a gastrointestinal infection. TNBS instilled directly into the colon is also known to result in severe inflammation that extends through the mucosa, muscularis mucosae, and submucosa, including inflammatory infiltration, ulcerations, and goblet cell depletion. The inflammation has been reported to last greater than 2 weeks.

In the current experiments, rats were fasted for 24 hours and then deeply anesthetized with sodium pentobarbital (50 mg/kg, i.p.). A 50% solution of TNBS (0.6 ml of 30 mg/ml TNBS in 50% ethanol) was instilled into the colon using a 7 cm long oral gavage needle inserted into the descending colon. Rats were placed in the supine position with the lower portion of the body slightly elevated to prevent leakage of TNBS.

Placement of Percutaneous, Electrical Nerve Field Stimulation (PENFS) Device

Immediately prior to TNBS administration and while still under anesthesia, the PENFS device was placed in the rats. The device settings were standard and delivered 3.2 volts with a rectangular pulse wave and alternating frequencies (1 ms pulses of 1 and 10 Hz) every 2 seconds. The device consists of a pulse generator (approximately 3.5×1.5×1 cm) that attaches to a harness containing 3 active wires and 1 ground. The tips of the wires contain an array of 4 small (2 mm each) titanium needles that create a stimulation field on the tissue. Only 1 stimulating electrode was inserted with light pressure into pinna on the dorsal side and taped to secure in place. The ground containing only 1 needle was inserted on the ventral side of the ear. Once connected to the generator to deliver the pulse current, the generator was secured with light adhesive tape to the dorsum to allow the animals to move freely within their housing cage during the entire period of stimulation.

Study Protocol

Two groups of rats underwent treatment with intracolonic TNBS. Immediately prior to instilling TNBS, stimulation with PENFS was initiated in one group with active stimulating. The second group underwent the same protocol but with an inactive (sham) device. The duration of both active stimulation and sham treatment was 4 hours per day for 5 consecutive days. During stimulations, the animals appeared to be in a sleeping position with head tucked in legs and did not show any signs of distress. Animals demonstrated minimal to no attempts to remove the hardware from the ear or back. After the fifth day of stimulation, animals were deeply anesthetized with sodium pentobarbital (50 mg/kg, i.p.) for cardiac puncture (to assess serum cytokines and chemokines) and harvesting of distal colons to assess microscopic inflammation.

Serum for Cytokines and Chemokines

Under deep anesthesia, 1 ml of blood was obtained through cardiac puncture through the left side of the chest and placed in testing tubes with chilled EDTA and aprotinin. They were centrifuged at 3,000 rpm for 15 min at 4° C. for plasma extraction and then stored at 80° C. IL-6 and RANTES was measured in plasma using a commercially available ELISA kit (R&D Systems), according to the manufacturer's instructions.

Distal Colon Harvest

Following cardiac puncture, an incision was made in the abdomen and the distal colon was removed and cleaned in saline. The tissues were fixed in 10% neutral buffered formalin and then embedded in paraffin. Slices were made every 5 micrometers, stained with haematoxylin-eosin and examined under light microscopy.

Statistical analyses were performed using SigmaStat 17.0 (SPSS, Chicago, Ill.). Data are reported as means±SD. Student's t-test was used to analyze the difference in measurements between PENFS and sham.

Colonic Inflammation

Figure 32:
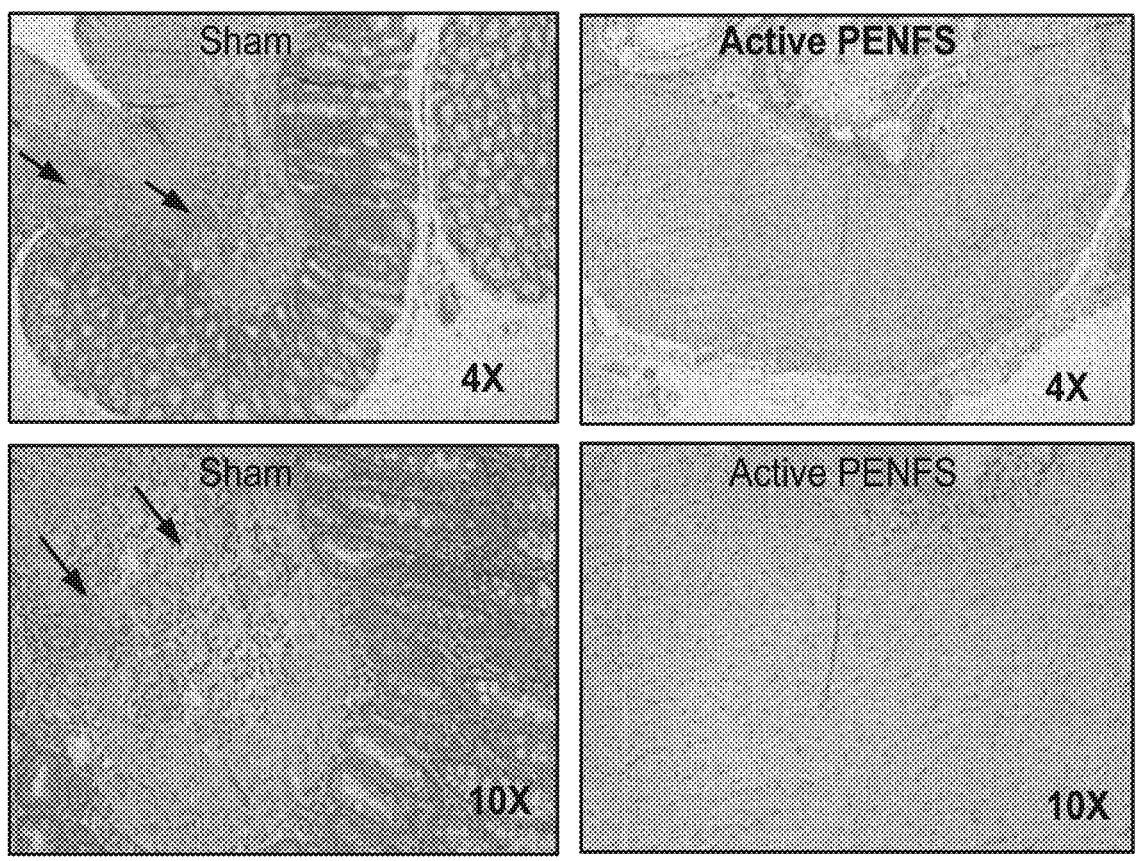
FIG. 32 shows colonic sections of rats treated with a sham device and an active PENFS device at different magnifications.

After 5 days of stimulation (4 hours per day), the integrity of the mucosa was assessed in both the active device and sham group. The degree of neutrophilic infiltrates in the lamina propria and mucosal and submucosal edema was evaluated. Similar to previous reports of TNBS colitis in Sprague-Dawley rats, there was a significant colitis following TNBS treated animals in the sham treated rats (n=4) which demonstrated persistent inflammatory infiltrate with neutrophils and eosinophils in the lamina propria with intestinal edema. However, there was minimal evidence of inflammation in colonic sections of rats treated with PENFS (n=4). FIG. 32 is an example of sham and active device treated animals at different magnifications (arrows point to significant infiltrate of neutrophils and eosinophils).

Expression of IL-6 and RANTES

Figure 33:
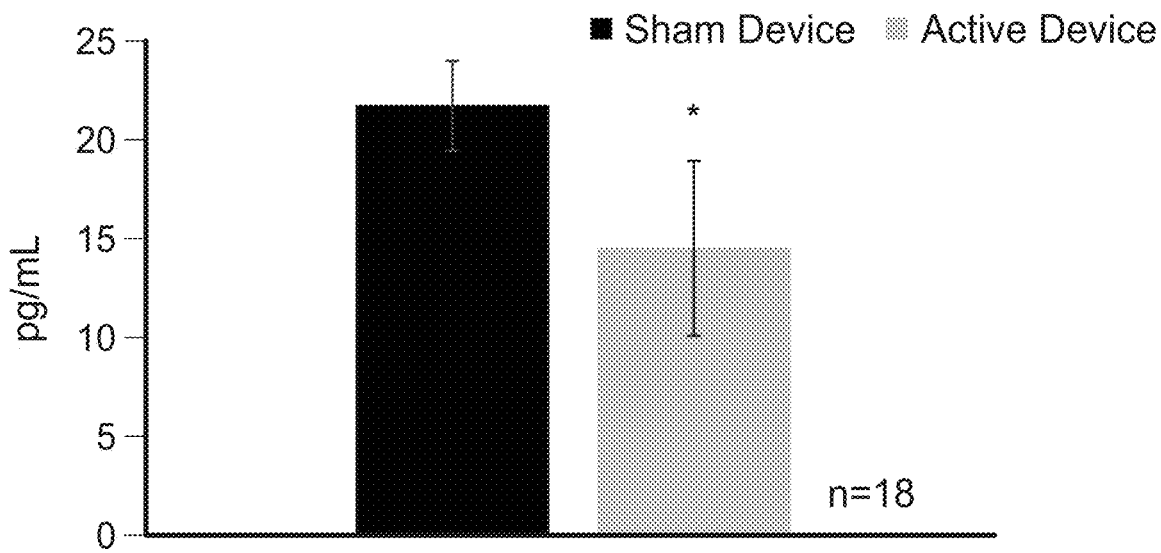
FIG. 33 shows RANTES (inflammatory chemokine) expression of post TNBS colitis with one group of rats being treated with a sham device and the other treated with an active PENFS active device.
Figure 34:
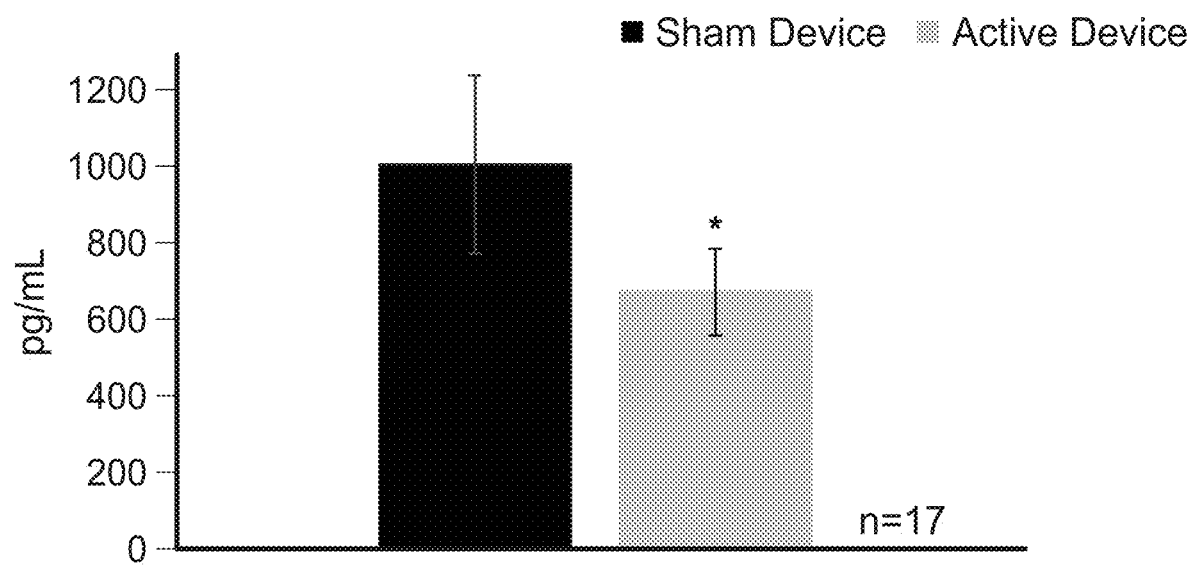
FIG. 34 shows lower levels of IL-6 in rats treated with an active PENFS device as compared to those treated with a sham device.

As shown in FIG. 33 in those treated with active PENFS, the expression of RANTES was significantly lower compared to sham treated animals (p<0.05). Similarly, compared to the sham treated animals, those treated with PENFS demonstrated lower levels of IL-6 as shown in FIG. 34. Accordingly, as demonstrated, PENFS inhibits proinflammatory cytokines and chemokines. Without being bound by theory, inhibiting proinflammatory cytokines and chemokines improves inflammation, such as colonic inflammation.

Fibromyalgia

Data from 12 study participants with fibromyalgia demonstrated improved pain and function for patients randomized to NSS (PENFS, n=6) as compared to standard therapy control (n=6). Without being bound by theory pain and functional outcomes appear to correlate with altered rsfMRI network connectivity after treatment.

Methods

Subjects: 12 veterans, age <60 from the Atlanta VA [n=6 standard therapy (ST), n=6 ST+PENFS] (Total n=20 planned). Intervention: Randomization to 2 groups ST vs. ST+PENFS. ST includes anticonvulsants, NSAIDs, physical therapy, and alternative treatments, individualized to patient co-morbidities. ST+PENFS group receives ST+NSS weekly (5 days on) for 4 weeks. Imaging: MRI studies obtained within 2 weeks prior to initiation of treatment and repeated within 2 weeks after final treatment. Assessments: Biobehavioral and functional assessments occur at baseline and 4, 8, and 12 weeks after final treatment by an investigator blinded to treatment groups.

Results

Figure 35:
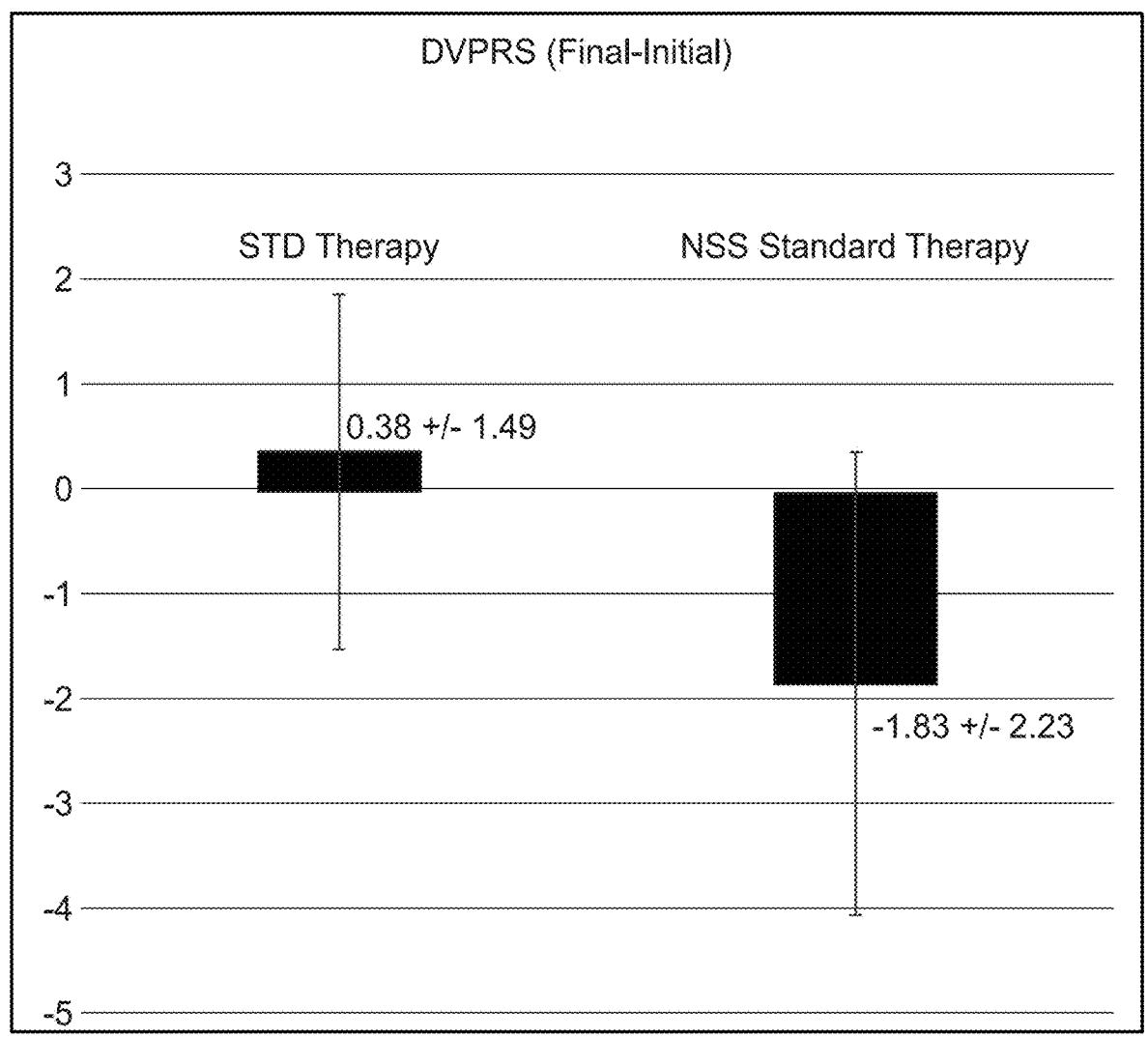
FIG. 35 shows that subjects who received NSS in addition to standard therapy reported a decrease in pain ratings while subjects who received standard therapy alone exhibited increased pain over time.

Change in pain rating and pain interference 12 weeks following treatment (DVPRS). Referring to FIG. 35, using the Defense and Veterans Pain Rating Scale (DVPRS) subjects were asked to A) rate their pain and B) the impact pain had on their activity, sleep, mood, and stress. Higher scores corresponded with greater pain-related dysfunction. Subjects who received NSS in addition to standard therapy reported decreases in pain ratings that corresponded with decreases in pain interference. Subjects who received standard therapy alone exhibited increased pain and pain interference over time (n=6 per group).

Figure 36:
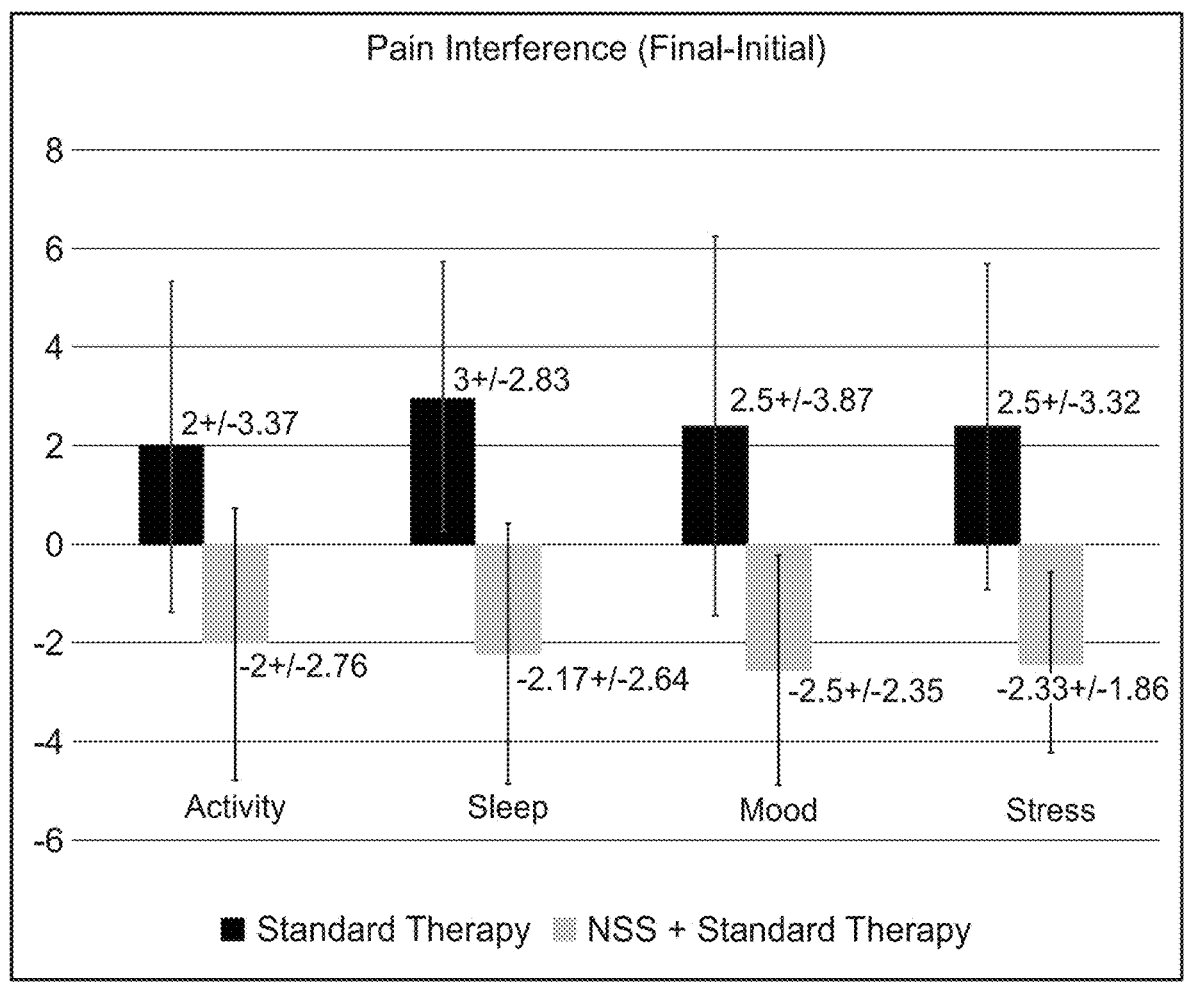
FIG. 36 shows that subjects who received NSS in addition to standard had a decrease in pain ratings while subjects who received standard therapy alone exhibited a trend towards increased pain.

Referring to FIG. 36, twelve weeks after treatment the subjects were asked to A) rate their pain and B) the impact pain had on their activity, sleep, mood, and stress. Higher scores corresponded with greater pain-related dysfunction. Subjects who received NSS in addition to standard therapy reported decreases in pain ratings that corresponded with decreases in pain interference. Subjects who received standard therapy alone exhibited a trend towards increased pain and pain interference over time (n=6 per group). As above, DVPRS was used to rate their pain.

Figure 37:
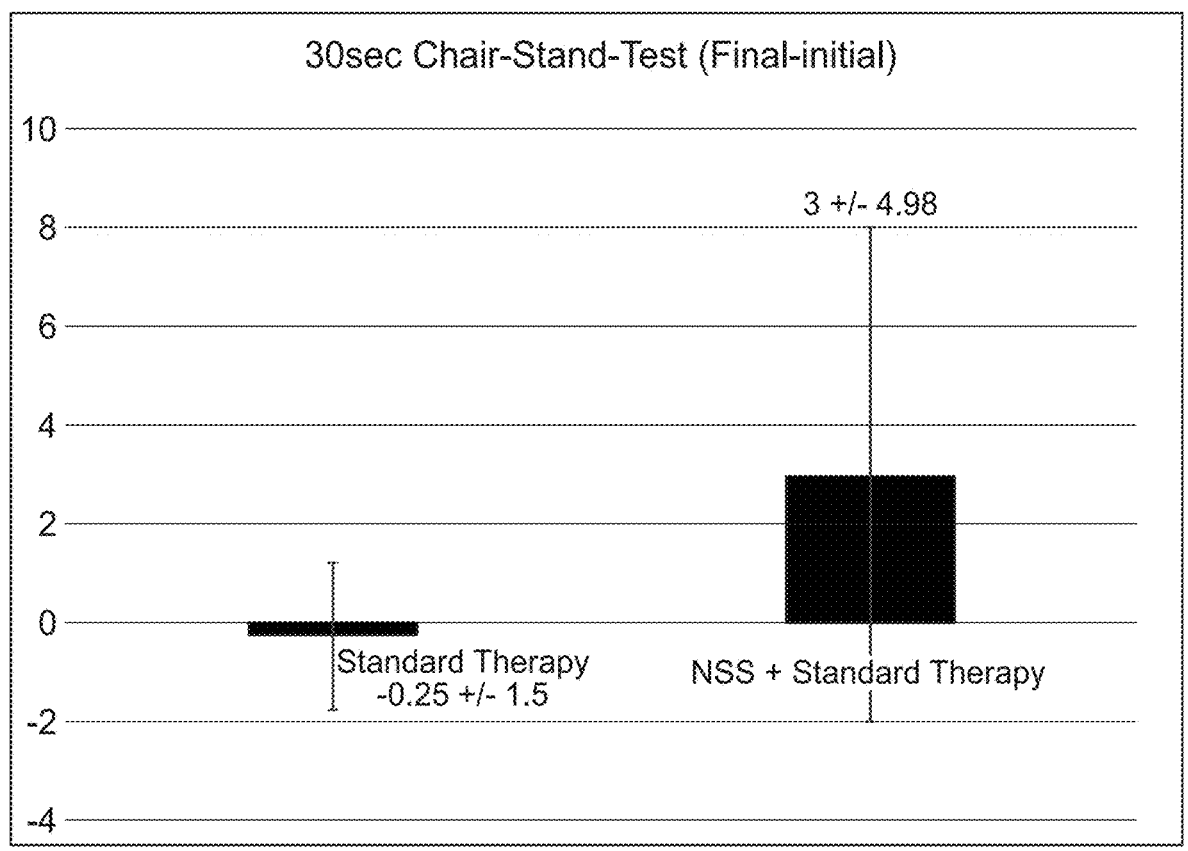
FIG. 37 shows that NSS-treated subjects along with standard therapy exhibited greater improvements in ability to sit-to-stand as compared to standard therapy alone.
Figure 38:
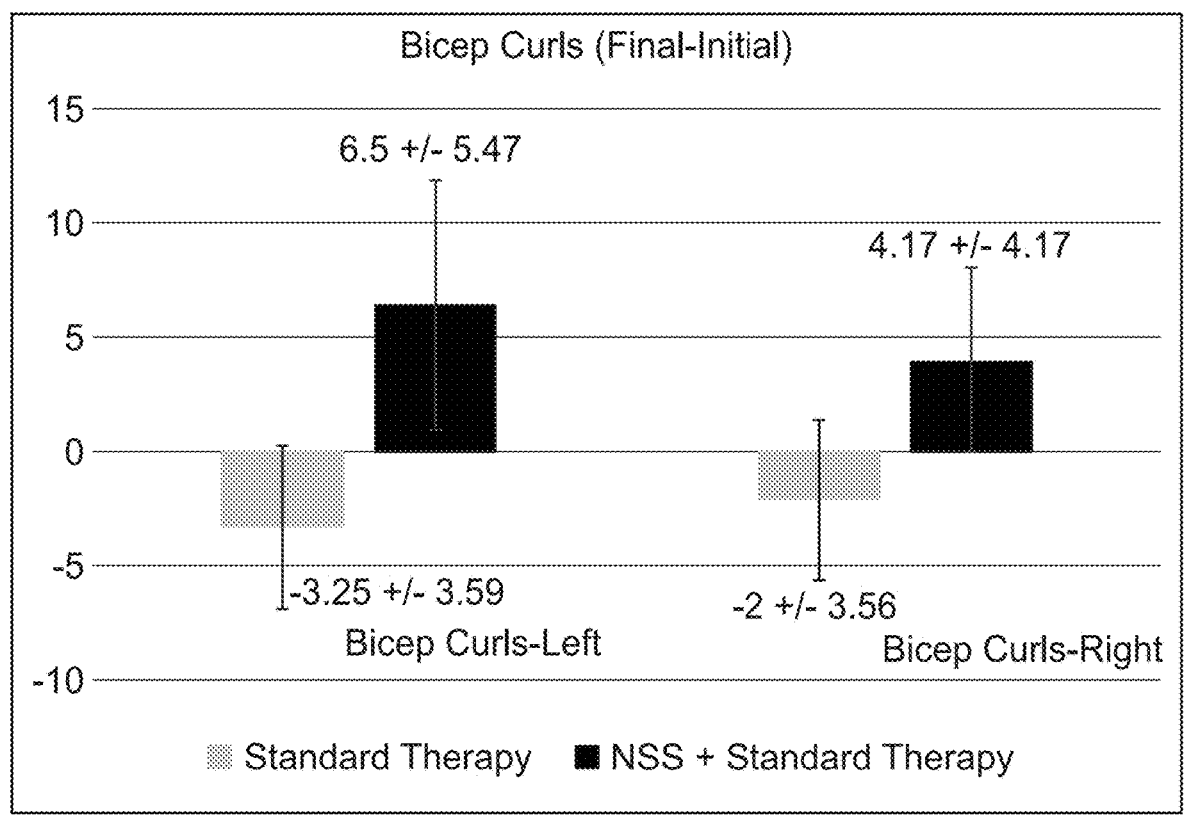
FIG. 38 shows that NSS-treated and standard therapy treated subjects exhibited an ability to perform more bicep curls in a 30-second period as compared to standard therapy alone.
Figure 39:
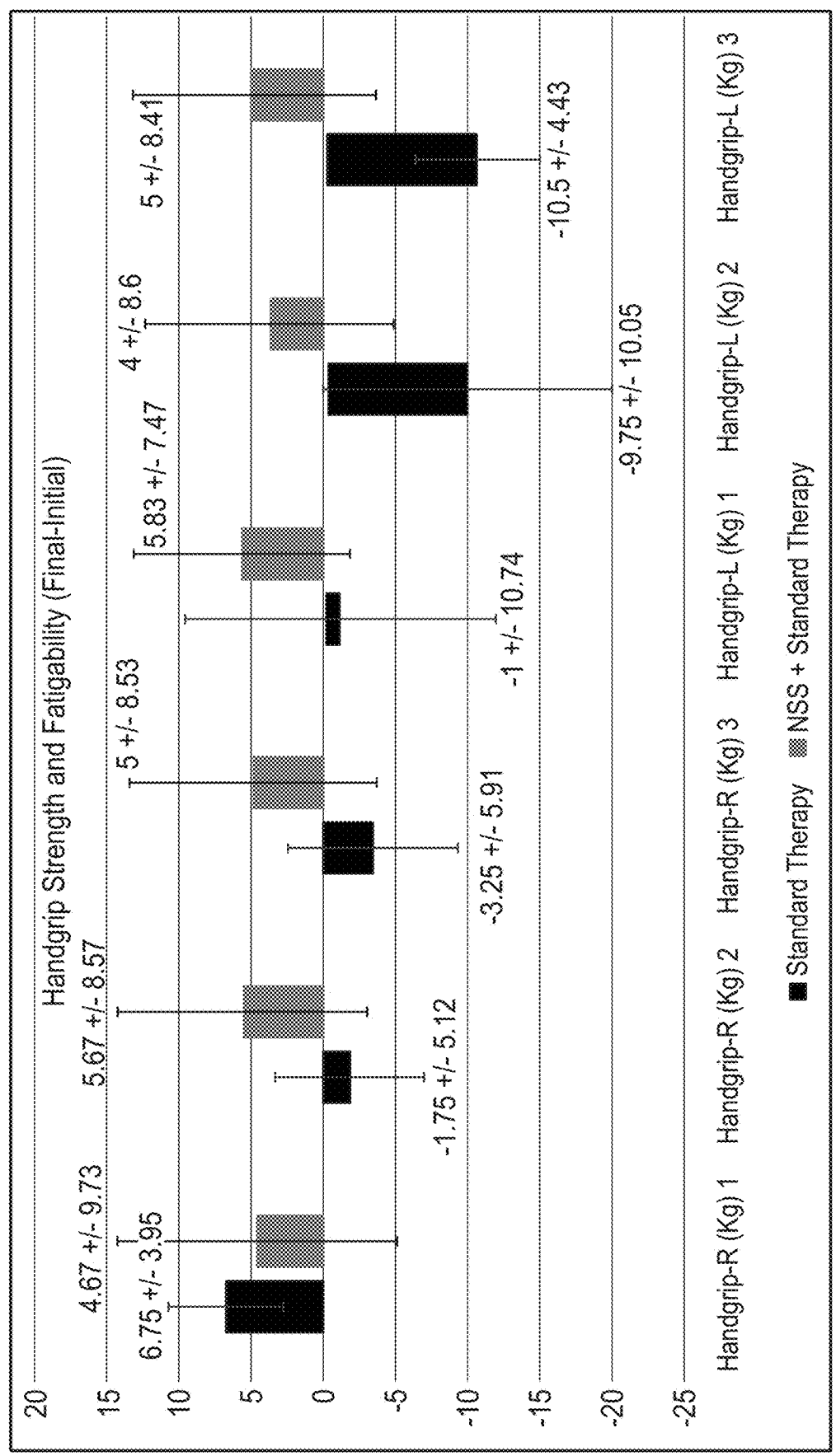
FIG. 39 shows that handgrip strength for both left and right hands worsens for controls and improves for NSS and standard treated subjects.

Change in function was measured twelve weeks after treatment. On all functional tests, subjects who received NSS exhibited greater improvements at 12 weeks relative to controls (n=6 per group). The control group seemed to worsen over time. As shown in FIG. 37, NSS-treated subjects along with standard therapy exhibited greater improvements in ability to sit-to-stand as compared to standard therapy alone. In addition, as shown in FIG. 38, NSS-treated subjects exhibited an ability to perform more bicep curls in a 30-second period as compared to standard therapy alone. Referring to FIG. 39, handgrip strength for both left and right hands over 3 repeated measurements appeared to worsen for controls and improve for NSS-treated subjects at 12 weeks following treatment.

Figure 40:
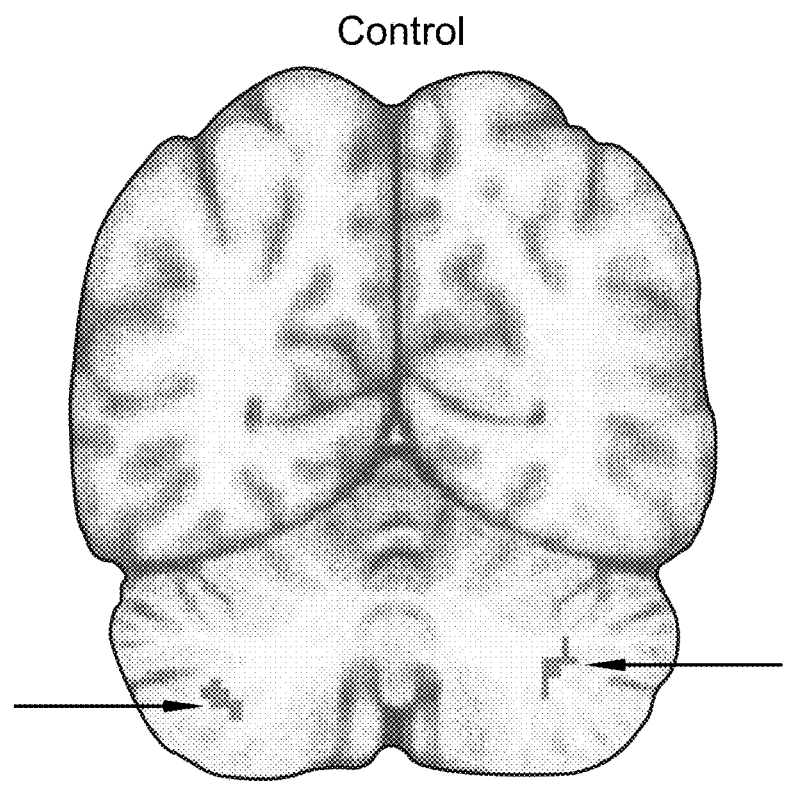
FIG. 40 shows that following standard therapy there is a decrease in connectivity from the right posterior insula to the cerebellum.
Figure 41:
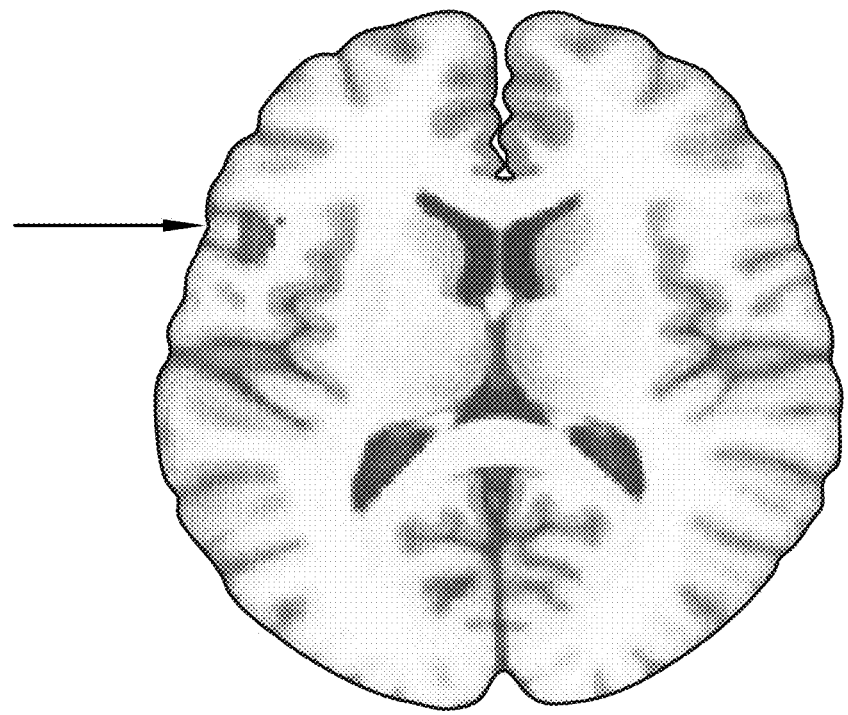
FIG. 41 shows that, following NSS+standard therapy, there is an increase in connectivity from the right posterior insula to left pars opercularis and to the inferior parietal lobule.
Figure 42:
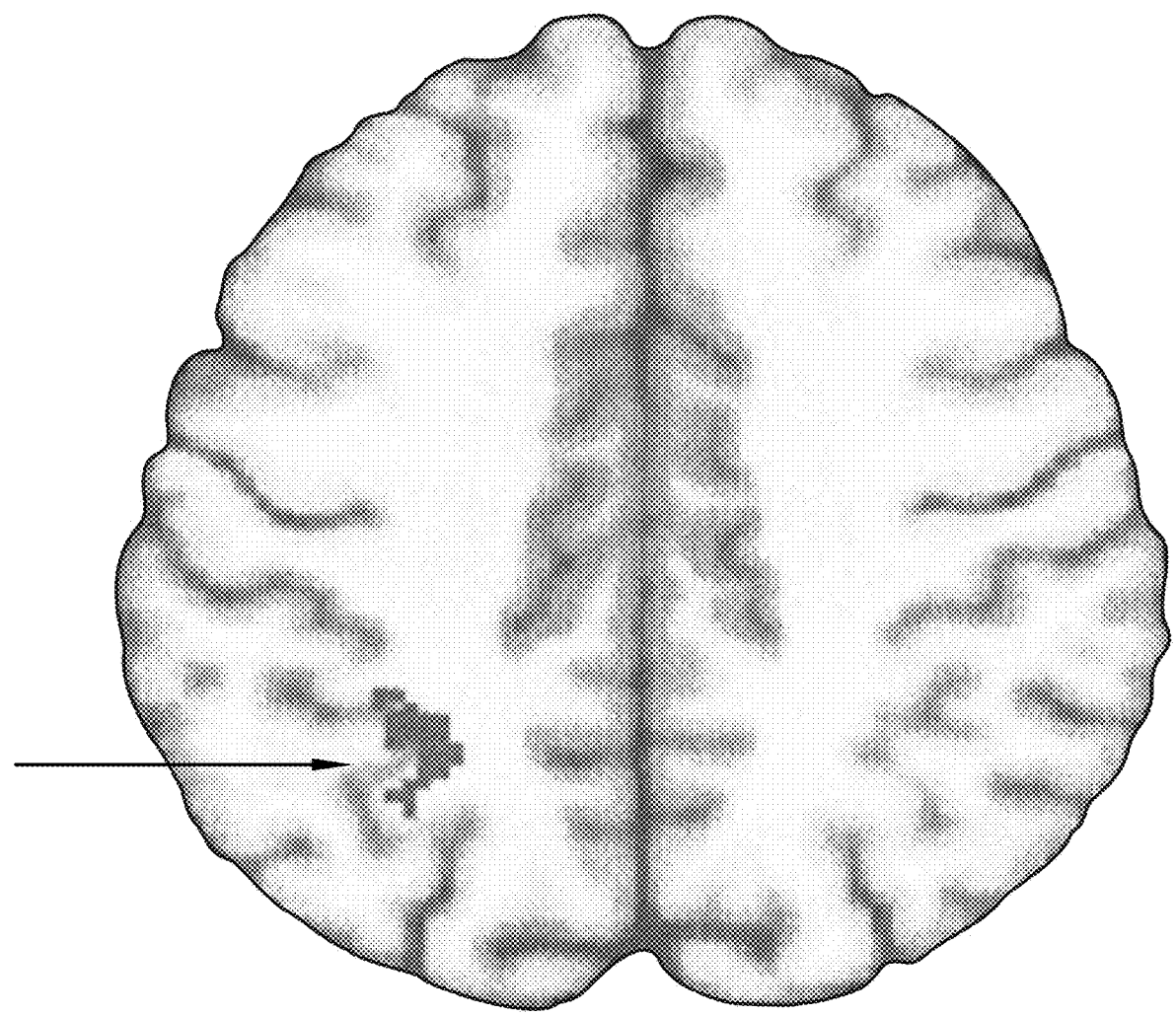
FIG. 42 also shows that following NSS+standard therapy, there is an increase in connectivity from the right posterior insula to left pars opercularis and to the inferior parietal lobule.

Seed-based whole brain connectivity was performed using the right posterior insula seed. Clusterization results showed altered connectivity following treatment in both control and NSS groups. As shown in FIG. 40, arrows 10 and 12, following standard therapy a decrease in connectivity was noted from the right posterior insula to cerebellum. Now referring to FIGS. 41 and 42, following NSS+standard therapy, increased connectivity was noted from the right posterior insula to left pars opercularis and to the inferior parietal lobule as indicated by arrows.

TABLE 4

Indicates an increased right posterior insula seed connectivity post treatment, NSS group.

| #Voxels | CMx | CMy | CMz | Peak x | Peak y | Peak z | Tentative Anatomical Location |
|---|---|---|---|---|---|---|---|
| 66 | −51.2 | 14.4 | 11.9 | −46 | 18 | 12 | Left IFG (p. Opercularis) |
| 60 | 23.9 | −6.5 | 56.6 | 28 | −2 | 54 | Right Middle Frontal Gyrus |

TABLE 4-continued

Indicates an increased right posterior insula seed connectivity post treatment, NSS group.

| #Voxels | CMx | CMy | CMz | Peak x | Peak y | Peak z | Tentative Anatomical Location |
|---|---|---|---|---|---|---|---|
| 57 | 28.1 | −57.2 | 56.8 | 26 | −56 | 58 | Right Superior Parietal Lobule |
| 55 | −32.7 | 15.3 | −25.2 | −32 | 18 | −18 | Left IFG (p. Orbitalis) |
| 48 | −29.2 | −51 | 42.4 | −26 | −54 | 42 | Left Inferior Parietal Lobule |
| 46 | 21.6 | −40.5 | 53.9 | 16 | −38 | 52 | Right Paracentral Lobule |

Table 5: Shows a decreased right posterior insula connectivity post treatment, control group

TABLE 5

Shows a decreased right posterior insula connectivity post treatment, control group

| #Voxels | CMx | CMy | CMz | Peak x | Peak y | Peak z | Tentative Anatomical Location |
|---|---|---|---|---|---|---|---|
| 45 | −35.8 | −62.8 | −48.6 | 36 | −62 | −46 | Left Cerebellum |
| 45 | 29.7 | −63.5 | −41.7 | 34 | −64 | −40 | Right Cerebellum |

Effect of PENFS Therapy on (i) Chronic Abdominal Pain and Nausea using Validated Questionnaires, (ii) Subjective Sleep Measures using Validated Questionnaires, and (iii) Psychological Measures including, Anxiety, Catastrophizing, Somatization and Functional Disability.

Methods. Eligible patients were children aged 11-21 years with chronic abdominal pain fulfilling criteria for functional abdominal pain disorders (FAPDs) (functional dyspepsia, post-prandial distress syndrome, epigastric pain syndrome, IBS, and FAP-not otherwise specified) based on the Rome IV criteria. After obtaining institutional review board approval, 20 eligible patients who agreed to receive PENFS as part of their routine clinical care were recruited. All subjects had five weekly clinic visits, four of which included device placement each week while the fifth visit was a post-treatment follow-up visit 2-3 days following completion of the last week of treatment. As part of a standard treatment protocol, 19 patients were treated with PENFS for a total of 4 weeks. Each week consisted of 5 days with the device on and 2 days off. No new medications were allowed and patients continued a stable medication dose during the entire 5 weeks.

At the first visit, written informed consent was obtained, baseline sleep and psychological questionnaires were collected and the first PENFS device was placed. Follow-up sleep questionnaires and psychological measures were obtained at different time points during the clinic visits.

Pain and Nausea Measures

The Abdominal Pain Index (API) is a reliable and valid instrument that assesses the frequency, severity, intensity, and duration of abdominal pain in the past 2 weeks. The frequency and severity of abdominal pain were rated on a 6-point duration, on a 9-point and intensity, on an 11-point Likert scale. A composite score was obtained by converting all subscales to a 4-point Likert scale. A modified version was used to reflect these variables over 1 week. The Nausea Severity Scale (NSS) is a valid and reliable measure that assesses the number of days with nausea, number of nausea episodes daily, duration, and intensity of nausea during the past 2 weeks. A total score represents the severity of nausea. A modified version of this scale was used to reflect nausea severity over 1 week. The API and NSS measures were administered at baseline, weekly and at long-term follow-up (6-12 months).

Subjective Measures with Validated Sleep Measures

The Pittsburgh Sleep Quality Index (PSQI) is a validated instrument that has been used in adolescents to assess sleep quality. Patients completed the PSQI before and after completion of PENFS treatment. The Insomnia Severity Index (ISI) was also completed before and after 4-week of PENFS treatment to assess the insomnia severity burden. The Patient-Reported Outcomes Measurement Systems (PROMIS) sleep scales were assessed weekly to evaluate sleep disturbances and sleep impairment during treatment.

Psychological Measures

The effects of symptoms on daily functioning was assessed weekly with the Functional Disability Inventory (FDI), a child self-report and parent-report instrument. This is a validated and normed clinical measure of the degree that children experience difficulty in physical and psychosocial functioning due to impaired physical health. The Pain Catastrophizing Scale for Children (PCS-C) is well validated in children and adolescents and indicates how strongly they agree with ratings of maladaptive beliefs about pain and long-term outcomes. Anxiety was assessed by Screen for Child Anxiety Related Disorders-Child Report, (SCARED) and Patient-Reported Outcomes Measurement Systems (PROMIS) Pediatric Anxiety-Short Form scale. The child report on anxiety symptoms was utilized over the past three months and a score of 25 or more is consistent with clinical anxiety. PROMIS Pediatric Anxiety-Short Form scale is a self-reported 7 item questionnaire that reflects anxiety symptoms over the past week. Patients were also contacted 6-12 months after the end of the study and were asked to fill out the measures on-line.

Results. Changes in abdominal pain and nausea post-PENFS.

Marked improvement were noted in the API. Scores significantly improved form baseline 2.8 (2.3-3.3) to the 4th week of therapy 1.9 (1.4-2.4) and long-term follow-up 1.4 (0.8-1.9) (p<0.0001). There was improvement in NSS scores from baseline 1.8 (1.3-2.3) to the 4th week of treatment, 1.3 (0.8-1.8) (p=0.07). Significant improvement noted in the NSS at long-term follow-up, 0.9 (0.4-1.4) compared to baseline (p=0.001).

Figure 43:
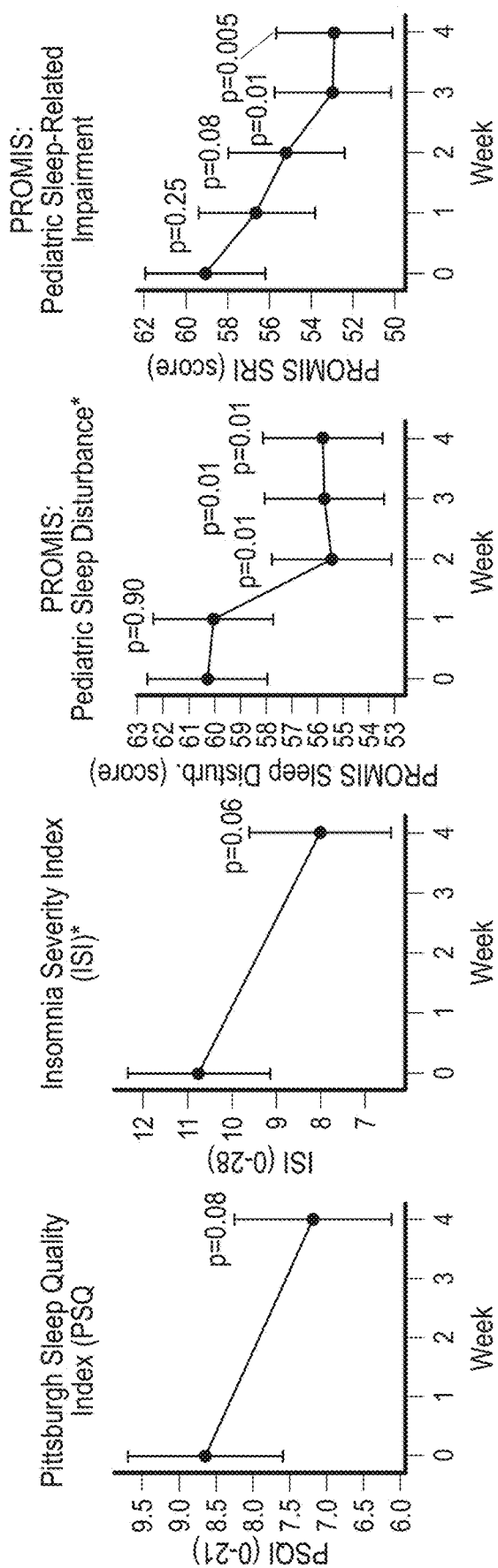
FIG. 43 illustrates subjective sleep assessments in adolescents with FAPD undergoing neurostimulation.

Subjective Sleep Assessments at Baseline and Post-PENFS therapy. The baseline mean PSQI scores were 8.7±4.3 (scores of >5 suggest poor sleep quality). The mean ISI scores were 10.8±6.5 (cutoff for insomnia is 14). The mean sleep disturbance and sleep-related impairment scores were 60.3±9.6 and 59.1±10.5 before the start of treatment, respectively. FIG. 43 summarizes changes in PSQI, ISI, PROMIS sleep disturbance, sleep-related impairment scores, and daily sleep quality from baseline to week 4. There was a trend for a decrease in global PSQI sleep scores (p=0.08), especially daytime dysfunction (p=0.05) and ISI scores (p=0.06). The PROMIS sleep related impairment (p=0.005) and disturbance scores (p=0.01) were significantly lower from baseline to week 4.

Psychological measures baseline and post PENFS. As indicated, Table 6 shows changes in somatic and psychological measures with PENFS treatment. Baseline SCARED scores correlated with PROMIS anxiety measures (rho=0.81, p<0.0001). There were marked improvements in PCS-C (p=0.0004), CSI (0.01), FDI (p=0.04) and PROMIS anxiety (p=0.01) after 4 weeks of treatment. Functional disability index improved over the course of 4 weeks and was significant at all time points (p<0.05). Functional disability, somatization, pain catastrophizing and anxiety, all showed sustained improvements at long-term follow-up.

Table 6: shows changes in somatic and psychological measures with PENFS treatment. (BL=Baseline, Wk=Week)

TABLE 6 shows changes in somatic and psychological measures with PENFS treatment. (BL = Baseline, Wk = Week)

| Parameter | BL | Wk 1 | Wk 2 | Wk 3 | Wk 4 | P-value | Long-term Follow-up | P-value |
|---|---|---|---|---|---|---|---|---|
| FDI | 18.95 ± 3.12 | 15.30 ± 3.12 | 15.12 ± 3.13 | 15.07 ± 3.12 | 15.54 ± 3.13 | 0.04 | 10.09 ± 3.14 | <0.0001 |
| PCS-C | 23.9 ± 3.2 | 19.9 ± 3.2 | 18.1 ± 3.3 | 16.5 ± 3.3 | 15.4 ± 3.3 | 0.0004 | 14.9 ± 3.4 | 0.001 |
| SCARED | 22.5 ± 4.3 | 21.6 ± 4.3 | 18.5 ± 4.3 | 18.8 ± 4.3 | 17.5 ± 4.3 | 0.02 | 16.9 ± 4.4 | 0.03 |
| PROMIS Anxiety | 51.86 ± 2.22 | 48.28 ± 2.22 | 48.84 ± 2.24 | 48.02 ± 2.24 | 48.71 ± 2.24 | 0.01 | 48.87 ± 2.27 | 0.05 |

PENFS significantly improved chronic abdominal pain and nausea in subjects with FAPDs. Subjective sleep ratings also improved from baseline to week 4 after PENFS therapy, particularly sleep related impairment and disturbance scores. After 4 weeks of PENFS therapy, significant improvements were seen in anxiety, functional disability, and pain catastrophizing. These effects were sustained at 6-12 months follow-up.

Additional embodiment of the present disclosure include the following:

Percutaneous Electrical Nerve Field Stimulation Improves Gastric Emptying and Symptoms of Pediatric Gastroparesis Background/Objectives: Pediatric gastroparesis is a disabling condition frequently refractory to pharmacologic therapy. The disorder is particularly challenging due to the lack of reliable diagnostic tests. The $^{13}$C-labeled, stable isotope gastric emptying breath test (GEBT) is a non-radioactive alternative to standard scintigraphy. Percutaneous electrical nerve field stimulation (PENFS) is effective for adolescents with functional abdominal pain disorders. This therapy provides electrical stimulation to branches of cranial nerves in the external ear. Vagal efferent signals from brainstem dorsal vagal complex exert strong influences on gastric sensorimotor function. The aim of this study was to determine the effects of PENFS on gastric emptying rates and symptoms of gastroparesis in adolescents with delayed gastric emptying based on the [$^{13}$q-*Spirulina platensis* GEBT.

Methods: Children ages 11-18 years with refractory chronic nausea were prospectively enrolled in a randomized, double-blind sham-controlled trial using PENFS therapy. Subjects underwent 8 consecutive weeks of therapy (5 days on/2 days off each week) as follows: weeks 1-4 randomized active vs sham followed by weeks 5-8 open label active therapy. After an overnight fast, the [$^{13}$C]-*Spirulina platensis* GEBT was performed at baseline in all participants and repeated after 8 weeks of therapy in those with abnormal tests. Breath samples were collected at baseline, every 15 min for the first hour, then every 30 min for 4 hours total. The $^{13}CO_2$ excretion rate was determined by the change in $^{13}CO_2/^{12}CO_2$ over time in each breath sample. Gastric emptying half-times (GE $T_{1/2}$) were calculated (=time when half of the stomach contents emptied). All subjects completed the following baseline and weekly symptom surveys: The Patient Assessment of Gastrointestinal Symptom Severity Index (PAGI-SYM), a validated gastroparesis questionnaire (range 0-5; higher scores indicating greater symptoms), was administered at baseline and weekly during treatment with PENFS Enrollment is ongoing and reported results blinded.

Figure 44:
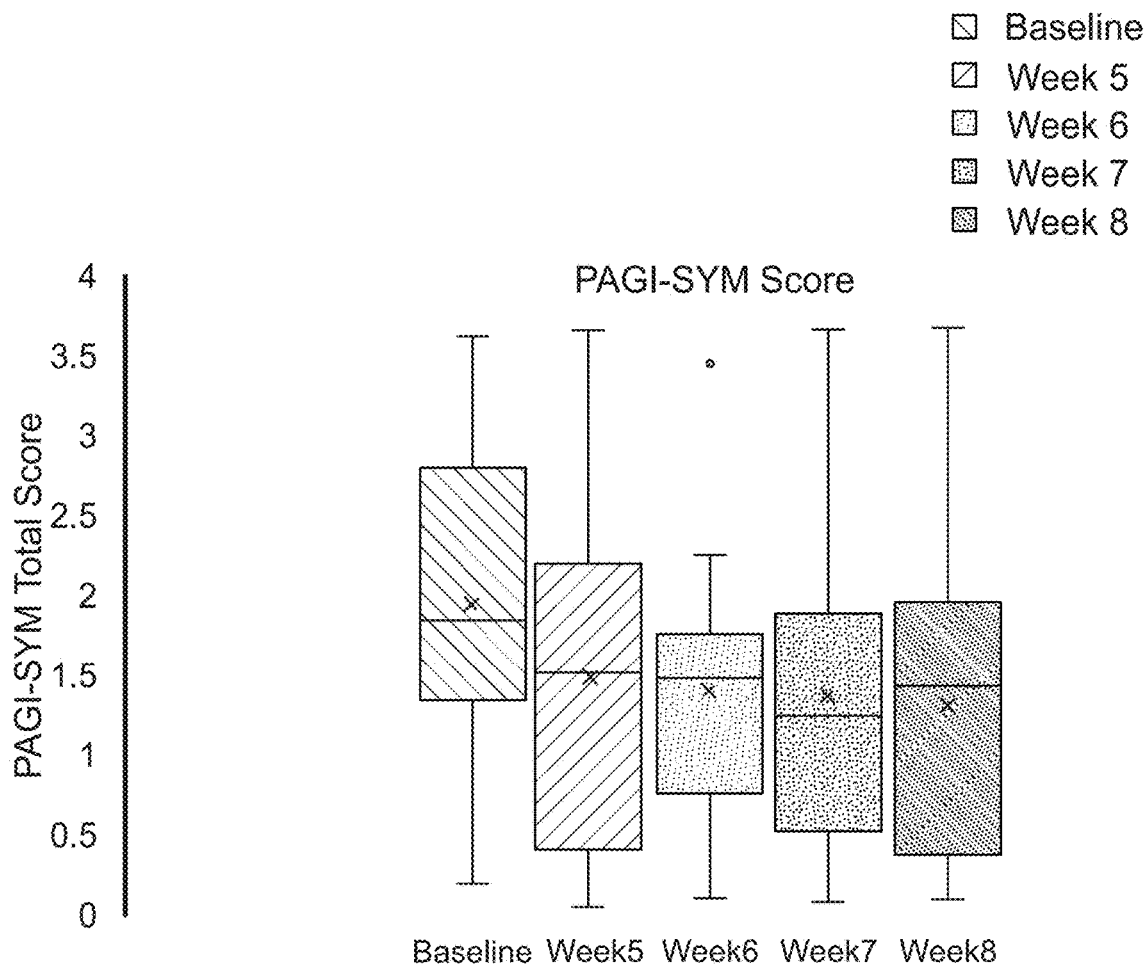
FIG. 44 is a graph demonstrating the PAGI-SYM Score comparing the baseline and several weeks of treatment.

Results: Out of 64 currently enrolled, 20 subjects met inclusion criteria and were diagnosed with delayed gastric emptying. Six subjects underwent repeat [$^{13}$C]-GEBT with improved GE T½ noted in all: median (IQR) 122 (112-152) min at baseline vs. 101 (86-114) min after 8 weeks of therapy (p=0.035). Median (IQR) PAGI-SYM scores decreased from 1.94 (1.44-3.0) to 1.44 (0.39-2.0) (p=0.02) from baseline to week 8 (FIG. 44). Scores were reduced in all subscales with greatest symptom reduction noted in the nausea/vomiting subscale (p=0.016). There were no serious side effects. Analysis of additional patients including long-term symptom response is pending on projected 100 subjects.

This study demonstrates the efficacy of PENFS for pediatric patients with gastroparesis. PENFS accelerates gastric emptying rates and improves symptoms associated with gastroparesis, including chronic nausea and vomiting in a smaller sub-set of patients.

Percutaneous Electrical Nerve Field Stimulation Improves Symptoms, Disability and Wellbeing in Children with Drug-Refractory Cyclic Vomiting Syndrome (CVS). CVS is a disabling, episodic condition. Drug-refractory patients incur immense health care costs (ED visits, hospitalizations). Episodes manifest with symptoms of autonomic imbalance—abnormal cardiovagal tone is reported. Recent data suggests that percutaneous (ear) electrical nerve field stimulation (PENFS) modulates cardiac autonomic regulation via vagal/parasympathetic pathways. A study conducted having the aim of determining the efficacy of PENFS as a prophylactic therapy for children with severe, drug-refractory CVS.

Methods. Children ages 8-18 with drug-refractory CVS were prospectively enrolled from the CVS Program at Children's Wisconsin Hospital. Eligibility criteria: ≥1 CVS episode every 4-6 weeks ×2 prior to enrolment. Subjects underwent 6 consecutive weeks of PENFS therapy (5 days on/2 days off each week). Symptom surveys at baseline and weekly: 1) Functional Disability Inventory (FDI) (See FIG. 45), 2) Sheehan Disability Scale (SDS) (See FIG. 46), and 3) Global Symptom Response Scale (SRS). Daily symptom surveys and CVS episode frequency and duration data were collected. Interim data on n=18 subjects is presented.

TABLE 7

Demographics for the study.

| | n(%) |
|---|---|
| Demographics (n = 18) | |
| Age (years) | Mean 11.1 (range 8-18) |
| Female | 12 (67%) |
| Caucasian | 18 (100%) |
| CVS Features | |
| Unpredictable/trigger-induced | 14 (78%) |
| Cyclic (timed) | 4 (22%) |
| CVS limiting physical activity | 18 (100%) |
| Episode Frequency | |
| 1 time/month | 5 (28%) |
| 2 times/month | 8 (44%) |
| 3 times/month or more | 5 (28%) |
| Comorbid Problems | |
| Migraine headaches | 10 (56%) |
| Impaired sleep | 12 (67%) |
| Missed school (days/month) | Mean 5.1 (range 1-30) |
| Number of medications trialed | Mean 5.6 (range 1-11) |

Results. Mean (range) of episode duration improved from baseline 48.4 (2-336) hours to end of study 12.2 (0-48) hours ($p<0.05$). 71% reported global symptom improvement of 4+ ("moderately better") on the SRS at the end of study. 75% and 77% reported ≥50% improvement in CVS episode frequency and intensity respectively. 75% used less rescue medications. 100% were satisfied with the therapy. Finally, there were no serious side effects.

Conclusion. Interim data from this pilot study demonstrates efficacy of auricular neurostimulation using PENFS in children with severe, drug-refractory CVS. PENFS improves several disabling aspects of CVS including episode frequency, intensity and duration while also improving functional disability and global well-being. There were no significant side effects and 100% reported satisfaction with therapy.

Effect of Percutaneous Electrical Nerve Field Stimulation (PENFS) on Mechanosensitivity, Sleep, and Psychological Comorbidities in Adolescents with Functional Abdominal Pain Disorders.

Background: Percutaneous electrical nerve field stimulation (PENFS) improves symptoms in adolescents with functional abdominal pain disorders (FAPDs). However, little is known about its impact on sleep and psychological functioning. The effects of PENFS on resting and evoked pain and nausea, sleep and psychological functioning and long term outcomes were evaluated.

Methods: Patients ages 11-19 years with FAPD requiring PENFS as standard care were recruited. Evoked pain was elicited by a Water Load Symptom Provocation Task (WL-SPT) before and after four weeks of treatment. Pain, gastrointestinal symptoms, sleep, somatic symptoms, and physical and psychological functioning were assessed. Actigraphy was used to measure daily sleep-wake patterns.

Key Results: Twenty patients (14.3±2.2 years old) with FAPD were enrolled. Most patients were female (70%) and white (95%). During pain evoked by WL-SPT, Visual Analog Scale (VAS) pain intensity and nausea were lower following PENFS compared to baseline ($p=0.004$ and $p=0.02$ respectively). After PENFS, resting VAS pain unpleasantness ($p=0.03$), Abdominal Pain Index ($p<0.0001$), pain catastrophizing ($p=0.0004$), somatic complaints (0.01), functional disability ($p=0.04$) and anxiety ($p=0.02$) all exhibited significant improvements, some were sustained long term. Self-reported sleep improved after PENFS ($p's<0.05$) as well as actigraghic-derived sleep onset latency ($p=0.03$).

Conclusions and Inferences: Improvements in resting and evoked pain and nausea, sleep, disability, pain catastrophizing, somatic complaints and anxiety after four weeks of PENFS therapy are demonstrated. Some effects were sustained at 6-12 months post-treatment. PENFS is a suitable alternative to pharmacologic therapy.

Introduction. Functional abdominal pain disorders (FAPD) are among the most common pediatric chronic pain disorders and include functional dyspepsia (FD), irritable bowel syndrome (IBS), abdominal migraine and functional abdominal pain-not otherwise specified (FAP-NOS). Pain associated impairment is prevalent in approximately one third of those affected, and poor treatment outcomes are associated with significant psychosocial dysfunction. The manifestations of chronic abdominal pain are associated with underlying visceral hyperalgesia, disturbances in sleep, and/or psychological co-morbidities, but the cause-and-effect relationship is unknown. Visceral hyperalgesia is an altered sensation in response to non-noxious, physiological stimuli in the gastrointestinal (GI) tract and is often impacted by psychosocial factors. Adolescents with FAPD have a higher incidence of depression or anxiety (40-50%). Catastrophizing and somatization have shown to result in worse psychosocial and functional outcomes. Sleep disturbances, like delayed onset of sleep and impaired sleep quality, may be a result of pain, but have also been suggested to worsen pain in children with chronic pain conditions. Preclinical and clinical data have shown increased pain sensitivity with sleep deprivation and there is some suggestion that interventions during sleep improve pain. All of these factors potentially contribute to the severity of symptoms in FAPD. Pain has different cognitive and affective elements and can be assessed as resting or induced (evoked) pain. To better understand the FAPD pain experience, induced visceral pain [through non-invasive validated techniques like Water Load Symptom Provocation (WL-SPT)] can provide a better insight into a patient's symptoms compared to retrospective reports and questionnaires that assess resting pain.

Percutaneous electrical nerve field stimulation (PENFS) is a non-invasive emerging treatment for adolescents with functional abdominal pain associated with IBS. A randomized controlled trial of PENFS in adolescents with FAPD showed significant improvement in worst pain scores, global well-being and functional disability compared to sham. It has shown to decrease firing of neurons in the amygdala in animal models. To date, little is known about the impact on factors that influence symptoms, or the long-term duration of benefits post treatment. The vagal parasympathetic tone before falling asleep regulates the sleeping drive and impaired vagal nerve efficiency has shown to predict a response to PENFS. While the interaction between sleep, visceral hyperalgesia, evoked pain and psychological comorbidities remains poorly understood, determining how PENFS influences these contributory factors may help better understand the benefits to patients and uncover the underlying mechanism.

The primary aim of the current study was to evaluate the effects of PENFS therapy on resting and evoked GI symptoms (abdominal pain and nausea) before and after symptom provocation (via WL-SPT). In our secondary aim, we examined if sleep would improve during and psychological functioning would improve during and following (6-12 months after) PENFS therapy. Lastly, we also explored the predictors of treatment response and factors mediating the relationship between sleep and abdominal pain. We hypothesized that PENFS would improve both resting and evoked pain, nausea and sleep as well as positively impact psychological well-being and disability, both short and long-term.

Methods After obtaining institutional review board approval, adolescents aged 11-19 years with who met the Rome IV criteria for non-episodic functional abdominal pain disorders (FD, IBS, and FAP-not otherwise specified) and who agreed to receive PENFS as part of their routine clinical care were recruited. Exclusion criteria included pregnancy, diabetes, allergy to adhesives, presence of implanted electrical devices, GI inflammatory disorders, feeding disorders/ tube feedings, major heart diseases, eating or conversion disorders, disorders of cognitive impairment and those who were unable to follow instructions.

Study Timeline. All subjects had five weekly clinic visits, four of which included device placement each week while the fifth visit was a post-treatment follow-up 2-3 days following completion of treatment. Patients were treated with PENFS for four weeks following a standard treatment protocol. No new medications were started, and patients continued on a stable medication dose two weeks prior to and during treatment.

After obtaining written informed consent, information on demographics, Rome IV Diagnostic Questionnaire on Pediatric Functional Gastrointestinal disorders, past medical history including any self-reported sleep disorder, and medications affecting sleep were collected at the initial visit. Patients also completed baseline sleep and psychological questionnaires before device placement. Patients performed the Water Load Symptom Provocation Task (WL-SPT) as outlined below twice: before initial device placement at the first visit and after completion of PENFS treatment at the follow up visit. Patients received an Actiwatch (described below) to measure daily sleep-wake patterns for the duration of the treatment. Follow-up sleep questionnaires and psychological measures were obtained at different time points during the clinic visits. Patients were contacted by phone and additional questionnaires were completed 6-12 months after the last treatment to assess long-term benefit (Table 8).

PENFS Treatment. IB-stim® (Innovative Health Solutions, Versailles, Ind., USA) is an external auricular device with a battery powered generator that creates PENFS, targeting cranial nerves V, VII, IX and X.27 It delivers a current of 3.2 volts with a rectangular pulse wave and has alternating frequencies of 1 ms pulses of 1 and 10 Hz every 2 seconds. It delivers stimulation in cycles of 2 hours on and 35 minutes off. After obtaining consent, the certified and trained physician placed the device each week for four weeks. The device was placed in the appropriate position on the desired ear and secured with sterile dressings. Patients removed the device after five days and returned the following week for device replacement. Thus, each week consisted of five days with the device on and two days off.

Study Tasks. Water Load Symptom Provocation Task (WL-SPT): The WL-SPT is a safe and non-invasive validated technique to induce visceral pain in children ages 8-16 years with FAPD.8,26,32 Participants were given 1.5 L of water to drink at their own pace over 15 minutes or until they felt "completely full" on the Fullness Rating Scale.8 Patients were instructed not to drink too fast. Patients completed the VAS pain intensity, unpleasantness and nausea scales before, immediately after, 5 minutes and 10 minutes after WL-SPT. The total amount of water consumed was analyzed pre and post PENFS during WL-SPT.

Actigraphy. An Actiwatch (Respironics, Bend, Oreg.; http://www.actigraphy.respironics.com) was used to measure daily sleep-wake patterns and record body movement (sensitivity of >0.01 g-force) after first device placement for a total of four weeks. This device has good reliability and validity in individuals with chronic pain. Baseline actigraphy data prior to PENFS was not obtained due to the nature of the study. The measures generated included time in bed, total sleep time, sleep efficiency (percentage of the estimated total sleep time and time spent in bed), sleep latency (duration in minutes to fall sleep), Wake After Sleep Onset (WASO—time spent awake after going to sleep), and sleep onset variability (each patient's personal standard deviation in sleep onset).

Sleep Diaries. To corroborate sleep and activity, participants were instructed to complete a daily diary in the evening and morning during the study. It captured information about daily sleep quality and numeric ratings of pain on a Likert scale from 1 to 10.

Abdominal pain and nausea measures: Measures completed during WL-SPT: Pain Intensity/Unpleasantness Visual Analog Scale (VAS): VAS consists of a plastic slide rule with a 15 cm excursion anchored with the words "no pain" versus "most intense pain imaginable" for pain intensity and "no pain unpleasantness" versus "most pain unpleasantness" for unpleasantness respectively. Numbers on the back of the scale ranged from 0-10. These scales can be used in children ≥8 years and have demonstrated to (1) accurately approximate ratio scale measurement (2) to be internally consistent, and (3) to provide a reliable and accurate measure of intensity and unpleasantness separately. Patients completed their current VAS ratings at each visit just prior to device placement and were also asked about their pain intensity and unpleasantness immediately before and after the WL-SPT both pre and post PENFS.

Nausea Visual Analog Scale (VAS): Patients rated their nausea on a Visual Analog Scale similar to the Pain VAS scale anchored with the words "no nausea" versus "most intense nausea". VAS measures of nausea severity are well correlated with verbal descriptors of nausea. Patients completed the nausea VAS ratings on the same schedule as the Pain VAS.

Fullness Rating Scale: The Fullness Rating Scale was used where patients chose from 5-line drawings of the human body where each shaded stomach area represented varying degrees of satiety (empty to completely full).

Abdominal Pain Index (API): The API is a reliable and valid instrument that assesses the frequency, severity, intensity and duration of abdominal pain. The frequency and severity of abdominal pain were rated on a 6-point, duration on a 9-point and intensity on an 11-point Likert scale. A composite score was obtained by converting all subscales to a 4-point Likert scale. We used a modified version to reflect these variables over one week (versus two weeks for which the measure was originally developed).

Nausea Severity Scale (NSS): NSS is a valid and reliable measure that assesses duration, intensity, the number of days with nausea and number of daily nausea episodes. A total score represents nausea severity. A modified version of this scale to reflect nausea severity over one week (versus two weeks for which the measure was originally developed).

Sleep measures. Pittsburgh Sleep Quality Index (PSQI): PSQI is a validated instrument that has been used in adolescents to assess sleep quality. Patients completed the PSQI at baseline and immediately after PENFS. The sum of responses yielded a total score (0 to 21). Higher scores indicated poorer sleep quality.

Insomnia Severity Index (ISI): ISI was also completed before and after PENFS to assess the severity of insomnia symptoms. Each item was scored on a 0-4 scale, higher scores indicated greater insomnia severity. ISI has been used in other pediatric pain populations to assess sleep.

Patient-Reported Outcomes Measurement Information System (PROMIS) Pediatric Sleep Scales: PROMIS Ped SF v1.0—Sleep Disturbance 8a—Child measured sleep disturbance (SD) constructs like sleep quality, sleep depth, and restorative impact of sleep. PROMIS Ped SF v1.0—Sleep-Related Impairment 8a—Child measured sleep-related impairment (SRI) which included daytime alertness, sleepiness, tiredness, and function over the past week. These scales have been validated in children 8-17 years of age. Patients completely these scales weekly during treatment. All items were summated to obtain a total score, higher scores indicated greater disturbance and impairment.

Functioning, somatic, cognitive and psychological measures. Functional Disability Inventory (FDI): The FDI was used to assess daily physical and psychosocial functioning each week during PENFS. This is a 15-item validated questionnaire that assessed the degree of impairment and disability caused by patients' symptoms.

Pain Catastrophizing Scale for Children (PCS-C): PCS-C is validated in children and adolescents and measured maladaptive beliefs about pain. It provided the degree of helplessness in response to actual or anticipated pain. Patients completed the PCS-C weekly during PENFS.

Children's Somatic Symptoms Inventory (CSSI): GI as well as extra-intestinal symptoms and somatic symptoms were assessed weekly during PENFS through the validated CSSI measure.

Anxiety and Depression: Anxiety was assessed at baseline and at long term follow up by Screen for Child Anxiety Related Disorders-Child Report (SCARED) which is stable for symptoms over the past three months. A score of 25 or more was consistent with clinical anxiety. Anxiety and depression were also assessed weekly during PENFS and at long term follow up by the Patient-Reported Outcomes Measurement Systems (PROMIS) Pediatric Anxiety-Short Form scale and Pediatric Depression-Short Form scale.

Statistical Analysis:

Primary Aim: Effect of PENFS on abdominal pain and nausea. The resting VAS pain intensity, unpleasantness and nausea scores captured weekly during PENFS were examined for longitudinal change from baseline before PENFS (Week 0) using linear mixed modeling, accounting for within-subject variability. To examine changes in each VAS measure following PENFS and at various time intervals after WL-SPT, linear mixed modelling was conducted and main effect for visit and time as well as interaction between visit and time were examined with subjects modelled as random effect. Linear mixed modelling was also used to compare total water consumed during WL-SPT from pre to post PENFS. All results were presented as least square means and 95% confidence interval.

Prior to the start of the study, we performed a power analysis to detect primary efficacy endpoint difference, i.e. VAS pain scale between pre and post WL-SPT at week 4 (visit 5). To power our study, and to detect a VAS difference of 1.0 at a conservative between-subject SD=1.0, a correlation within a subject is as 0.5, then the SD of a within subject difference in VAS was 1.0 as well. For a two-sided paired t-test at 0.05 level, and 80% power, to detect a difference between say 4 and 5 in VAS at baseline to week 4, we required a sample size of 10. To test the difference of pre- and post-WL-SPT, we used SD=1.0 for the pre-post difference in VAS, and SD=1.0 for the difference between the differences (pre vs. post-provocation) at baseline and week 4. To detect that difference of 0.7 (say between 2 and 1.3), we required a total of 20 patients.

Secondary Aim: Effect of PENFS on sleep, psychological outcomes and functioning. Linear mixed modeling was employed to determine the longitudinal change in other pain, nausea, functioning, somatic and psychological measures from week 0 to week 4 and at 6-12 months follow up. Subjective sleep measures were similarly assessed from week 0 to week 4 and actigraphy measures from week 1 to week 4. All results were reported as least square means and standard error.

Exploratory Aim: Predictors of response to PENFS. To identify variables that predicted treatment outcome, several univariate linear mixed models were developed to associate change in clinical outcomes (VAS pain intensity, pain unpleasantness and nausea; and FDI) from week 0 to week 4 with sleep and psychological measures. The results were presented as beta estimates and standard error.

Exploratory Aim: Factors mediating the relationship between sleep and abdominal pain: We conducted a mediation analyses, associating VAS pain intensity with SD and SRI as separate independent variables while anxiety, depression, PCS-C, and CSSI as mediators in each model, examining all study visits (Supplement Figure). Mediation models were not developed for VAS unpleasantness and nausea since sleep and psychological measures at baseline did not show any significant association with these outcomes. In each mediation model, 'a' indicates the effect of sleep on mediator variable and 'b' indicates the effect of each mediator variable on VAS pain intensity as an outcome. The total effect of sleep examined as 15 individual independent variable in each model, is a sum of the direct effect of sleep on VAS pain intensity (c') and indirect effect of sleep on VAS pain intensity through mediating effect (a*b) of each mediator. The proportion of mediation (%) is the indirect effect/total effect. These analyses were done using 'mediation' package in R and the bootstrap method was used to examine whether estimates of mediation effect were statistically significant.

For all analyses except for mediation analysis, SAS version 9.4 (SAS Institute, Cary, N.C.) was used. For all longitudinal analyses, proc mixed procedure was used and few missing data for sleep measures were assumed to be missing at random.

Results Of the 20 patients, 14 (70%) were females and 19 (95%) were White. The mean age was 14.3±2.2 years, and mean BMI was 24.7±6.7 kg/m2. Twelve patients were on oral medications for FAPD (50% Cyproheptadine, 50% Tricyclic antidepressants, and 16% Selective Serotonin Reuptake Inhibitors). Eighteen patients met criteria for FD [11 had post-prandial distress syndrome (PDS) and 7 epigastric pain syndrome], two had IBS and three FAP-NOS. One patient with IBS also had overlapping PDS. None of the patients were diagnosed with sleep apnea or periodic limb movement disorder. Average duration of symptoms before treatment was 27.5 months (7-83 months). Screening labs like complete blood count, comprehensive metabolic panel; serum inflammatory markers, fecal calprotectin, upper endoscopy/colonoscopy and gastric emptying scan information were not available for 10%, 40%, 45%, 10% and 25% respectively. Of the remaining, these were normal in all except one patient who had delayed gastric emptying. One patient discontinued PENFS after two weeks due to development of acute cholecystitis during treatment.

Impact of PENFS on abdominal pain and nausea (Aim 1) Resting and Self-Reported Symptom Measures. The impact of PENFS on abdominal pain and nausea was assessed with VAS and validated surveys (Abdominal Pain Index, API; Nausea Severity Scale, NSS). Resting VAS ratings for pain unpleasantness (p=0.03) were reduced after four weeks of PENFS therapy. Pain intensity had a trend for improvement (p=0.06) but VAS nausea did not change (p=0.10). Scores on the API significantly improved after therapy (p<0.0001). There was a trend for improvement of nausea on the NSS after treatment (p=0.07) (Table 9).

Evoked Symptom Measures. All patients completed WL-SPT before and following PENFS. We examined if PENFS would reduce pain intensity, unpleasantness and nausea during WL-SPT. Before PENFS, VAS pain intensity increased immediately post WL-SPT but reduced at 5 and 10 minutes to pre-baseline level. After PENFS, baseline VAS pain intensity was significantly lower compared to pre-treatment (p=0.03). Pain intensity immediately post WL-SPT was also lower compared to pre-treatment (p=0.004). It trended to be lower compared to pre-treatment at 5 and 10 minutes but was not statistically significant (p=0.15 and p=0.48 respectively). Thus, PENFS appeared to blunt the increase in VAS pain intensity seen immediately after WL-SPT.

Pain unpleasantness showed a different profile as ratings decreased after WL-SPT pre-PENFS but increased post-PENFS. Baseline VAS pain unpleasantness was lower after treatment compared to before (p=0.05) but unpleasantness following WL-SPT did not differ with treatment (p=0.51, p=0.86 and p=0.88 immediately after WP-SPT and at 5 and 10 minutes respectively). Even though unpleasantness scores were higher following WL-SPT post-PENFS, they were still lower compared to baseline pre-treatment. Lastly, VAS nausea scores were similar to pain intensity. Before PENFS, VAS nausea increased immediately following WL-SPT but reduced to pre-baseline levels at 5 and 10 minutes. After PENFS treatment, baseline VAS nausea showed a trend for improvement compared to pre-treatment (p=0.09). VAS nausea scores immediately after WL-SPT were lower compared to pre-17 treatment (p=0.02). They continued to be lower at 5 and 10 minutes compared to pre-treatment but were not statistically significant (p=0.16 and p=0.55 respectively). Thus, PENFS treatment appeared to blunt the increase in VAS nausea seen post WL-SPT.

Total water intake during WL-SPT did not differ before and after PENFS (474.5±56.4 vs 413.7±58.4, p=0.16). Thus, the drop in post WL-SPT VAS pain intensity and nausea after PENFS may directly represent an effect of the treatment since the amount of water did not change.

Impact of PENFS on sleep and psychological functioning (Aim 2) Resting and Self-Reported Sleep before and after PENFS therapy. To examine the impact of PENFS on self-reported sleep difficulties, patients completed surveys about sleep quality (PSQI), insomnia symptoms (ISI), sleep disturbance (PROMIS-SD) and sleep-related impairments (PROMIS-SRI). The baseline PSQI and ISI scores were 8.7 (±4.3) and 10.8 (±6.5), respectively. Both scored higher than those reported in healthy adolescents, and suggest that patients were experiencing poor sleep quality and higher insomnia symptoms. The mean PROMIS-SD and SRI T-Scores were 60.3 (±9.6) and 59.1 (±10.5), respectively. Both scores were higher than reported in historic healthy controls and slightly worse than patients with sleep disorders in chronic illnesses and neurodevelopmental disorders.

Patients reported improvements in sleep following PENFS. While general sleep quality (PSQI, p=0.08) and insomnia symptoms (ISI, p=0.06) showed a trend for improvement, patients reported a significant decrease in sleep related impairments (PROMIS-SRI, p=0.005) and disturbances (PROMIS-SD, p=0.01) following PENFS. Daily ratings of sleep quality, which coincided with the collection of actigraphy during weeks 1 through 4 of the study, did not change during treatment (p=0.53) while numeric pain ratings improved (p=0.04).

Actigraphic sleep-wake patterns during PENFS therapy. Sleep onset latency showed a significant decrease from the first week to the last week of PENFS (p=0.03), which was largest during Week 3 (p=0.01). Other variables, including time in bed, total sleep time, WASO, sleep efficiency, and sleep onset variability did not change during treatment.

Figure 45:
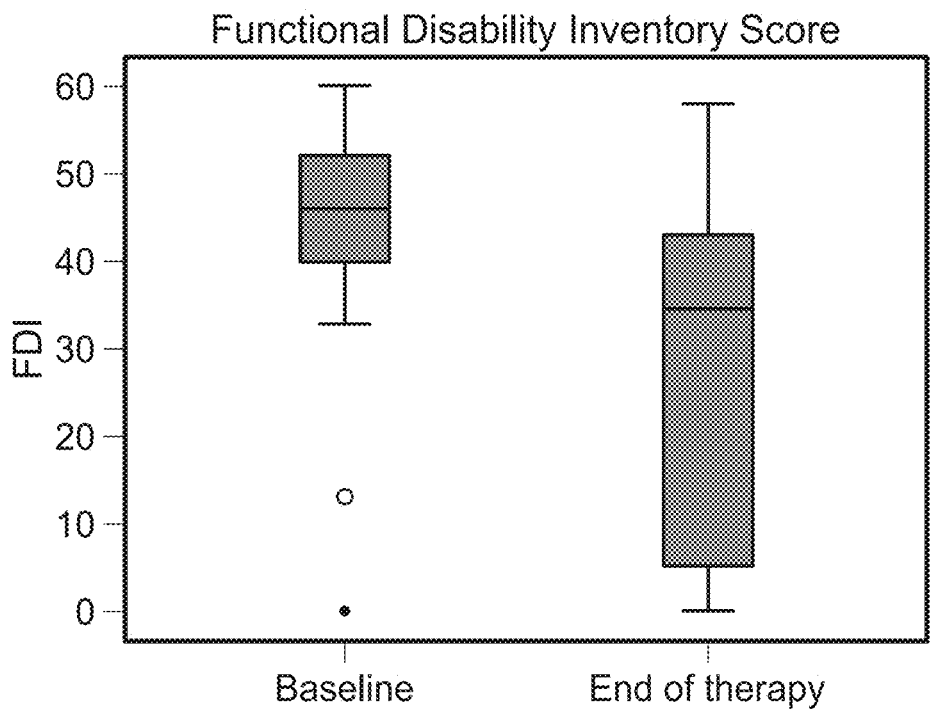
FIG. 45 is a graph comparing the functional disability inventory score from baseline and the end of therapy.
Figure 46:
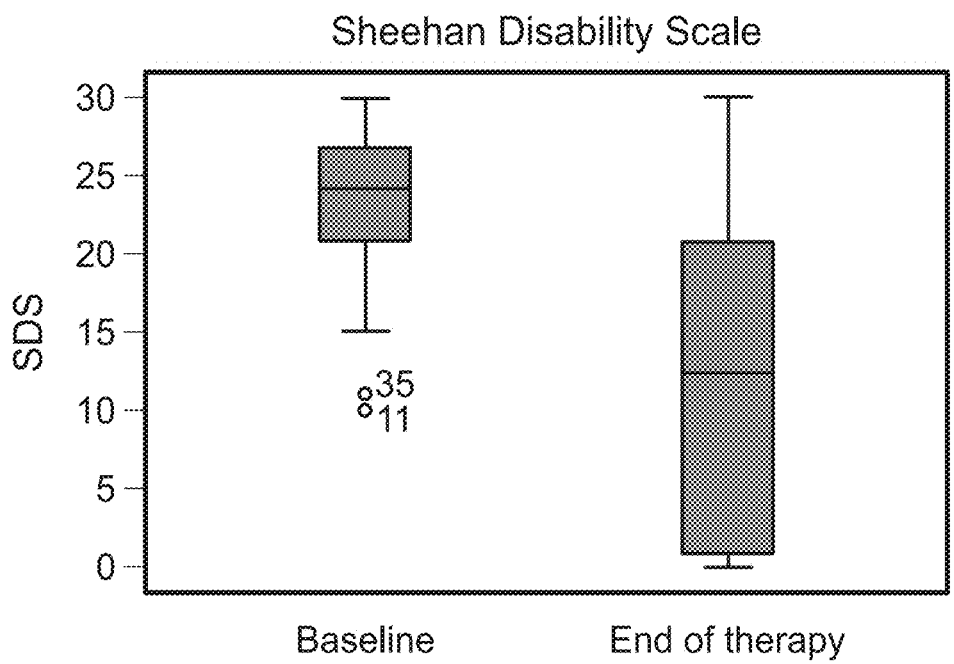
FIG. 46 is a graph comparing Sheehan Disability Scale at baseline to the end of therapy.

Physical, psychological, and somatic measures before and after PENFS therapy. Turning to FIG. 45 shows Disability (FDI) improved from baseline to week 4 (p=0.04). Similar improvements in catastrophizing (PCS-C, p=0.0004), somatic (p=0.01) and GI (p=0.01) subscales of the CSSI, and anxiety (PROMIS anxiety, p=0.03 and SCARED, p=0.02) but not depression (PROMIS Depression, p=0.14) were observed over the course of PENFS (Table 9).

Sustained improvements in self-reported GI Symptoms, Physical and Psychological Functioning, and Somatic Symptoms. Following PENFS therapy, API, NSS, FDI, PCS-C, CSSI and SCARED continued to show sustained improvements at 6-12 months follow-up (p<0.05), PROMIS anxiety showed a trend for improvement (p=0.05) while depression scores did not change (Table 9).

Exploratory analysis: Association of baseline sleep and psychological measures with improvements in GI symptoms and disability from Week 0 to Week 4 High baseline catastrophizing (PCS-C) and overall somatic (CSSI) scores were positively associated with lower reductions in resting VAS pain intensity from week 0 to week 4 (p=0.01 and 0.04 respectively; Table 10). Similarly, patients who had high baseline PROMIS anxiety and depression scores showed lower reductions in FDI from week 0 to week 4 (p=0.04 and 0.05, respectively. None of the baseline measures showed significant association with changes in pain unpleasantness or nausea.

Psychological and somatic measures as mediators of relationship between pain intensity and self-reported sleep. Anxiety (PROMIS), depression (PROMIS), pain catastrophizing (PCS-C) and somatic complaints (CSSI) directly and indirectly mediated the effect of sleep on abdominal pain (Table 11). The direct effect of sleep disturbance (PROMIS-SD) on VAS pain intensity was significant with each psychological and somatic measure as mediator (all p's<0.05). The indirect effect of each mediator variable was also significant, with 41% of sleep disturbance effect on pain mediated by PROMIS anxiety, 33% by PROMIS depression, 40% by PCS-C, and 27% by CSSI. Associating sleep impairment (PROMIS-SRI) with VAS pain intensity, the direct effect of all mediators was not significant. However, the indirect effects of PROMIS anxiety, PROMIS depression, PCS-C, and CSSI on the relationship between sleep impairment and pain intensity were significant and the proportion of mediation effect were 90%, 77%, 66%, and 65% respectively.

Impact of medications and duration of symptoms on baseline measures and changes with PENFS treatment. Patients who were on medications had worse baseline ISI and PROMIS-SRI scores than those who were not on medications (p=0.04 and p=0.01 respectively). Note that we did not account for multiple comparisons. There was no differences in outcomes between the two groups with PENFS treatment. Similarly, there was no correlation of duration of symptoms with sleep and anxiety measures at baseline as well as changes with PENFS (Table 12 and Table 13).

Discussion PENFS is associated with improvements in pain and functional disability in adolescents with FAPDs. This study evaluates changes in visceral sensitivity using a water load task, actigraphic and subjective sleep measures, and other psychological factors. We show for the first time that PENFS is associated with changes in mechanosensitivity and improvements in sleep, anxiety, catastrophizing, and somatic complaints. The changes in abdominal pain, nausea and psychological measures were also sustained for 6-12 months post-treatment.

Our primary aim was to determine changes in GI symptoms (abdominal pain and nausea) during PENFS. Resting VAS pain unpleasantness decreased significantly following PENFS while there was a trend for improvement in pain intensity. In contrast, in a randomized trial assessing changes in abdominal pain with treatment of anxiety, minimal changes in VAS pain intensity have been reported in the standard medical care control group, suggesting it to be the natural trend over time for that measure. Abdominal pain on the API significantly improved in our study while there was a trend for improvement of nausea severity on the NSS after four weeks of PENFS. While the first RCT on PENFS used questionnaires, we utilized visual analog scales and symptom provocation in addition to questionnaires and assessed different dimensions of pain.

Evoked pain can mimic postprandial symptoms and is considered a better indicator of patient symptoms. In the present investigation, pain followed a unique time course during WL-SPT. VAS pain intensity and nausea scores increased immediately after WL-SPT, plateaued at 5 minutes and declined to pre-baseline levels thereafter. In contrast, pain unpleasantness was highest at baseline immediately prior to WL-SPT and then declined thereafter. There may be an expectation effect of increase since baseline VAS measures were obtained immediately before WL-SPT and device placement at each visit. Such an expectation effect has been described in functional magnetic resonance imaging studies in healthy volunteers. In addition, negative expectations amplify pain processing in neural networks mediating visceral pain, and modify the activity of the pain modulation areas by emotional and cognitive factors. The high levels immediately after but declining at 5 and 10 minutes after WL-SPT could be explained by the exponential rate of emptying of liquids from the stomach without a lag phase.

VAS pain intensity and nausea were lower immediately post WL-SPT after PENFS when compared to baseline. However, water intake did not change pre and post WL-SPT. Our findings support prior literature on the mechanisms of action of PENFS. Increased pain after WL-SPT has been described in adolescents with functional dyspepsia who had impaired sympathovagal tone. Another study has suggested that patients with vagal insufficiency were most likely to respond to PENFS therapy. Thus, it could be speculated that PENFS may be decreasing pain and nausea post WL-SPT by correcting the sympathovagal balance. Interestingly, there was no change in pain unpleasantness after PENFS. This differential effect on the dimensions of pain needs further investigation.

Our secondary aim was to determine changes in sleep during treatment. We found poor sleep quality and a higher incidence of baseline insomnia, sleep disturbances, and sleep-related impairment despite 60% of patients being on daily medications for pain which are known to improve sleep. This is similar to previous reports of poor sleep quality and insomnia in chronic pain conditions and children with functional abdominal pain. There was a robust improvement in self-reported sleep disturbance and sleep-related impairment on the pediatric PROMIS measures and a trend for improvement in sleep quality and insomnia symptoms over four weeks of therapy. Differences across these measures could be due to the timeframe anchored to each survey. Compared to the PSQI and ISI (past month), the PROMIS measures (past week) might have captured weekly improvements in sleep during treatment. Actigraphy showed poor sleep efficiency and higher sleep onset latency, sleep onset variability, and Wake After Sleep Onset (WASO) in patients with FAPD compared to that reported in healthy peers. Decreased sleep efficiency and increased WASO have been reported in other chronic pain conditions. However, sleep onset latency was the only sleep/wake measure that was decreased (especially at week 3 of treatment) while other variables did not change. It is hard to discern if PENFS directly targets sleep pathways to improve sleep, consequently improving pain and other clinical parameters versus improvements in pain lead to improved sleep. In past studies, the strongest temporal association is in favor of sleep deficiency impacting next day pain. Also, the dorsal motor nucleus and nucleus ambiguous that receive parasympathetic input are located close to and regulated by the solitary tract nucleus, which functions as the hindbrain sleep center. Parasympathetic activity before falling asleep has shown to regulate the sleeping drive. This could partially explain the improvement in sleep onset latency with PENFS treatment. Changes in sleep with PENFS could be attributed to direct effect on the sleep-vagal axis or secondary to improved psychological well-being.

Finally, we sought to assess changes in functional disability and psychological functioning with PENFS. Functional disability scores improved throughout treatment and at long term follow up. Anxiety scores improved post-PENFS while there was no change in depression. In adults, GI-specific anxiety correlates with IBS severity and is regarded an important psychosocial variable underlying visceral pain sensitivity, hypervigilance, and maladaptive coping. Improvements in anxiety seen after PENFS were likely secondary to improved GI symptoms. However, improvements in anxiety through direct effects on specific CNS pathways cannot be excluded. Pre-clinical studies have already demonstrated modulation of neuronal activity in the amygdala as a potential mechanism of action of PENFS. This results in clinical benefits, particularly as it relates to anxiety. In our exploratory analysis, we found anxiety and depression to mediate the effect of sleep impairment on pain intensity by about 90 and 77% respectively. Prior studies have reported about 40% of the total effect of sleep quality on pain intensity to be explained through anxiety and depression.

Adult and pediatric studies have implicated somatization and pain catastrophizing to mediate the relationship between anxiety and IBS symptom severity. Pain catastrophizing is the irrational expectation of the worst outcome in response to an actual or anticipated painful event while somatization is physiological symptoms that cannot be explained medically. They also affect disability and other outcomes in children with functional abdominal pain. Patients in our cohort exhibited somatization and catastrophizing consistent with previously described literature. We noted marked improvements in these variables with PENFS treatment that were sustained at long-term follow-up. A similar potential mechanism involving modulation of the amygdala could be responsible for processing emotional responses to pain, including catastrophizing. Thus, PENFS can potentially affect the neural-axis at multiple levels including afferent processing and effects on supraspinal affective processes relative to pain like somatization, catastrophizing and anxiety.

In assessing predictors of response to PENFS therapy, those with higher pain catastrophizing and somatization had lesser reduction in VAS pain scores while those with high anxiety had lesser improvements in functioning.

To conclude, we demonstrated improvements in pain intensity and nausea through visual analog scales and validated questionnaires. We also showed improvements in gastric mechanosensitivity through water load task. Disability, pain catastrophizing, somatization and anxiety reduced after four weeks of PENFS treatment and effects were sustained at 6-12 months post-treatment. PENFS: Percutaneous Electrical Nerve Field Stimulation, VAS: Visual Analog Scale.

TABLE 8

Timeline of measures.

| | Pre-PENFS Visit | PENFS (weekly) | Post-PENFS Visit | Follow-up |
|---|---|---|---|---|
| GI Symptom Characteristics | | | | |
| Resting Pain VAS | X | X | X | |
| Resting Nausea VAS | X | X | X | |
| Nausea Severity Scale (NSS) | X | X | X | X |
| Abdominal Pain Index (API) | X | X | X | X |
| Physical Functioning | | | | |
| Functional Disability Inventory (FDI) | X | X | X | X |
| Sleep | | | | |
| Pittsburgh Sleep Quality Index (PSQI) | X | | X | |
| Insomnia Severity Index (ISI) | X | | X | |
| PROMIS Ped SFv1.0 - Sleep Disturbance 8a - Child (PROMIS-SD) | X | X | X | |
| PROMIS Ped SF v1.0 - Sleep Related Impairment 8a - Child (PROMIS-SRI) | X | X | X | |
| Sleep Diary | X | X | X | |
| Psychological Functioning | | | | |
| PROMIS Pediatric Depression Short form scale | X | X | X | X |
| PROMIS Pediatric Anxiety short form scale | X | X | X | |
| Pain Catastrophizing for Children (PSC-C) | X | X | X | X |
| Screen for Child Anxiety Related Emotional Disorders (SCARED) | X | | X | X |
| Somatic | | | | |
| Child Somatic Symptoms Inventory (CSSI) | X | X | X | X |

TABLE 9

Effects on symptoms before, during and after PENFS.

| Parameters | BL | Wk 1 | Wk 2 | Wk 3 | Wk 4 | P value[a] | Follow-up (6-12 m) | P value[b] |
|---|---|---|---|---|---|---|---|---|
| GI Symptoms | | | | | | | | |
| Resting VAS | | | | | | | | |
| Pain Intensity | 2.2 ± 0.52 | 1.72 ± 0.52 | 1.75 ± 0.53 | 1.73 ± 0.53 | 1.61 ± 0.53 | 0.06 | — | — |
| Pain Unpleasantness | 2.05 ± 0.5 | 1.21 ± 0.5 | 1.33 ± 0.51 | 1.28 ± 0.51 | 1.28 ± 0.51 | 0.03 | — | — |
| Nausea | 1.07 ± 0.44 | 0.41 ± 0.44 | 0.61 ± 0.44 | 0.74 ± 0.44 | 0.68 ± 0.44 | 0.10 | — | — |

TABLE 9-continued

Effects on symptoms before, during and after PENFS.

| Parameters | BL | PENFS Wk 1 | Wk 2 | Wk 3 | Wk 4 | P value[a] | Follow-up (6-12 m) | P value[b] |
|---|---|---|---|---|---|---|---|---|
| API | 2.84 ± 0.25 | 2.39 ± 0.25 | 2.08 ± 0.26 | 2.05 ± 0.26 | 1.9 ± 0.26 | <0.0001 | 1.39 ± 0.27 | <0.0001 |
| NSS | 1.78 ± 0.25 | 1.66 ± 0.25 | 1.14 ± 0.25 | 1.36 ± 0.25 | 1.33 ± 0.25 | 0.07 | 0.90 ± 0.27 | 0.001 |
| Physical Functioning | | | | | | | | |
| FDI | 18.95 ± 3.06 | 15.3 ± 3.06 | 15.12 ± 3.07 | 15.07 ± 3.07 | 15.54 ± 3.07 | 0.04 | 10.09 ± 3.14 | <0.0001 |
| CSSI (Somatic symptoms) | 28.25 ± 3.81 | 21 ± 3.81 | 20.61 ± 3.85 | 20.04 ± 3.85 | 20.4 ± 3.85 | 0.01 | 17.8 ± 4.05 | 0.002 |
| CSSI (GI symptoms) | 9.9 ± 1.1 | 7.65 ± 1.1 | 7.4 ± 1.12 | 6.92 ± 1.12 | 7.19 ± 1.12 | 0.01 | 6.14 ± 1.2 | 0.002 |
| Psychological Functioning | | | | | | | | |
| PCS-C | 23.85 ± 3.24 | 19.85 ± 3.24 | 18.08 ± 3.27 | 16.5 ± 3.27 | 15.4 ± 3.27 | 0.0004 | 14.88 ± 3.42 | 0.001 |
| SCARED | 22.5 ± 4.3 | — | — | — | 17.5 ± 4.3 | 0.02 | 16.9 ± 4.4 | 0.03 |
| PROMIS Anxiety | 51.87 ± 2.27 | 48.28 ± 2.27 | 48.85 ± 2.28 | 48.03 ± 2.28 | 48.72 ± 2.28 | 0.03 | 48.87 ± 2.35 | 0.05 |
| PROMIS Depression | 48.6 ± 2.4 | 45.1 ± 2.4 | 46.27 ± 2.42 | 45.73 ± 2.42 | 46.78 ± 2.42 | 0.14 | 47.85 ± 2.49 | 0.63 |

PENFS: Percutaneous Electrical Nerve Field Stimulation, VAS: Visual Analog Scale, API Abdominal Pain Index, NSS: Nausea Severity Scale, FDI: Functional Disability Inventory, CSSI: Children's Somatic Symptoms Inventory, PCS-C: Pain Catastrophizing Scale for Children, SCARED: Screen for Child Anxiety Related Emotional Disorders. All values are LSMeans and SE; [a]p for weeks 4 v. week 0; [b]p for long term follow-up v. week 0.

TABLE 10

Baseline predictors of change in VAS measures and FDI

| Individual Predictor | VAS Pain Intensity β-estimate ± SE | P value | VAS Pain Unpleasantness β-estimate ± SE | P value | VAS Nausea β-estimate ± SE | P value | FDI β-estimate ± SE | P value |
|---|---|---|---|---|---|---|---|---|
| SLEEP | | | | | | | | |
| PSQI | 0.034 ± 0.088 | 0.71 | −0.002 ± 0.137 | 0.99 | 0.039 ± 0.088 | 0.66 | 0.082 ± 0.586 | 0.89 |
| ISI | 0.021 ± 0.058 | 0.73 | −0.061 ± 0.88 | 0.50 | −0.028 ± 0.058 | 0.63 | 0.145 ± 0.382 | 0.71 |
| PROMIS-SD | 0.011 ± 0.039 | 0.78 | −0.02 ± 0.06 | 0.75 | −0.029 ± 0.038 | 0.46 | 0.114 ± 0.255 | 0.66 |
| PROMIS SRI | 0.004 ± 0.035 | 0.91 | −0.032 ± 0.053 | 0.55 | 0.003 ± 0.035 | 0.93 | 0.121 ± 0.229 | 0.61 |
| PSYCHOLOGICAL AND SOMATIC | | | | | | | | |
| PCS-C | 0.082 ± 0.028 | 0.01 | 0.046 ± 0.051 | 0.38 | −0.029 ± 0.033 | 0.40 | 0.128 ± 0.223 | 0.57 |
| CSSI | 0.048 ± 0.021 | 0.04 | 0.032 ± 0.037 | 0.40 | −0.005 ± 0.024 | 0.85 | −0.059 ± 0.161 | 0.72 |
| PROMIS Anxiety | 0.064 ± 0.042 | 0.14 | 0.02 ± 0.068 | 0.77 | −0.045 ± 0.043 | 0.31 | 0.574 ± 0.259 | 0.04 |
| PROMIS Depression | 0.072 ± 0.036 | 0.06 | −0.014 ± 0.061 | 0.83 | −0.011 ± 0.04 | 0.78 | 0.505 ± 0.234 | 0.05 |
| SCARED | 0.029 ± 0.022 | 0.22 | −0.036 ± 0.035 | 0.32 | −0.021 ± 0.023 | 0.36 | 0.193 ± 0.147 | 0.21 |

VAS: Visual Analog Scale, FDI: Functional Disability Inventory, PSQI: Pittsburgh Sleep Quality Index, ISI: Insomnia Severity Index, PROMIS-SD: PROMIS Sleep Disturbance, PROMIS-SRI: Sleep-Related Impairment, PCS-C: Pain Catastrophizing Scale for Children, CSSI: Children's Somatic Symptoms Inventory, SCARED: Screen for Child Anxiety Related Emotional Disorders.

TABLE 11

Mediation of Psychological Factors and Pain Intensity by Sleep Disturbance and Impairment

| | VAS pain intensity- Sleep Disturbance | | | | VAS pain intensity - Sleep impairment | | | |
|---|---|---|---|---|---|---|---|---|
| | Estimate | 95% LCL | 95% UCL | p-value | Estimate | 95% LCL | 95% UCL | p-value |
| PROMIS Anxiety | | | | | | | | |
| Indirect Effect of Sleep | 0.0166 | 0.0042 | 0.03 | 0.01** | 0.0238 | 0.0076 | 0.04 | 0.0040** |
| Direct Effect of Sleep | 0.0237 | 0.0043 | 0.04 | 0.017* | 0.0027 | −0.0175 | 0.02 | 0.812 |
| Total Effect | 0.0403 | 0.0255 | 0.06 | <2e−16*** | 0.0266 | 0.0140 | 0.04 | 0.0004*** |
| Proportion Mediated | 0.4110 | 0.1012 | 0.86 | 0.010** | 0.8969 | 0.2679 | 1.94 | 0.0040** |
| PROMIS Depression | | | | | | | | |
| Indirect Effect of Sleep | 0.0133 | 0.0013 | 0.03 | 0.31* | 0.0204 | 0.0057 | 0.04 | 0.0060** |
| Direct Effect of Sleep | 0.0270 | 0.0090 | 0.05 | 0.004** | 0.0061 | −0.0139 | 0.02 | 0.5284 |
| Total Effect | 0.0403 | 0.0260 | 0.06 | <2e−16*** | 0.0266 | 0.0143 | 0.04 | 0.0004*** |
| Proportion Mediated | 0.3289 | 0.0287 | 0.70 | 0.031 | 0.7688 | 0.2062 | 1.75 | 0.0064** |
| PCS-C | | | | | | | | |
| Indirect Effect of Sleep | 0.0160 | 0.0072 | 0.03 | <2e−16*** | 0.0175 | 0.0082 | 0.03 | <2e−16*** |
| Direct Effect of Sleep | 0.0243 | 0.0095 | 0.04 | 0.002 | 0.0090 | −0.0052 | 0.02 | 0.19 |
| Total Effect | 0.0403 | 0.0258 | 0.06 | <2e−16*** | 0.0266 | 0.0148 | 0.04 | <2e−16*** |
| Proportion Mediated | 0.3967 | 0.1806 | 0.68 | <2e−16*** | 0.6601 | 0.3163 | 1.27 | <2e−16*** |
| CSSI | | | | | | | | |
| Indirect Effect of Sleep | 0.0097 | 0.0009 | 0.02 | 0.0300* | 0.0136 | 0.0049 | 0.03 | 0.004*** |
| Direct Effect of Sleep | 0.0263 | 0.0074 | 0.05 | 0.0048** | 0.0074 | −0.0132 | 0.02 | 0.4732 |
| Total Effect | 0.0360 | 0.0203 | 0.05 | <2e−16*** | 0.0210 | 0.0064 | 0.03 | 0.0060** |
| Proportion Mediated | 0.2706 | 0.0242 | 0.68 | 0.0300* | 0.6490 | 0.1933 | 2.47 | 0.0064** |

VAS: Visual Analog Scale, PCS-C: Pain Catastrophizing Scale for Children, CSSI: Children's Somatic Symptoms Inventory.

TABLE 12

Outcomes of patients on medications compared to those not on medications

| | At Baseline (BL) | | | Changes from BL to post-PENFS | | |
|---|---|---|---|---|---|---|
| | With Medications | Without Medications | p-value | With Medications | Without Medications | p-value |
| GI SYMPTOMS | | | | | | |
| VAS Pain Intensity | 2.15 (0.6,4.3) | 1.15 (0.1, 3) | 0.37 | −0.1 (−1.4, 0.2) | −0.8 (−2.05, −0.1) | 0.39 |
| VAS Pain unpleasantness | 1.45 (0.05, 5.65) | 0.55 (0, 1.7) | 0.29 | −1.2 (−2.6, 0.2) | −0.1 (−1.15, 0) | 0.62 |
| VAS Nausea | 0 (0, 0.65) | 0.05 (0, 2.25) | 0.57 | 0 (−0.3, 0.8) | 0 (−1.5, 0.2) | 0.67 |
| API | 2.79 (2.41, 3.65) | 3.19 (2.3, 3.39) | 0.82 | −0.55 (−1.65, 0) | −0.6 (−2.39, −0.34) | 0.48 |
| NSS | 1.9 (0, 2.2) | 2.4 (1.9, 2.7) | 0.15 | 0 (−0.8, 0.8) | −1.1 (−2.3, −0.1) | 0.07 |

TABLE 12-continued

Outcomes of patients on medications compared to those not on medications

| | At Baseline (BL) | | | Changes from BL to post-PENFS | | |
|---|---|---|---|---|---|---|
| | With Medications | Without Medications | p-value | With Medications | Without Medications | p-value |
| PHYSICAL FUNCTIONING MEASURE | | | | | | |
| FDI | 24 (9.5, 31) | 15.5 (5.5, 24) | 0.19 | 0 (−9, 4) | −3.5 (−10, −2) | 0.19 |
| PSYCHOLOGICAL MEASURES | | | | | | |
| PCS-C | 27.5 (14.5, 33) | 22.5 (17.5, 32) | 1.00 | −6, (−12, 4) | −16 (−21.5, −6.5) | 0.05 |
| SCARED | 25 (11, 34) | 14.5 (8, 25) | 0.23 | −4 (−12, 0) | −8.5 (−13.5, −4) | 0.26 |
| PROMIS: Anxiety | 54.65 (45.25, 59.9) | 52.25 (45.25, 55.2) | 0.44 | −3.8 (−5, 0) | −5.4 (−10.65, 0) | 0.34 |
| PROMIS: Depression | 48.2 (43.15, 57.65) | 46.45 (39.2, 53.25) | 0.44 | 0 (−4.9, 3.1) | −4.9 (−5.6, −2) | 0.11 |
| SOMATIC MEASURE | | | | | | |
| CSSI | 33.5 (14.5, 38.5) | 27.5 (15, 41.5) | 0.88 | −5 (−20, 4) | −11 (−19, −3) | 0.59 |
| SLEEP MEASURES | | | | | | |
| PSQI | 9.5 (6.5, 11) | 7.5 (3.5, 12) | 0.67 | 0 (−4, 1) | −3.5 (−5, 0) | 0.31 |
| ISI | 14 (9, 16) | 6.5 (2.5, 10.5) | 0.04 | −4 (−6, 1) | −2.5 (−5, 1) | 0.74 |
| PROMIS: SD | 64 (57.6, 70.2) | 56.55 (50.25, 62.4) | 0.12 | −7.3 (−7.9, −3.2) | −2.9 (−10.65, 2.7) | 0.62 |
| PROMIS: SRI | 63.3 (59.75, 68) | 53 (43.3, 59.3) | 0.01 | −3.6 (−9.4, 2.3) | −5.9 (−11.45, −3.25) | 0.43 |

TABLE 13

Correlation of symptom duration with outcomes.

| | Duration of symptoms (months) and measures at baseline | | Duration of symptoms and change in measure from baseline to post-PENFS | |
|---|---|---|---|---|
| | Correlation coefficient | p-value | Correlation coefficient | p-value |
| GI Symptoms | | | | |
| VAS Pain Intensity | 0.21 | 0.37 | 0.04 | 0.87 |
| VAS Unpleasantness | 0.18 | 0.44 | −0.05 | 0.84 |
| VAS Nausea | 0.39 | 0.09 | −0.33 | 0.17 |
| API | 0.12 | 0.62 | 0.14 | 0.57 |
| NSS | 0.20 | 0.39 | −0.11 | 0.65 |
| Physical Functioning Measure | | | | |
| FDI | 0.33 | 0.15 | 0.06 | 0.80 |
| Psychological Measures | | | | |
| PCS–C | 0.18 | 0.46 | 0.26 | 0.28 |
| SCARED | 0.21 | 0.37 | 0.25 | 0.29 |
| PROMIS: Anxiety | 0.19 | 0.43 | −0.10 | 0.69 |
| PROMIS: Depression | 0.28 | 0.23 | −0.04 | 0.88 |
| Somatic Measure | | | | |
| CSSI | 0.27 | 0.26 | −0.24 | 0.32 |
| Sleep Measures | | | | |
| PSQI | 0.39 | 0.09 | −0.29 | 0.23 |
| ISI | 0.32 | 0.18 | 0.04 | 0.88 |
| PROMIS: SD | 0.41 | 0.07 | 0.18 | 0.46 |
| PROMIS: SRI | 0.17 | 0.48 | 0.03 | 0.90 |

Percutaneous Electrical Nerve Field Stimulation Decreases Symptoms Severity and Improves Functional Disability and Global Wellbeing in Children with Drug-Refractory Cyclic Vomiting Syndrome.

Background/Objectives: Cyclic vomiting syndrome (CVS) is a disabling condition frequently refractory to pharmacologic therapy. CVS episodes manifest by symptoms of severe autonomic nervous system imbalance. A non-invasive auricular neurostimulation device (Innovative Health Solutions, USA) provides percutaneous electrical nerve field stimulation (PENFS) to branches of cranial nerves in the external ear.

Methods: Children ages 8-18 years with drug-refractory CVS were prospectively enrolled from a tertiary care CVS clinic. Only patients with a history of at least one CVS episode/month were enrolled (Table 7) and all had failed standard prophylactic pharmacotherapy. Subjects underwent 6 consecutive weeks of PENFS therapy (5 days on/2 days off each week). All patients were asked to rate their subjective improvements in intensity and frequency of CVS episodes at the end of therapy. Daily assessments quantified the intensity of nausea, abdominal pain and headache along with frequency and duration of CVS episodes throughout the trial. Subjects also completed validated questionnaires at baseline and at end of therapy including the Nausea Severity Scale (NSS; range 0-4), Functional Disability Inventory (FDI) (FIG. 45), Sheehan Disability Scale (SDS) (FIG. 46) and a global Symptom Response Scale (SRS). The SRS rates global improvement in symptoms with scores ranging from −7 to +7 (0=no change).

Results: An interim analysis was performed on 18 subjects (enrollment ongoing). Table 1 shows the demographics and symptom patterns. Mean (range) of episode duration improved from baseline 48.4 (2-336) hours to end of study 12.2 (0-48) hours (p<0.05). Functional disability scores decreased from baseline to week 6: FDI median (IQR) 46.0 (40.0-52.0) to 34.5 (5.0-43.0) (p=0.011) and SDS median (IQR) 24.5 (21.0-27.0) to 12.5 (1.0-21.0) (p=0.002) (FIG. 45). A total of 65% of subjects reported global symptom improvement of 5+("a good deal better") on the SRS at the end of 6 weeks. At end of study, 75% of subjects reported about 50% improvement in CVS episode frequency while 77% reported about 50% improvement in intensity. 75% reported using less rescue medications than normally and 100% were satisfied with the treatment. No serious side effects were reported.

Conclusions: In children with drug-refractory CVS, PENFS reduces CVS episode frequency, intensity and duration. Improvements in functional disability and global well-being were also observed at the end of treatment without serious side effects.

All publications, patents and patent applications cited herein, whether supra or infra, are hereby incorporated by reference in their entirety to the same extent as if each individual publication, patent or patent application was specifically and individually indicated as incorporated by reference. It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

It must be noted that, as used in this specification and the appended claims, the singular forms "a," "an" and "the" include plural referents unless the content clearly dictates otherwise. Thus, for example, reference to a "colorant agent" includes two or more such agents.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

As will be appreciated by one having ordinary skill in the art, the methods and compositions of the invention substantially reduce or eliminate the disadvantages and drawbacks associated with prior art methods and compositions.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

What is claimed:

1. A method of treating the symptoms of abdominal pain or nausea comprising:
   placing an electrical stimulation device in contact with an ear of a patient, the device comprising
   i) at least one therapy electrode electrically coupled to the electrical stimulation device and configured for percutaneous insertion into an auricle of the ear of the patient near at least one neurovascular bundle,
   ii) a processor, and
   iii) a memory having software stored therein which, when executed by the processor, causes the processor to
      a) control the electrical stimulation device to generate and deliver to the percutaneously inserted at least one therapy electrode electrical stimulation signals at a selected frequency with one of a positive and a negative pulse relative to a reference to stimulate at least one auricular peripheral nerve field within the auricle,
      b) continually repeat (a) for a first duration,
      c) following expiration of the first duration, control the electrical stimulation device to generate no electrical stimulation signals for a second duration, and
      d) repeat (a) through (c) with the electrical stimulation signals having a modulated frequency; and
   reducing the symptoms of abdominal pain or nausea by stimulating the at least one neurovascular bundle with the electrical stimulation device,
   wherein the patient ranges in age from about 11 to about 19 years of age.

2. The method of claim 1, wherein the abdominal pain is a functional abdominal pain disorder.

3. The method of claim 2, wherein the functional abdominal pain disorder is irritable bowel syndrome.

4. The method of claim 1, wherein the nausea is cyclic vomiting syndrome.

5. The method of claim 1, wherein the at least one therapy electrode includes at least one needle for percutaneous insertion into the auricle.

6. The method of claim 1, wherein the electrical stimulation device further comprises a plurality of therapy electrodes each electrically coupled to the electrical stimulation device and each including at least one needle for percutaneous insertion into the auricle, at least one of the plurality of therapy electrodes including a plurality of needles for percutaneous insertion into the auricle.

7. The method of claim 1, wherein the stimulating the at least one neurovascular bundle alters the response characteristics of the amygdala neurons and lumbar spinal neurons.

8. The method of claim 1, wherein the electrical stimulation device further comprises a plurality of electrode assemblies each having a first electrically conductive electrode carried by a first housing and configured to be percutaneously inserted into the auricle of the ear and a second electrically conductive electrode carried by a second housing and configured to non-percutaneously contact the auricle adjacent to the first electrically conductive electrode, wherein the first and second housings are attached to one another or are together of unitary construction, and wherein the first and second electrically conductive electrodes are electrically isolated from one another by the first and second housings, and electrical circuitry coupled to the plurality of electrode assemblies and configured to selectively apply a first set of electrical stimulation signals only to the first electrically conductive electrodes to stimulate at least one auricular nerve field within the auricle, and to selectively apply a second set of electrical stimulation signals only to the second electrically conductive electrodes to further stimulate the at least one auricular nerve field.

9. The method of claim 6, wherein the at least one needle is implanted within 2 mm of the at least one neurovascular bundle.

10. The method of claim 2, wherein the functional abdominal pain disorder is functional dyspepsia.

11. A method of treating the symptoms of abdominal pain or nausea comprising:
    placing an electrical stimulation device in contact with an ear of a patient, the device comprising
        i) at least one therapy electrode electrically coupled to the electrical stimulation device and configured for percutaneous insertion into an auricle of the ear of the patient near at least one neurovascular bundle,
        ii) a processor, and
        iii) a memory having software stored therein which, when executed by the processor, causes the processor to
            a) control the electrical stimulation device to generate and deliver to the percutaneously inserted at least one therapy electrode electrical stimulation signals at a selected frequency with one of a positive and a negative pulse relative to a reference to stimulate at least one auricular peripheral nerve field within the auricle,
            b) continually repeat (a) for a first duration,
            c) following expiration of the first duration, control the electrical stimulation device to generate no electrical stimulation signals for a second duration, and
            d) repeat (a) through (c) with the electrical stimulation signals having a modulated frequency; and
    reducing the symptoms of abdominal pain or nausea by stimulating the at least one neurovascular bundle with the electrical stimulation device,
    wherein the stimulating the at least one neurovascular bundle alters the response characteristics of the amygdala neurons and lumbar spinal neurons.

12. The method of claim 11, wherein the abdominal pain is a functional abdominal pain disorder.

13. The method of claim 12, wherein the functional abdominal pain disorder is irritable bowel syndrome.

14. The method of claim 12, wherein the functional abdominal pain disorder is functional dyspepsia.

15. The method of claim 11, wherein the nausea is cyclic vomiting syndrome.

16. A method of treating the symptoms of abdominal pain or nausea comprising:
    placing an electrical stimulation device in contact with an ear of a patient, the device comprising
        i) at least one therapy electrode electrically coupled to the electrical stimulation device and configured for percutaneous insertion into an auricle of the ear of the patient near at least one neurovascular bundle,
        ii) a processor,
        iii) a memory having software stored therein which, when executed by the processor, causes the processor to
            a) control the electrical stimulation device to generate and deliver to the percutaneously inserted at least one therapy electrode electrical stimulation signals at a selected frequency with one of a positive and a negative pulse relative to a reference to stimulate at least one auricular peripheral nerve field within the auricle,
            b) continually repeat (a) for a first duration,
            c) following expiration of the first duration, control the electrical stimulation device to generate no electrical stimulation signals for a second duration, and
            d) repeat (a) through (c) with the electrical stimulation signals having a modulated frequency;
        iv) a plurality of electrode assemblies each having a first electrically conductive electrode carried by a first housing and configured to be percutaneously inserted into the auricle of the ear and a second electrically conductive electrode carried by a second housing and configured to non-percutaneously contact the auricle adjacent to the first electrically conductive electrode, wherein the first and second housings are attached to one another or are together of unitary construction, and wherein the first and second electrically conductive electrodes are electrically isolated from one another by the first and second housings, and
        v) electrical circuitry coupled to the plurality of electrode assemblies and configured to selectively apply a first set of electrical stimulation signals only to the first electrically conductive electrodes to stimulate at least one auricular nerve field within the auricle, and to selectively apply a second set of electrical stimulation signals only to the second electrically conductive electrodes to further stimulate the at least one auricular nerve field, and
    reducing the symptoms of abdominal pain or nausea by stimulating the at least one neurovascular bundle with the electrical stimulation device.

17. The method of claim 16, wherein the abdominal pain is a functional abdominal pain disorder.

18. The method of claim 17, wherein the functional abdominal pain disorder is irritable bowel syndrome.

19. The method of claim 17, wherein the functional abdominal pain disorder is functional dyspepsia.

20. The method of claim 16, wherein the nausea is cyclic vomiting syndrome.

* * * * *